United States Patent
Kim

(10) Patent No.: US 12,471,173 B2
(45) Date of Patent: Nov. 11, 2025

(54) METHOD AND APPARATUS FOR ACTIVATING CELL GROUP WITHOUT RANDOM ACCESS PROCEDURE IN NEXT GENERATION WIRELESS COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 473 days.

(21) Appl. No.: 18/046,827

(22) Filed: Oct. 14, 2022

(65) Prior Publication Data

US 2023/0118008 A1 Apr. 20, 2023

(30) Foreign Application Priority Data

Oct. 14, 2021 (KR) .................. 10-2021-0136936
Oct. 29, 2021 (KR) .................. 10-2021-0147019

(51) Int. Cl.
| | |
|---|---|
| H04W 76/27 | (2018.01) |
| H04W 74/0833 | (2024.01) |
| H04W 74/0836 | (2024.01) |
| H04W 74/0838 | (2024.01) |

(52) U.S. Cl.
CPC ........ *H04W 76/27* (2018.02); *H04W 74/0833* (2013.01); *H04W 74/0836* (2024.01); *H04W 74/0838* (2024.01)

(58) Field of Classification Search
CPC ............. H04W 76/27; H04W 74/0833; H04W 74/0836; H04W 74/0838; H04W 88/06; H04W 76/15; H04B 7/06964; H04L 5/001; H04L 5/0023; H04L 5/0098; H04L 5/0053

See application file for complete search history.

(56) References Cited

U.S. PATENT DOCUMENTS

| | | | |
|---|---|---|---|
| 11,252,679 B2 * | 2/2022 | Dinan | H04W 72/0446 |
| 11,924,747 B2 * | 3/2024 | Kim | H04W 48/16 |
| 2018/0184475 A1 | 6/2018 | Babaei et al. | |
| 2019/0274169 A1 * | 9/2019 | Tsai | H04W 56/0005 |

(Continued)

FOREIGN PATENT DOCUMENTS

| | | | | |
|---|---|---|---|---|
| CN | 116134957 A | * | 5/2023 | ............ H04W 80/02 |
| EP | 4437792 A1 | | 10/2024 | |

(Continued)

OTHER PUBLICATIONS

Supplementary European Search Report dated Dec. 6, 2024, in connection with European Patent Application No. 22881417.4, 11 pages.

(Continued)

*Primary Examiner* — Wutchung Chu

(57) ABSTRACT

A method performed by a terminal in a wireless communication system includes receiving, from a base station, a RRC reconfiguration message, identifying whether a beam failure is detected or whether a time alignment timer is running, based on the RRC reconfiguration message, and in case that the beam failure is not detected or the time alignment timer is running, identifying a SCG activation, without a random access procedure.

13 Claims, 16 Drawing Sheets

(56) References Cited

U.S. PATENT DOCUMENTS

| | | |
|---|---|---|
| 2020/0045745 A1* | 2/2020 | Cirik ................. H04W 76/27 |
| 2020/0170069 A1 | 5/2020 | Shih et al. |
| 2021/0219275 A1 | 7/2021 | Xu et al. |
| 2021/0329723 A1* | 10/2021 | Teyeb ............ H04W 36/00698 |
| 2022/0030659 A1 | 1/2022 | Kim |
| 2023/0127054 A1* | 4/2023 | Lee ................. H04W 72/1268 |
| | | 370/329 |
| 2023/0413333 A1* | 12/2023 | Tsuboi ................. H04W 76/27 |
| 2024/0008115 A1* | 1/2024 | Wu ..................... H04W 76/20 |
| 2024/0056825 A1* | 2/2024 | Zhang ................. H04B 7/0628 |
| 2024/0129768 A1* | 4/2024 | Maemoto ............. H04W 72/04 |
| 2024/0129769 A1* | 4/2024 | Maemoto ............. H04W 76/15 |
| 2024/0214842 A1* | 6/2024 | Min ..................... H04W 24/02 |
| 2024/0357385 A1* | 10/2024 | Turtinen ............. H04B 7/0695 |
| 2025/0142371 A1* | 5/2025 | Kim ..................... H04W 76/19 |

FOREIGN PATENT DOCUMENTS

| | | |
|---|---|---|
| KR | 10-2020-0063973 A | 6/2020 |
| WO | 2021158090 A1 | 8/2021 |
| WO | WO-2023164947 A1 * | 9/2023 ............ H04W 76/20 |

OTHER PUBLICATIONS

International Search Report and Written Opinion of the International Searching Authority dated Feb. 2, 2023, in connection with International Application No. PCT/KR2022/015636, 7 pages.

Huawei, "[AT115-e][223][R17 DCCA] Network-triggered SCG activation (Huawei)," R2-2108865, 3GPP TSG-RAN WG2#115-e, Online, Aug. 9-27, 2021, 14 pages.

* cited by examiner

METHOD AND APPARATUS FOR ACTIVATING CELL GROUP WITHOUT RANDOM ACCESS PROCEDURE IN NEXT GENERATION WIRELESS COMMUNICATION SYSTEM

CROSS-REFERENCE TO RELATED APPLICATION

This application is based on and claims priority under 35 U.S.C. § 119 to Korean Patent Application Nos. 10-2021-0136936 and 10-2021-0147019, filed on Oct. 14, 2021, and Oct. 29, 2021, respectively, in the Korean Intellectual Property Office, the disclosure of which is herein incorporated by reference in its entirety.

BACKGROUND

1. Field

The disclosure relates to a method and an apparatus for quickly activating a cell in a wireless communication system.

2. Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6th generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra-reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

In one aspect of the disclosure, a method performed by a terminal in a wireless communication system includes receiving, from a base station, a radio resource control (RRC) reconfiguration message, identifying whether a beam failure is detected or whether a time alignment timer is running, based on the RRC reconfiguration message, and in case that the beam failure is not detected or the time alignment timer is running, identifying a secondary cell group (SCG) activation, without a random access procedure.

In another aspect of the disclosure, a method performed by a base station in a wireless communication system includes transmitting, to a terminal, a RRC reconfiguration message, identifying whether to activate a SCG based on the RRC reconfiguration message, and in case that a beam failure is not detected or a time alignment timer is running, activating the SCG without a random access procedure.

In another aspect of the disclosure, a terminal in a wireless communication system includes a transceiver configured to receive or transmit signals, and a processor configured to: control the transceiver to receive, from a base station, a RRC reconfiguration message, identify whether a beam failure is detected or whether a time alignment timer is running, based on the RRC reconfiguration message, and in case that the beam failure is not detected or the time alignment timer is running, identify a SCG activation, without a random access procedure.

In another aspect of the disclosure, a base station in a wireless communication system includes a transceiver configured to receive or transmit signals, and a processor configured to: control the transceiver to transmit, to a terminal, a RRC reconfiguration message, identify whether to activate a SCG based on the RRC reconfiguration message, and in case that a beam failure is not detected or a time alignment timer is running, activate the SCG without a random access procedure. The technical problems to be achieved in the embodiment of the disclosure are not limited to the technical problems mentioned above, and other technical problems not mentioned herein will be clearly understood from the following description by those skilled in the art to which the disclosure belongs.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
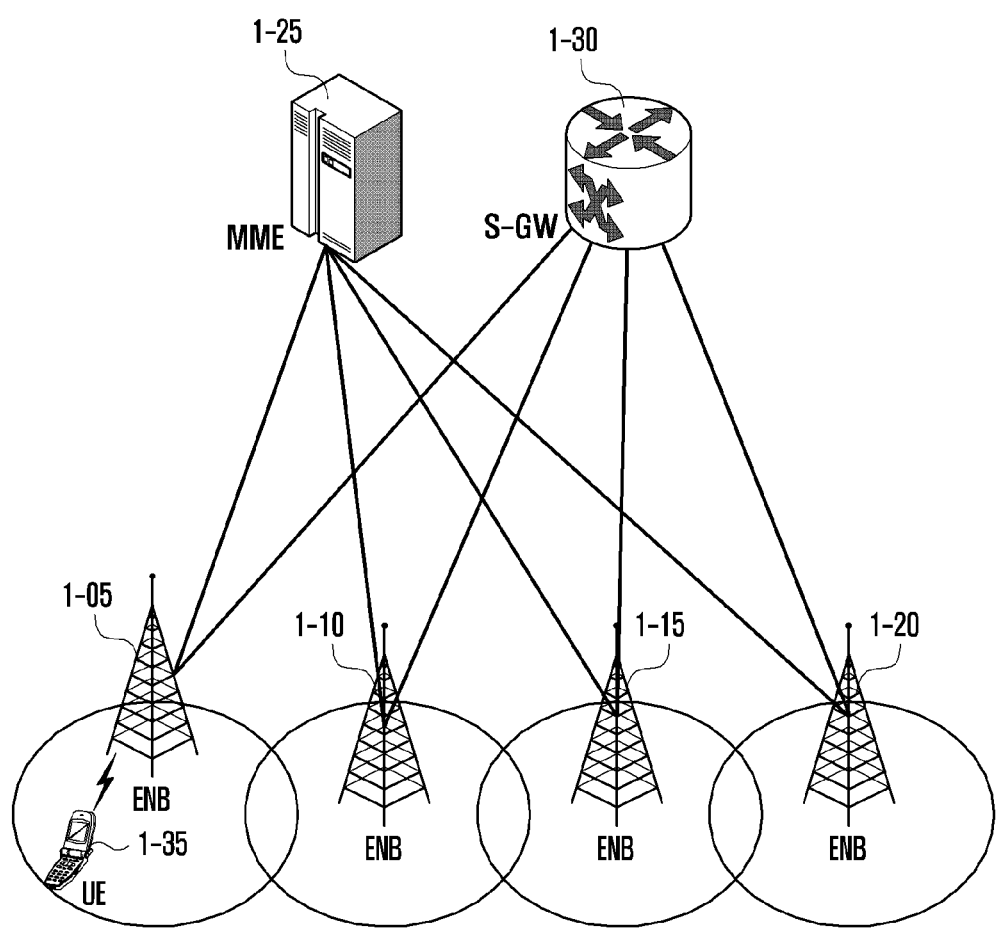
FIG. 1 illustrates a structure of an LTE system according to an embodiment of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail with reference to the accompanying drawings. In the following description of the disclosure, a detailed description of relevant known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of relevant known functions or configurations incorporated herein will be omitted when it may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the above description or the disclosure, a cell may indicate a primary cell (PCell) or a secondary cell (SCell) (e.g., an SCell configured in a master cell group (MCG)), a primary secondary cell (PSCell) (e.g., a PCell of a secondary cell group (SCG)), or an SCell (for example, an SCell configured in a secondary cell group (SCG)).

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB" for the convenience of description. That is, a base station described as "eNB" may indicate "gNB".

Carrier Aggregation (CA) or Dual Connectivity (DC) may be used to provide a service having a high data rate and low latency to a User Equipment (UE) in a next-generation mobile communication system. However, a method of preventing processing latency that may be generated when carrier aggregation or dual connectivity is configured in the UE having a connection with a network and then activated or when carrier aggregation or dual connectivity is used and then deactivated. Particularly, if the UE maintains a plurality of cells in an activated state in order to use the carrier aggregation or the dual connectivity, the UE is required to monitor a Physical Downlink Control Channel (PDCCH) for each cell, so that battery consumption of the UE may increase. On the other hand, if the UE maintain a plurality of cells in a deactivated state in order to reduce battery consumption of the UE, data transmission/reception latency may occur due to latency generated when the plurality of cells are activated through the use of the carrier aggregation or the dual connectivity.

The disclosure provides a new dormant mode, a suspension mode or an inactive mode so that an RRC connected mode terminal that has established a connection with a network can quickly activate and deactivate carrier aggregation technology or dual access technology in a wireless communication system.

Further, the disclosure provides a method for operating the new hibernation (dormancy or suspension) mode in units of a bandwidth part-level, in units of cells, or in unit of cell groups (e.g., for a secondary cell group).

According to an embodiment of the disclosure, an RRC connected mode terminal that has established a connection with a network can quickly activate and deactivate a carrier aggregation technology or a dual access technology in a wireless communication system.

Further, according to an embodiment of the disclosure, the new hibernation (dormancy or suspension) mode is operated in units of a bandwidth part-level, in units of cells, or in unit of cell groups (e.g., for a secondary cell group), and through this, carrier aggregation technology or dual access technology can be activated quickly, and battery consumption of the terminal can be reduced.

Further, according to an embodiment of the disclosure, when a base station instructs a UE to activate a cell (e.g., PCell or PSCell or SCell), the base station may temporarily configure, allocate, or send lots of transmission resources for the UE to be able to perform channel measurement, and the UE may make the cell be quickly activated based on the channel measurement or by quickly reporting the result of the channel measurement to the base station.

The technical effect to be achieved in the embodiment of the disclosure are not limited to the technical problems mentioned above, and other technical effect not mentioned herein will be clearly understood from the following description by those skilled in the art to which the disclosure belongs.

FIG. 1 illustrates a structure of an LTE system according to an embodiment of the present disclosure.

Referring to FIG. 1, a radio access network of the LTE system may include next-generation base stations (Evolved Node Bs (ENBs), Node Bs, or base stations) 1-05, 1-10, 1-15, and 1-20, a Mobility Management Entity (MME) 1-25, and a Serving Gateway (S-GW) 1-30. A user terminal (user equipment) (hereinafter, referred to as a UE or a terminal) 135 may access an external network through the ENBs 1-05 to 1-20 and the S-GW 1-30.

Referring to FIG. 1, the ENBs 1-05 to 1-20 correspond to the node Bs of the related art of the universal mobile telecommunications system (UMTS) system. The ENB is connected to the UE 1-35 through a radio channel, and performs a more complicated role than that of the node B the related art. In the LTE system, since all user traffic including a real-time service such as Voice over IP (VoIP) via an Internet protocol are served through a shared channel, an apparatus for collecting and scheduling status information such as buffer statuses of UEs, available transmission power status, and channel statuses is required, and the ENBs 1-05 to 1-20 may serve as this apparatus. One ENB may control a plurality of cells. For example, in order to implement a transmission rate of 100 Mbps, the LTE system may use Orthogonal Frequency Division Multiplexing (OFDM) as a wireless access technology in a bandwidth of 20 MHz. Further, an Adaptive Modulation and Coding (AMC) scheme of determining a modulation scheme and a channel-coding rate is applied depending on the channel status of the new radio (NR) UE. The S-GW 1-30 is a device for providing a data bearer, and generates or removes the data bearer under a control of the MME 1-25. The MME is a device for performing not only a function of managing the mobility of the UE but also various control functions, and may be connected to a plurality of ENBs.

Figure 2:
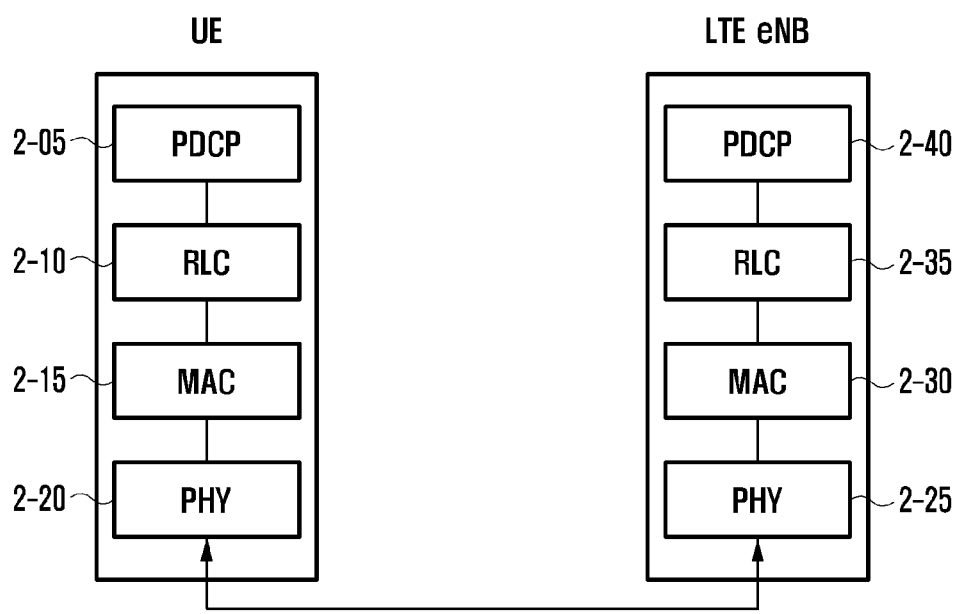
FIG. 2 illustrates a wireless protocol structure in an LTE system according to an embodiment of the present disclosure.

FIG. 2 illustrates a wireless protocol structure in the LTE system according to an embodiment of the present disclosure.

Referring to FIG. 2, the UE and the ENB include Packet Data Convergence Protocols (PDCPs) 2-05 and 2-40, Radio Link Controls (RLCs) 2-10 and 2-35, Medium Access Controls (MACs) 2-15 and 2-30, respectively, in the wireless protocol of the LTE system. The Packet Data Convergence Protocols (PDCPs) 2-05 and 2-40 performs an operation of compressing/reconstructing an IP header. The main functions of the PDCP are described below:

Header compression and decompression function (Header compression and decompression: robust header compression (ROHC) only);
User data transmission function (transfer of user data);
Sequential delivery function (in-sequence delivery of upper-layer Packet Data Units (PDUs) at PDCP reestablishment procedure for RLC acknowledged mode (AM));
Sequence re-arrangement function (For split bearers in DC (only support for RLC AM): PDCP PDU routing for transmission and PDCP PDU reordering for reception);
Duplicate detection function (duplicate detection of lower-layer service data units (SDUs) at PDCP reestablishment procedure for RLC AM);
Retransmission function (retransmission of PDCP SDUs at handover and, for split bearers in DC, of PDCP PDUs at PDCP data recovery procedure, for RLC AM);
Ciphering and deciphering function (Ciphering and deciphering); and
Timer-based SDU removal function (timer-based SDU discard in uplink).

Radio Link Controls (RLCs) 2b-10 and 2b-35 reconfigure a PDCP Packet Data Unit (PDU) or an RLC Service Data Unit (SDU) to be the appropriate size and perform an ARQ operation. The main functions of the RLC are summarized below:

Data transmission function (transfer of upper-layer PDUs);
ARQ function (Error Correction through ARQ (only for AM data transfer));
Concatenation, segmentation, and reassembly function (Concatenation, segmentation and reassembly of RLC SDUs (only for unacknowledged mode (UM) and AM data transfer));
Re-segmentation function (re-segmentation of RLC data PDUs (only for AM data transfer));
Reordering function (reordering of RLC data PDUs (only for UM and AM data transfer));
Duplication detection function (duplicate detection (only for UM and AM data transfer));
Error detection function (protocol error detection (only for AM data transfer));
RLC SDU deletion function (RLC SDU discard (only for UM and AM data transfer)); and
RLC reestablishment function (RLC reestablishment).

The MACs 2-15 and 2-30 are connected with various RLC layer devices included in one UE, and perform an operation for multiplexing RLC PDUs to the MAC PDU and demultiplexing the RLC PDUs from the MAC PDU. The main functions of the MAC are summarized below:

Mapping function (Mapping between logical channels and transport channels);
Multiplexing and demultiplexing function (Multiplexing/demultiplexing of MAC SDUs belonging to one or multiple different logical channels into/from Transport Blocks (TBs) delivered to/from the physical layer on transport channels);
Scheduling information report function (scheduling information reporting);
HARQ function (error correction through HARQ);
Logical channel priority control function (priority handling between logical channels of one UE);
UE priority control function (priority handling between UEs by means of dynamic scheduling);
Multimedia broadcast multicast service (MBMS) service identification function (MBMS service identification);
Transport format selection function (transport format selection); and
Padding function (padding).

The physical layers 2-20 and 2-25 perform an operation for channel-coding and modulating higher-layer data to generate an OFDM symbol and transmitting the OFDM symbol through a radio channel or demodulating and channel-decoding the OFDM symbol received through a radio channel and transmitting the demodulated and channel-decoded OFDM symbol to a higher layer.

Figure 3:
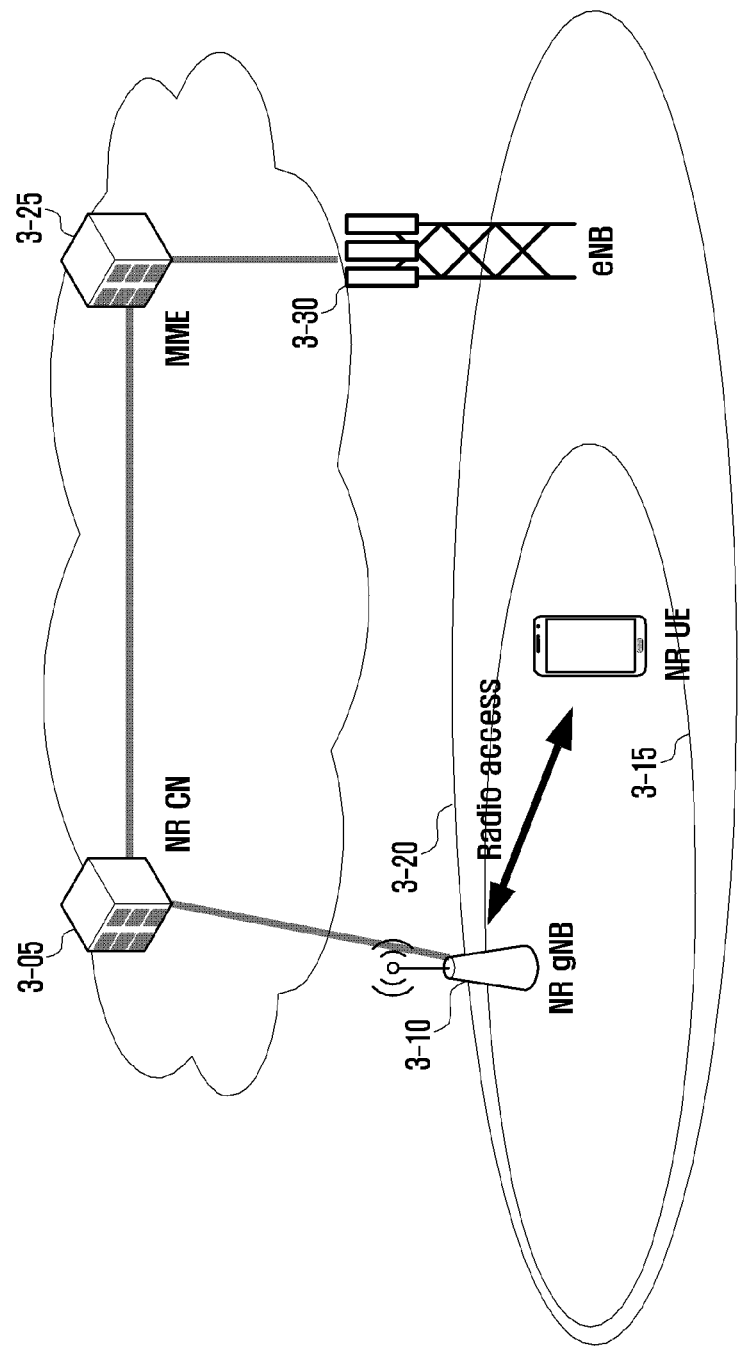
FIG. 3 illustrates a structure of a next-generation mobile communication system according to an embodiment of the present disclosure.

FIG. 3 illustrates a structure of a next-generation mobile communication system according to an embodiment of the present disclosure.

Referring to FIG. 3, a radio access network of the next-generation mobile communication system (hereinafter, referred to as NR or 5G) includes a next-generation base station 3-10 (new radio node B, hereinafter, referred to as an NR gNB or an NR NB) and a new radio core network (NR CN) 3-05. A user terminal 3-15 (hereinafter, referred to as a New Radio User Equipment (NR UE) or a terminal) accesses an external network through the NR gNB 3-10 and the NR CN 3-05.

The NR gNB 3-10 of FIG. 3 corresponds to an evolved Node B (eNB) in a LTE system of the related art. The NR gNB may be connected to the NR UE 3-15 through a radio channel and may provide better service than the node B of the related art. Since all user traffic is served through a shared channel in the next-generation mobile communication system, an apparatus for collecting and scheduling status information of buffer statuses, available transmission power statuses, and channel statuses of UEs is required, and the NR gNB 3-10 serves as this apparatus. One NR gNB generally controls a plurality of cells. The NR gNB may have a bandwidth wider than the maximum bandwidth of the related art in order to implement super-high-speed data transmission compared to LTE of the related art, may apply orthogonal frequency-division multiplexing (OFDM) through radio-access technology, and may further apply beamforming technology. Further, an Adaptive Modulation and Coding (AMC) scheme of determining a modulation scheme and a channel-coding rate is applied depending on the channel status of the NR UE. The NR CN 3-05 performs a function of supporting mobility, configuring a bearer, and configuring quality of service (QoS). The NR CN is a device for performing a function of managing the mobility of the NR UE and various control functions, and is connected to a plurality of NR gNBs. Further, the next-generation mobile communication system may be linked to the LTE system of the related art, and the NR CN is connected to an MME 3-25 through a network interface. The MME is connected to an eNB 3-30, which is a base station of the related art.

Figure 4:
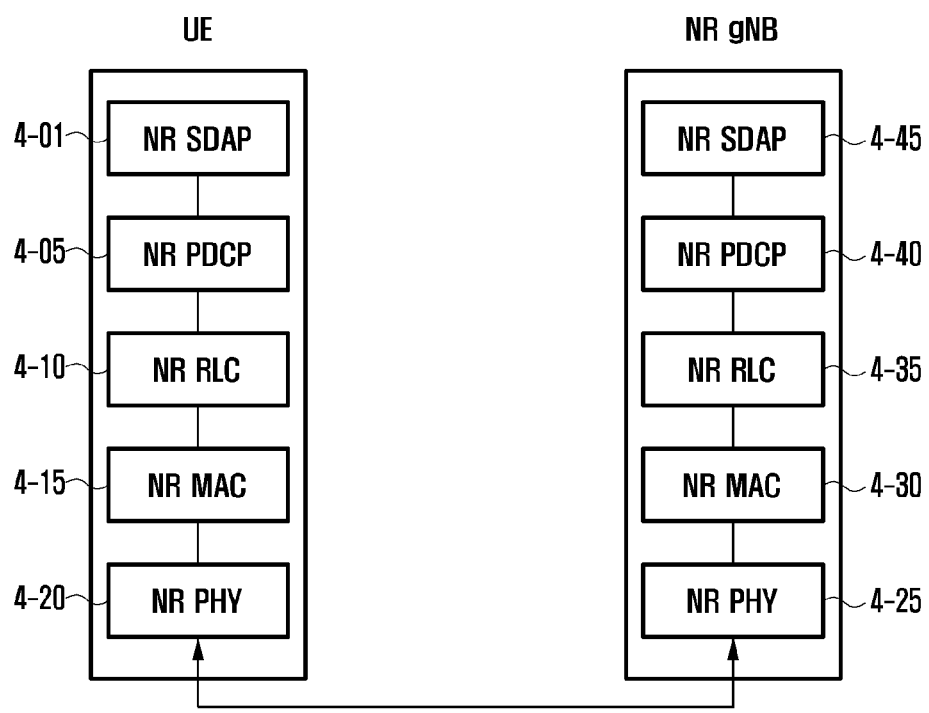
FIG. 4 illustrates a wireless protocol structure of a next-generation mobile communication system according to an embodiment of the present disclosure.

FIG. 4 illustrates a wireless protocol structure of the next-generation mobile communication system according to an embodiment of the present disclosure.

Referring to FIG. 4, the UE and the NR gNB include NR SDAPs 4-01 and 4-45, NR PDCPs 4-05 and 4-40, NR RLCs 4-10 and 4-35, NR MACs 4-15 and 4-30, and NR PHY layer 4-20 and 4-25 in the wireless protocol of the next-generation mobile communication system.

Main functions of the NR SDAPs 4-01 and 4-45 may include some of the following functions:
  User data transmission function (transfer of user-plane data);
  Function of mapping QoS flow and a data bearer for uplink and downlink (mapping between a QoS flow and a data radio bearer (DRB) for both DL and UL);
  Function of marking a QoS flow ID for uplink and downlink (marking QoS flow ID in both DL and UL packets); and/or
  Function of mapping reflective QoS flow to a data bearer for uplink SDAP PDUs (reflective QoS flow to DRB mapping for the UL SDAP PDUs).

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

Main functions of the NR PDCP 4-05 and 4-40 may include some of the following functions:
  Header compression and decompression function (Header compression and decompression: ROHC only);
  User data transmission function (transfer of user data);
  Sequential delivery function (in-sequence delivery of upper-layer PDUs);
  Non-sequential delivery function (out-of-sequence delivery of upper-layer PDUs);
  Reordering function (PDCP PDU reordering for reception);
  Duplicate detection function (duplicate detection of lower-layer SDUs);
  Retransmission function (retransmission of PDCP SDUs);
  Ciphering and deciphering function (Ciphering and deciphering);
  Integrity protection and verification; and/or
  Timer-based SDU removal function (timer-based SDU discard in uplink).

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the reordered data without regard to the order, a function of recording PDCP PDUs lost due to the reordering, a function of reporting statuses of the lost PDCP PDUs to a transmitting side, and a function of making a request for retransmitting the lost PDCP PDUs.

Main functions of the NR RLCs 4-10 and 4-35 may include some of the following functions:
  Data transmission function (transfer of upper-layer PDUs);
  Sequential delivery function (in-sequence delivery of upper-layer PDUs);
  Non-sequential delivery function (out-of-sequence delivery of upper-layer PDUs);
  ARQ function (error correction through ARQ);
  Concatenation, segmentation, and reassembly function (concatenation, segmentation and reassembly of RLC SDUs);
  Re-segmentation function (re-segmentation of RLC data PDUs);
  Reordering function (reordering of RLC data PDUs);
  Duplicate detection function (duplicate detection);
  Error detection function (protocol error detection);
  RLC SDU deletion function (RLC SDU discard); and/or
  RLC reestablishment function (RLC reestablishment).

The sequential delivery function (In-order delivery) of the NR RLC device is a function of sequentially transferring RLC PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording RLC PDUs lost due to the reordering, a function of reporting statuses of the lost RLC PDUs to a transmitting side, a function of making a request for retransmitting the lost RLC PDUs, if there is a lost RLC SDU, a function of sequentially transferring only RLC SDUs preceding the lost RLC SDU to the higher layer if a predetermined timer expires when there is a lost RLC SDU, a function of sequentially transferring all RLC SDUs received before the timer starts to the higher layer, or if a predetermined timer expires when there is a lost RLC SDU, and a function of sequentially transferring all RLC SDUs received up to that point in time to the higher layer.

Further, the NR RLC device may process the RLC PDUs sequentially in the order of reception thereof (according to an arrival order regardless of a serial number or a sequence number) and may transfer the RLC PDUs to the PDCP device regardless of the sequence thereof (out-of-order delivery). In the case of segments, the NR RLC device may receive segments that are stored in the buffer or are to be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer. In the above, whether to perform in-sequence delivery (in-order delivery)

or (out-of-sequence delivery) out-of-order delivery may be configured in the RRC message.

The non-sequential delivery function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 4-15 and 4-30 may be connected to a plurality of NR RLC layer devices configured in one UE and main functions of the NR MAC may include some of the following functions:

Mapping function (Mapping between logical channels and transport channels);

Multiplexing and demultiplexing function (multiplexing/demultiplexing of MAC SDUs);

Scheduling information report function (scheduling information reporting);

HARQ function (error correction through HARQ);

Logical channel priority control function (priority handling between logical channels of one UE);

UE priority control function (priority handling between UEs by means of dynamic scheduling);

MBMS service identification function (MBMS service identification);

Transport format selection function (transport format selection); and/or

Padding function (padding).

The NR PHY layers 4-20 and 4-25 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Since a frequency of a notably high band can be used in the next-generation mobile communication system, a frequency bandwidth may also be very wide. However, in UE implementation, completely supporting the very wide bandwidth requires high implementation complexity, which incurs high costs. Accordingly, the next-generation mobile communication system may introduce the concept of a bandwidth part (BWP), and thus a plurality of BWPs may be configured in one cell (Spcell (special cell) or Scell) and the UE and the NR gNB may transmit and receive data in one or a plurality of BWPs according to a configuration of the NR gNB.

The disclosure proposes a state transition method or a bandwidth part switching method and a detailed operation considering a state of an Scell and a plurality of bandwidth parts configured in the Scell when a dormant bandwidth part is introduced. Further, the disclosure proposes a method to manage a dormant mode in units of bandwidth parts (BWP-levels) and a state transition method or a bandwidth part switching method, and also proposes a detailed operation in a bandwidth part according to a state of each Scell or a state or a mode (active, inactive, or dormant) of each bandwidth part. Further, in order to quickly activate a cell (SCell) or a bandwidth part, first channel measurement configuration information is configured by an RRC message or a MAC CE with respect to the cell or the bandwidth part, and a UE is instructed to apply and use (activate) the first channel measurement configuration information through the RRC message or the MAC CE, so that the UE can quickly measure a channel signal (e.g., reference signal) for the cell or the bandwidth part and can quickly report the measurement result to a base station, thereby quickly activating the cell and the bandwidth part.

As described above, the activation of the cell or the bandwidth part may mean procedures in which the UE monitors a PDCCH in the cell or the bandwidth part, the base station transmits the PDCCH to the UE, the base station transmits downlink data (e.g., PDSCH) to the UE, the UE transmits uplink data (e.g., PUSCH), the UE transmits the measurement result or an HARQ ACK or a NACK on a PUCCH, the UE transmits a sounding reference signal (SRS), or the UE measures a channel measurement signal (a synchronization signal block (SSB) or a channel state information reference signal (CSI-RS) or a reference signal (RS)) being transmitted by the base station, and reports the measurement result to the base station.

As described above, the first channel measurement configuration information may include configuration information on a channel measurement signal that the base station transmits for a specific UE (or UEs) in the cell or the bandwidth part. For example, the configuration information may include a period of the channel measurement signal, the number of times of transmitted signals, a signal transmission period, an offset for a signal transmission time, a time duration between transmitted signals, a list of a plurality of channel measurement signals that can be transmitted, a time transmission resource (or frequency transmission resource) representing the location of the transmitted signal, a transmission resource (time transmission resource or frequency transmission resource) to report the measurement result, or a period to report the measurement result.

Further, a plurality of pieces of channel measurement signal information may be included in the first channel measurement configuration information that is configured through an RRC message, and the first channel measurement configuration information may enable the UE to perform the channel measurement or the channel measurement report by applying or using the indicated channel measurement signal information or beam configuration information through indication of one of the plurality of pieces of channel measurement signal information or beam configuration information that is configured as above through the RRC message, MAC CE, or DCI. As another method, the channel measurement signal information may be configured or indicated through the RRC message or the MAC CE, and the UE may be enabled to perform the channel measurement or the channel measurement report by applying or using the configured (or indicated) channel measurement signal information.

Further, the first channel measurement configuration information may be differently configured for each cell or bandwidth part with respect to a plurality of cells or bandwidth parts being configured through the RRC message, and may be configured together with beam-related configuration information (e.g., transmission configuration indication (TCI) state or quasi co-location (QCL)), such as a beam direction, a beam number, or a beam location, in order to support the UE to easily measure the transmission resource for channel measurement. Further, the first channel measurement configuration information may include a timing advance (TA) value (or an offset value) for synchronization with a downlink signal or an uplink signal of the base station, or a time alignment timer (TAT) indicating effectiveness of the TA value or a TAT value, and by configuring the TA value (or offset value), the TAT, or the TAT value, the first channel measurement configuration information may enable the UE to correctly perform the channel measurement or the channel measurement report.

The first channel measurement configuration information provided in the disclosure can be configured only with respect to the downlink bandwidth part configuration information of each cell. That is, the first channel measurement configuration information provided in the disclosure may not be configured with respect to the uplink bandwidth part configuration information of each cell. This is because the UE may first measure the channel with respect to the downlink in order for the UE to correctly receive a PDCCH and to follow the instructions of the base station after reporting the measurement result for the channel or the cell to the base station.

The first channel measurement configuration information provided in the disclosure may be initially deactivated when being configured through the RRC message or after a handover, and thereafter, the first channel measurement configuration information may be activated by MAC control information, DCI information of the PDCCH, or the RRC message provided in the disclosure. In case that the first channel measurement configuration information is configured through the RRC message, the initial state of the first channel measurement configuration information may be a deactivated state in order for the base station to easily manage the UE cell state or channel measurement performing procedure and to correctly determine the timing in which when and how the UE performs the channel measurement without the problem of the processing delay of the RRC message.

In addition, in the disclosure, a plurality of bandwidth parts for each downlink or uplink is configured in one cell (e.g., Spcell, Pcell, Pscell, or Scell), and active bandwidth part (active DL or UL BWP,) a dormant BWP (or dormant DL BWP), or an inactive bandwidth part (inactive or deactivated DL/UL BWP) is configured and operated through bandwidth part switching. That is, it is possible to increase a data transmission rate through a method similar to the carrier aggregation by transitioning a downlink or uplink BWP to an activated state for one cell. Further, the UE does not monitor a PDCCH to save a battery by transitioning or switching the downlink BWP to a dormant BWP. Further, the UE may measure a channel for the downlink BWP and report a channel measurement result, thereby supporting rapid activation of a cell or a BWP in the future. Further, it is possible to save the batter of the UE by transitioning the downlink (or uplink) BWP to a deactivated state in one cell. An indication of the state transition between BWPs for each cell or a BWP switching indication may be configured through an RRC message, a MAC CE, or downlink control information (DCI) of a PDCCH.

The dormant bandwidth part may be extended and applied to the dual connectivity, for example, a PSCell of a secondary cell group. In another method, cell group suspension or deactivation may be indicated to one cell group (for example, secondary cell group) of the UE in which dual connectivity is configured through expansion to the concept of cell group suspension or cell group deactivation, and thus data transmission or reception is suspended, and PDCCH monitoring is stopped or is performed intermittently on the basis of a very long period in the indicated cell group, and accordingly, UE power may be reduced. Further, when an indication of cell group suspension or deactivation is received, the UE may support rapid activation of the dual connectivity by performing a channel measurement procedure in a cell group of which cell group suspension or deactivation is indicated and reporting the channel measurement result to a network (for example, a master cell group or a secondary cell group).

For the cell group of which the cell group suspension or deactivation is indicated, the UE may perform the procedure and may not discard or release cell group configuration information but maintain or store the same, or may reconstruct the cell group configuration information according to a cell group activation or resumption indication from the network. For example, the cell group configuration information (for example, configuration information of each PDCP, RLC, or MAC layer device, bearer configuration information, or cell-specific configuration information) may be stored or maintained. However, if the cell group is stopped or deactivated, the bearers or the RLC bearer of the bearer may be stopped, or transmission (or data transmission, for example, SCG transmission) in the cell group may be suspended. When a cell group resumption or activation indication is received for the cell group of which the cell group suspension or deactivation has been indicated, the UE may resume, reconstruct, or apply again the cell group configuration information, and may resume a bearer, transmit or receive data again, monitor a PDCCH again, perform a channel measurement report, or re-activate periodically configured transmission resources.

In case that the cell group is suspended or deactivated as described above, the suspension of the bearer (e.g., bearer that uses an RLC UM mode or bearer that uses an RLC AM mode) may mean that a PDCP layer device or an RLC layer device is suspended (or data transmission or reception or data processing is suspended), or that the MAC layer device does not transmit (or receive) the data for the bearer (or corresponding to a logical channel identifier corresponding to the bearer) (or the logical channel identifier is not selected as a target in a logical channel prioritization (LCP) procedure). The procedure of suspending the PDCP layer device as described above may be applied to embodiments of the disclosure as provided in detail as follows.

In case that the cell group is suspended or deactivated as described above, the suspension of the RLC bearer (e.g., RLC bearer that uses an RLC UM mode or RLC bearer that uses an RLC AM mode) may mean that an RLC layer device is suspended (or data transmission or reception or data processing is suspended), or that the MAC layer device does not transmit (or receive) the data for the bearer (or corresponding to a logical channel identifier corresponding to the bearer) (or the logical channel identifier is not selected as a target in a logical channel prioritization (LCP) procedure). The suspension of the RLC bearer may mean that the PDCP layer device connected to the RLC layer device can continue the data processing. For example, the PDCP layer device connected to the suspended RLC bearer may process and transmit the data through another RLC bearer (e.g., RLC bearer belonging to a different cell group (e.g., MCG) from the cell group (e.g., SCG)), or may receive and process the data.

In case that the cell group is suspended or deactivated as described above, the suspension of the transmission (e.g., SCG transmission) to the cell group may mean that the MAC layer device does not transmit (or receive) the data for the bearer (e.g., bearer that uses the RLC UM mode or bearer that uses the RLC AM mode) that belongs to the cell group (or corresponding to the logical channel identifier corresponding to the bearer) (or the logical channel identifier is not selected as a target in the logical channel prioritization (LCP) procedure). However, the suspension of the transmission (e.g., SCG transmission) to the cell group may mean that the PDCP layer device or the RLC layer device can perform the data processing or data preprocessing. For example, the cell group does not transmit the data (or uplink data) of an upper layer device, but the PDCP layer device, the RLC layer device, or the MAC layer device may perform the data processing for transmission in advance.

In case that the cell group is resumed or activated as described above, the resumption of the bearer (e.g., bearer that uses an RLC UM mode or bearer that uses an RLC AM mode) may mean that a PDCP layer device or an RLC layer device is resumed (or data transmission or reception or data processing is resumed), or that the MAC layer device transmits (or receives) the data for the bearer (or corresponding to the logical channel identifier corresponding to the bearer) (or the logical channel identifier is selected as a target in the logical channel prioritization (LCP) procedure).

In case that the cell group is resumed or activated as described above, the resumption of the RLC bearer (e.g., RLC bearer that uses an RLC UM mode or RLC bearer that uses an RLC AM mode) may mean that the RLC layer device is resumed (or data transmission or reception or data processing is resumed), or that the MAC layer device transmits (or receives) the data for the bearer (or corresponding to a logical channel identifier corresponding to the bearer) (or the logical channel identifier is selected as a target in the logical channel prioritization (LCP) procedure). The resumption of the RLC bearer as described above may mean the transfer of the data to the PDCP layer device connected to the RLC layer device, or the reception of the data from the PDCP layer device.

In case that the cell group is resumed or activated as described above, the resumption of the transmission (e.g., SCG transmission) to the cell group may mean that the MAC layer device transmits (or receives) the data for the bearer (e.g., bearer that uses the RLC UM mode or bearer that uses the RLC AM mode) that belongs to the cell group (or corresponding to the logical channel identifier corresponding to the bearer) (or the logical channel identifier is selected as a target in the logical channel prioritization (LCP) procedure). However, the resumption of the transmission (e.g., SCG transmission) to the cell group may mean that the PDCP layer device or the RLC layer device can perform the data processing or data preprocessing. For example, the cell group can transmit the data (or uplink data) of the upper layer device, and the PDCP layer device, the RLC layer device, or the MAC layer device may perform the data processing for transmission in advance.

As another method, in case that the cell group is suspended or deactivated as described above, the PDCP layer device or the RLC layer device may be suspended through suspension of the bearer (or RLC bearer) that uses the RLC UM mode, and thus the data transmission or reception or the data processing may be suspended, or the MAC layer device may suspend the data transmission or reception. However, with respect to the bearer (or RLC bearer) that uses the RLC AM mode, the transmission to the cell group may be suspended in order for the PDCP layer device or the RLC layer device to be able to continue the data processing, or the MAC layer device may suspend the data transmission or reception.

This is because in case that a security key is changed, in a PDCP reestablishment procedure, a retransmission (or regeneration) procedure is present with respect to the RLC AM bearer (accordingly, in case that the security key is not changed, the data processing speed can be reduced, but in case that the security key is changed, a data loss does not occur due to the retransmission (or regeneration) procedure), whereas the retransmission (or regeneration) procedure is not present with respect to the RLC UM bearer, and if the data processing procedure is performed in advance with respect to the RLC UM bearer, the data loss may occur in the UE (in case that the security key is not changed, the data processing speed can be reduced, but in case that the security key is changed, the retransmission (or regeneration) procedure is not present, and all pieces of data are discarded in the reestablishment procedure of the PDCP layer device and the RLC layer device, so that the data loss occurs). Accordingly, different procedures may be applied with respect to the bearer (or RLC bearer) that uses the RLC AM mode and the bearer (or RLC bearer) that uses the RLC UM mode. The procedure of suspending the PDCP layer device as described above may be applied to embodiments of the disclosure as provided in detail as follows.

First channel measurement configuration information for rapid activation of a cell group or a cell (SpCell (Pcell or PSCell)) may be included in the cell group configuration information, cell (SpCell (Pcell or PSCell) or SCell) configuration information, previously configured cell group configuration information, previously configured cell (SpCell (Pcell or PSCell) or SCell) configuration information, or a message (e.g., an RRC message or RRCReconfiguration, MAC control information or DCI of PDCCH) indicating activation or resumption of the cell group or the cell (SpCell (Pcell or PSCell) or SCell).

In order to rapidly activate the cell group, the first channel measurement configuration information may include configuration information such as a period of a signal for frequently measuring a channel measurement signal to often or frequently transmit a frequent channel measurement signal (for example, radios resource, TRS (Temporary Reference Signal, SSB (Synchronization Signal Block), CSI-RS (channel state information Reference Signal), or RS(Reference Signal)) for often or frequent transmission of the channel measurement signal by the base station in order to rapidly perform channel measurement in the cell, transmitted transmission resource information (frequency or time transmission resources through which the frequent channel measurement signal is transmitted), an interval or a number of times (a number of times the frequent channel measurement signal is transmitted), a timer value (a time at which the frequent channel measurement signal is transmitted), a time interval (an interval in which the frequent channel measurement signal is transmitted (for example, a time unit (slot, subframe, symbol, or the like) offset)), or transmission resources of which a measurement result may be transmitted by the UE, a period, an interval, timing or an offset thereof in configuration information of the cell (for example, PCell, PSCell, or SCell) of the cell group.

As described above, the first channel measurement configuration information may be featured to be able to shorten the report period (or transmission resource) in which the UE can report the channel measurement result, or to be able to configure the transmission resource for the channel measurement so that the base station can much and frequently transmit many channel measurement signals (or transmission resources (e.g., radio resources or temporary reference signals (TRS)) in order for the base station to support quick channel measurement or many signal measurements of the UE.

As described above, the first channel measurement configuration information may include configuration information about a channel measurement signal of the base station for a specific UE (or UEs) in the cell or the bandwidth part. For example, the configuration information may include a period of the channel measurement signal, the number of times of transmitted signals, a signal transmission period, an offset for a signal transmission time, a time duration between transmitted signals, a list of a plurality of channel measurement signals that can be transmitted, a time transmission resource (or frequency transmission resource) representing the location of the transmitted signal, a transmission resource (time transmission resource or frequency transmission resource) to report the measurement result, or a period to report the measurement result.

Further, the first channel measurement configuration information may be differently configured for each cell or bandwidth part with respect to a plurality of cells or bandwidth parts being configured through the RRC message, and may be configured together with beam-related configuration information (e.g., transmission configuration indication (TCI) state or quasi co-location (QCL)), such as a beam direction, a beam number, or a beam location, in order to support the UE to easily measure the transmission resource for channel measurement.

Further, the first channel measurement configuration information may include a timing advance (TA) value (or an offset value) for synchronization with a downlink signal or an uplink signal of the base station, or a timer alignment timer (TAT) indicating effectiveness of the TA value or a TAT value, and by configuring the TA value (or offset value), the TAT, or the TAT value, the first channel measurement configuration information may enable the UE to correctly perform the channel measurement or the channel measurement report. Further, the first channel measurement configuration information configured through the RRC message as described above may include a plurality of pieces of channel measurement signal information, and the first channel measurement configuration information may enable the UE to perform the channel measurement or the channel measurement report by applying or using the indicated channel measurement signal information or beam configuration information through indication of one of the plurality of pieces of channel measurement signal information or the beam configuration information that is configured as above through the RRC message, the MAC CE, or the DCI.

The above indication method may define mapping of a bitmap, an index, or an identifier onto the channel measurement signal information configured as above, and may indicate the same based on this. As another method, the UE may be enabled to perform the channel measurement or the channel measurement report by applying or using the configured (or indicated) channel measurement signal information through configuration or indication of the channel measurement signal information through the RRC message or the MAC CE.

The first channel measurement configuration information provided in the disclosure may be featured to be initially deactivated when being configured through the RRC message or after the handover, and thereafter, the first channel measurement configuration information may be activated by the MAC control information, the DCI information of the PDCCH, or the RRC message provided in the disclosure. In case that the first channel measurement configuration information is configured through the RRC message as described above, the initial state of the first channel measurement configuration information may be a deactivated state in order for the base station to easily manage the UE cell state or channel measurement performing procedure and to correctly determine the timing in which when and how the UE performs the channel measurement without the problem of the processing delay of the RRC message.

The first channel measurement configuration information provided in the disclosure may be featured to be able to be configured only with respect to the downlink bandwidth part configuration information of each cell. That is, the first channel measurement configuration information provided in the disclosure may not be configured with respect to the uplink bandwidth part configuration information of each cell. This is because the UE may first measure the channel with respect to the downlink in order for the UE to correctly receive the PDCCH and to follow the instructions of the base station after reporting the measurement result for the channel or the cell.

Further, the message (e.g., an RRC message or RRCReconfiguration, MAC control information or DCI of PDCCH) indicating activation or resumption of the cell group or the cell (SpCell (Pcell or PSCell) or SCell) may include second channel measurement configuration information for measuring a signal of the cell (PSCell, PCell, or SCell) of the cell group. The second channel measurement configuration information may include general channel measurement configuration information such as transmission resources of the channel measurement signal, a period, a time interval, or a number of times thereof, or transmission resources for the channel measurement report, a period, or a time interval thereof.

In the disclosure, the first channel measurement configuration information or the second channel measurement configuration information of the UE may be applied according to the following conditions, a channel may be measured, and a measurement result may be reported to the base station.

1> If the UE receives a message (for example, a PDCCH indicator, MAC control information, or an RRC message) indicating activation (or resumption) of a cell (e.g., PCell, PSCell, or SCell) or a cell group,
2> if the first channel measurement configuration information is configured to the UE
3> the UE may identify that the base station may frequently transmit many channel measurement signals according to the first channel measurement configuration information and may measure many or frequent channel measurement signals temporarily (for example, until a time interval configured in the first channel measurement configuration information (for example, subframe, slot, or symbol), during an appointed (or predetermined) time interval, or during a time (for example, while a timer is run) by considering an offset), or until a first condition is satisfied according to the first channel measurement configuration information. Further, the channel measurement result may be reported until the time interval configured in the first channel measurement configuration information (for example, subframe, slot, or symbol), during the appointed (or predetermined) time interval, or during the time (for example, while the timer is run) by considering an offset), or until the first condition is satisfied according to the period or the transmission resources configured in the first channel measurement configuration information. Accordingly, as the UE rapidly measures and rapidly reports the frequency channel measurement signals, the UE may rapidly activate (or resume) the cell (e.g., PCell, SCell, or PSCell) or the cell group and rapidly receive an indication of scheduling information. If the second channel measurement configuration information is configured to the UE after the time interval configured in the first channel measurement configuration information (for example, subframe, slot, or symbol), after the appointed (or predetermined) time interval, after the time (for example, when the timer expires), or after the first condition is satisfied, the application of the first channel measurement configuration information is stopped or released, and the channel measurement signal may be measured according to the second channel measurement configuration information. For example, fallback from the first channel measurement configuration information to the second channel measurement configuration information may be made or second channel measurement configuration information may be applied instead of the first channel measurement configuration information. The channel measurement result may be reported according to the period or the transmission resources configured in the second channel measurement configuration information. If the second channel measurement configuration information is not configured, the terminal may not perform the channel measurement.

2> otherwise (that is, if the first channel measurement configuration information is not configured in the UE),
        3> if the second channel measurement configuration information is configured to the UE, the UE may measure the channel measurement signal according to the second channel measurement configuration information. The channel measurement result may be reported to the base station according to the period or the transmission resources configured in the second channel measurement configuration information. If the second channel measurement configuration information is not configured, the UE may not perform the channel measurement.

In the disclosure, the first condition may be one of the following conditions. The disclosure proposes, as the first condition, efficient conditions to make the base station not transmit unnecessarily many transmission resources or frequent transmission resources when the cell is activated, when the cell group is activated or resumed, or when the UE in the RRC inactive mode resumes the connection in an RRC connection resumption procedure. For example, the first channel measurement configuration information may be applied and the channel measurement procedure or the channel measurement report result may be performed until one of the following conditions is satisfied.

1> It may be determined that the first condition is satisfied when the UE successfully completes a random access procedure (4-step random access procedure or 2-step random access procedure) in the cell (e.g., PCell, SCell, or PSCell) or the cell (e.g., PScell or Scell) of the cell group, when the UE successfully completes the random access procedure and receives allocation of first uplink transmission resources, or when uplink transmission resources are first indicated to the UE.

For a specific example, if the UE performs a Contention Free Random Access (CFRA) procedure (for example, if a predetermined preamble or a UE cell identifier (e.g., C-RNTI) is allocated), it may be determined that the first condition is satisfied since it may be considered that the random access procedure is successfully completed when the UE transmits the predetermined preamble to the cell and receives a random access response (RAR) message or receives an indication of a PDCCH for the random access response. In another method, when uplink transmission resources are first received after RAR reception, it may be determined that the first condition is satisfied.

For another specific example, if the UE performs a contention-based random access (CBRA) procedure (for example, if a predetermined preamble or a UE cell identifier (e.g., C-RNTI) is not allocated), it may be determined that the first condition is satisfied since the UE considers that the random access procedure to a target base station is successfully completed when the UE transmits a preamble (e.g., a random preamble) to the cell, receives a random access response (RAR) message, transmits message 3 (e.g., a handover completion message) using uplink transmission resources allocated by, included in, or indicated by the random access response message, and receives a MAC CE (contention resolution MAC CE) indicating that contention is resolved from the target base station through message 4, or when the UE receives uplink transmission resources through a PDCCH corresponding to a C-RNTI of the UE. In another method, when the size of the uplink transmission resources allocated by the random access response message is sufficient and thus the UE may additionally transmit uplink data after message 3 is transmitted, the UE may determine that the uplink transmission resources are received and the first condition is satisfied. That is, it may be determined that the uplink transmission resources are first received when the RAR is received and determined that the first condition is satisfied.

1> If the UE receives a configuration or an indication of a 2-step random access procedure and performs the same.
    1> Alternatively, even though the 2-step random access procedure is not configured or indicated, if the UE supports the 2-step random access procedure by a UE capability and 2-step random access procedure is supported in system information of the cell and information (e.g., random access resources or a threshold value for determining to perform the 2-step random access procedure or not perform the same) for the 2-step random access procedure is broadcasted in system information, or if the UE receives the system information and performs the 2-step random access procedure for the cell when the strength of a signal is better or larger than the threshold value broadcasted in the system information.
        2> the UE may determine that the first condition is satisfied when the 2-step random access procedure is successfully completed.
        2> specifically, the 2-step random access procedure may be performed through one of a Contention-Based Random Access (CBRA) method or a Contention-Free Random Access (CFRA) method.
            3> If the UE performs the CBRA-based 2-step random access procedure,
                4> the UE may transmit a preamble in transmission resources for the 2-step random access procedure (e.g., transmission resources configured by a physical random access channel (PRACH) occasion or the base station through an RRC message or transmission resources broadcasted in system information) and transmit data (for example, a MsgA MAC PDU) in transmission resources (for example, physical uplink shared channel (PUSCH) occasion) for data transmission. The data may include MAC control information (C-RNTI MAC CE) including a UE identifier (C-RNTI) or an RRC message (RRCReconfigurationComplete message or a handover completion message).
4> the UE may monitor a PDCCH scrambled by the UE identifier (C-RNTI) or a first identifier (MsgB-RNTI) induced by a time or a frequency in which the preamble is transmitted.
4> if the UE receives a PDCCH scrambled by the UE identifier, receive allocation of downlink transmission resources in the PDCCH, or receives MAC control information (timing advance command MAC CE) for controlling timing in the downlink transmission resources.
5> the UE may determine that the 2-step random access procedure is successfully completed and the first condition is satisfied.
4> if the UE receives a PDCCH scrambled by the first identifier (MsgB-RNTI), receives allocation of downlink transmission resources in the PDCCH, or receives a fallback random access response to a preamble transmitted by the UE in the downlink transmission resources (that is, fallback RAR indicating transmission of a MsgA through other transmission resources when the base station receives the preamble but does not receive the MsgA),
5> the UE may transmit data (MsgA MAC PDU) through transmission resources indicated by the fallback random access response.
5> the UE may monitor the PDCCH scrambled by the UE identifier (C-RNTI).
5> if the UE receives the PDCCH scrambled by the UE identifier or is allocated uplink transmission resources in the PDCCH, the UE may determine that the 2-step random access procedure is successfully completed and the first condition is satisfied.
3> If the UE performs the CFRA-based 2-step random access procedure,
4> the UE may transmit a preamble in transmission resources for the 2-step random access procedure (for example, transmission resources designated by a PRACH occasion or the base station through an RRC message) and transmit data (for example, a MsgA MAC PDU) in transmission resources (for example, PUSCH occasion) for data transmission. The data may include MAC control information (C-RNTI MAC CE) including a UE identifier (C-RNTI) or an RRC message (RRCReconfiguration-Complete message or a handover completion message).
4> the UE may monitor a PDCCH scrambled by the UE identifier (C-RNTI) or a first identifier (MsgB-RNTI) induced by a time or a frequency in which the preamble is transmitted.
4> if the UE receives a PDCCH scrambled by the UE identifier, receives allocation of downlink transmission resources in the PDCCH, or receives MAC control information (timing advance command MAC CE) for controlling timing in the downlink transmission resources.
5> the UE may determine that the 2-step random access procedure is successfully completed and the first condition is satisfied.
4> if the UE receives a PDCCH scrambled by the first identifier (MsgB-RNTI), receives allocation of downlink transmission resources in the PDCCH, or receives a fallback random access response to a preamble transmitted by the UE in the downlink transmission resources (that is, fallback RAR indicating transmission of a MsgA through other transmission resources when the base station receives the preamble but does not receive the MsgA).
5> the UE may determine that the 2-step random access procedure is successfully completed and the first condition is satisfied.
5> the UE may transmit data (MsgA MAC PDU) through transmission resources indicated by the fallback random access response.
1> It may be determined that the first condition is satisfied when the random access procedure starts or when a preamble for the random access procedure is transmitted.
1> In another method, the UE may determine that the first condition is satisfied when the 2-step random access procedure is configured in or indicated to the UE through the message. For example, in this case, the UE may determine that the first condition is satisfied before the 2-step random access procedure starts.
1> In another method, the UE may determine that the first condition is satisfied when the 2-step random access procedure is configured in or indicated to the UE through the message and transmission resources (PUSCH) configured for data transmission in the 2-step random access procedure is larger than a first threshold value or a configuration value for controlling timing (timing advance value) is included in the RRC message. The first threshold value may be configured by the base station through the RRC message (for example, RRCReconfiguration), may be broadcasted in system information, or may be configured to have the size of data to be transmitted by the UE. For example, in this case, the UE may determine that the first condition is satisfied before the 2-step random access procedure starts. In another method, when a configuration value (timing advance value) for controlling timing is included in the RRC message or the 2-step random access procedure is configured, the UE may directly transmit data in configured transmission resources (for example, transmission resources configured in the RRC message or transmission resources indicated by a PDCCH of the target base station, monitored by the UE) without transmitting a preamble. Accordingly, in this case, the UE may determine that the first condition is satisfied before the 2-step random access procedure starts, when the data is transmitted, or before the data is transmitted. In another method, when a configuration value (timing advance value) for controlling timing is included in the RRC message or the 2-step random access procedure is configured, the UE may directly transmit data in configured transmission resources (PUSCH) (for example, transmission resources configured in the RRC message or transmission resources indicated by a PDCCH of the target base station, monitored by the UE) without transmitting a preamble. In this case, when the configured transmission resources (PUSCH) (for example, transmission resources configured in the RRC message or transmission resources indicated by the PDCCH of the target base station, monitored by the UE) is larger than a first threshold value or when the RRC message includes the configuration value (timing advance value) for controlling timing, the UE may determine that the first condition is satisfied before the 2-step random access procedure starts, when the data is transmitted, or before the data is transmitted.

1> When the UE in an RRC inactive mode transmits an RRCResumeRequest message and then receives an RRCResume message (or RRC Setup message) in response thereto, it may be considered that the first condition is satisfied.

1> In case that a timer that indicates a period for the channel measurement expires when the UE performs the channel measurement based on the first channel measurement configuration information configured in the RRC message.

1> In case that the time period that indicates the period for the channel measurement has passed (or has expired), or the time period has been used (or applied) in all, when the UE performs the channel measurement based on the first channel measurement configuration information configured in the RRC message, it may be determined that the first condition is satisfied.

1> In case that signals for the channel measurement have been measured in all (or have been completed) as many as a predetermined number of times or the signals have been received as many as the predetermined number of times, when the UE performs the channel measurement based on the first channel measurement configuration information configured in the RRC message, it may be determined that the first condition is satisfied.

1> In case that the channel measurement has been completed (in case that the channel measurement has expired) or the channel measurement report has been completed (or the channel measurement report has expired) based on the configuration information when the UE performs the channel measurement based on the first channel measurement configuration information configured in the RRC message, it may be determined that the first condition is satisfied.

As described above, if the first condition is satisfied, the upper layer device (e.g., RRC layer device) may indicate that the first condition is satisfied with an indicator to the lower layer device (e.g., PDCP layer device, RLC layer device, MAC layer device, or PHY layer device), or the lower layer device (e.g., PDCP layer device, RLC layer device, MAC layer device, or PHY layer device) may indicate that the first condition is satisfied to the upper layer device (e.g., RRC layer device).

As provided in the disclosure, the methods for configuring or applying the first channel measurement configuration information may be expansively configured and used when the cell group (e.g., PSCell) is activated or resumed, when the SCell is activated, the RRC connection is resumed (e.g., when the RRCResume message is used) in the RRC inactive mode, or when a handover procedure is performed (e.g., when the RRCReconfiguration message is used).

In the disclosure, the BWP may be used without distinction between the uplink and the downlink, and the meaning thereof may be each of an uplink BWP and a downlink BWP according to the context.

In the disclosure, the link may be used without any distinction between the uplink and the downlink, and the meaning thereof may indicate each of the uplink and the downlink.

In the disclosure, the cell may indicate a PCell or an SCell (for example, an SCell configured in a master cell group (MCG)), a PSCell (for example, a PCell of a secondary cell group (SCG)), or an SCell (for example, an SCell configured in a secondary cell group (SCG)). The disclosure configures and introduces a dormant BWP for the SCell or the PSCell of the UE performing carrier aggregation or the dual connectivity and not monitor a PDCCH in the dormant BWP so as to reduce battery consumption of the UE, and performs and reports channel measurement (for example, measures or reports channel state information (CSI) or channel quality information (CQI)) or perform beam measurement, beam tracking, or beam operation, thereby performing switching or activation to a normal BWP and thus rapidly starting data transmission in the normal BWP in the case in which data transmission is needed. The dormant BWP may not be configured or applied to the SpCell (the PCell of the MCG or the PCell of the SCG (or the PSCell)) in which a signal may be continuously monitored, a feedback is transmitted or received, or synchronization is identified or maintained or the SCell in which a physical uplink control channel (PUCCH) is configured.

If the UE receives an indication of switching or activation to the dormant BWP for the SCell of the master cell group through the PCell, the UE may perform a channel measurement procedure for the dormant BSP of the SCell and report the measured channel measurement result in transmission resources of the PCell of the master cell group (MCG) (for example, through transmission resources of a physical uplink control channel (PUCCH of the PCell) or transmission resources of the SCell (for example, through transmission resources of a physical uplink control channel (PUCCH)) in which the PUCCH of the master cell group is configured. A cell or a BWP of the cell for which the channel measurement result is reported, a cell, and transmission resources of the cell (for example, a PUCCH or a PUSCH) through which the report is transmitted may be configured in the UE for each cell or each BWP through the RRC message.

If the UE receives an indication of switching or activation to the dormant BWP for the SCell of the secondary cell group through the PSCell, the UE may perform a channel measurement procedure for the dormant BSP of the SCell and report the measured channel measurement result in transmission resources of the PSCell of the secondary cell group (SCG) (for example, through transmission resources of a physical uplink control channel (PUCCH of the PSCell) or transmission resources of the SCell (for example, through transmission resources of a physical uplink control channel (PUCCH)) in which the PUCCH of the secondary cell group is configured. A cell or a BWP of the cell for which the channel measurement result is reported, a cell, and transmission resources of the cell (for example, a PUCCH or a PUSCH) through which the report is transmitted may be configured in the UE for each cell or each BWP through the RRC message.

If the UE receives an indication of switching or activation to the dormant BWP for the PSCell or the SCell of the secondary cell group through the PCell or an indication of cell group suspension (or SCG suspension) for the secondary cell group (SCG or PSCell), the UE may perform a channel measurement procedure for a BWP of the PSCell or the SCell (BWP configured in the RRC message or the last activated BWP) or the dormant BWP and report the measured channel measurement result in transmission resources of the PCell of the master cell group (MCG) (for example, through transmission resources of a physical uplink control channel (PUCCH) of the PCell), transmission resources of the SCell in which the PUCCH of the master cell group is configured (for example, through transmission resources of the PUCCH), or transmission resources of the PSCell of the secondary cell group (SCG) (for example, through transmission resources of the PUCCH of the PSCell). A cell or a BWP of the cell for which the channel measurement result is reported, a cell, and transmission resources of the cell (for example, a PUCCH or a PUSCH) through which the report is transmitted may be configured in the UE for each cell or each BWP through the RRC message.

The disclosure proposes various embodiments implemented on the basis of DCI of the PDCCH, the MAC CE, or the RRC message in order to operate the state of BWP or cell group suspension provided in the above for the SCell of the UE (the SCell of the master cell group when the carrier aggregation is configured or the SCell of the secondary cell group when the dual connectivity is configured) or the PSCell (the PCell of the secondary cell group when the dual connectivity is configured).

The network or the base station may configure a Spcell (Pcell and PScell) and a plurality of Scells in the UE. The Spcell refers to a Pcell when the UE communicates with one base station, and refers to a Pcell of a master base station or a PScell of a secondary base station when the UE communicates with two base stations (the master base station and the secondary base station). The Pcell and the Pscell are primary cells used by each MAC layer device for communication between the UE and the base station, and correspond to cells for synchronizing timing, performing random access, transmitting HARQ ACK/NACK feedback through PUCCH transmission resources, and exchanging most control signals. A technology in which the base station operates a plurality of Scells as well as the Spcell to increase transmission resources and uplink or downlink data transmission resources is referred to as carrier aggregation or dual connectivity. In the present disclosure, PCell may mean a master cell group (MCG), and PSCell may mean a secondary cell group (SCG). Also, MCG may mean including PCell and SCells configured in MCG, and SCG may mean including SCells configured in PSCell and SCG. Also, a cell may indicate a cell group or a cell group may indicate a cell.

When the UE receives a configuration of the Spcell and a plurality of Scells through an RRC message, the UE may receive a configuration of a state or mode for each cell (PCell, PSCell, or SCell), each Scell or a BWP or a cell group of each SCell through the RRC message, the MAC CE, or the PDCCH DCI. The state or mode of the cell may be configured as an active mode or activated state and a deactivated mode or deactivated state. The active mode or the activated state of the cell may mean that the UE may exchange uplink or downlink data with the base station in a BWP other than an activated BWP of the Cell, an activated normal BWP, or an activated dormant BWP in the active mode or the activated cell, monitors a PDCCH to identify an indication of the base station, measures a channel for a downlink of the cell in the active mode or the activated state (or a BWP other than an activated BWP, an activated normal BWP, or an activated dormant BWP of the cell), periodically reports measurement information, and periodically transmits a pilot signal (sounding reference signal (SRS)) to the base station so that the base station can measure an uplink channel.

Alternatively, the UE may activate or switch the BWP to the dormant BWP for the activated cell according to an indication of the base station (for example, the PDCCH, the MAC CE, or the RRC message) and, when the dormant BWP is activated in the activated cell, may perform a procedure of a channel measurement report and reporting the channel measurement result without performing PDCCH monitoring in the cell.

In another method, if the cell in which the dormant BWP is activated is the SCell, the UE may not monitor the PDCCH, not receive downlink data, perform channel measurement, report the measurement result, suspend configured periodic transmission resources (for example, configured uplink grant type 1), clear or initialize configured periodic transmission resources (for example, configured uplink grant type 2), not transmit a sounding reference signal (SRS), not transmit uplink data, or not transmit a PUCCH (for example, a scheduling report (SR) or a preamble for a random access). However, if the cell in which the dormant BWP is activated or the cell of which cell group suspension is indicated is the PSCell, the UE may not monitor the PDCCH, monitor the PDCCH according to a long period, not receive downlink data, perform channel measurement, report the measurement result, suspend configured periodic transmission resources (for example, configured uplink grant type 1), clear or initialize configured periodic transmission resources (for example, configured uplink grant type 2), transmit a sounding reference signal (SRS), not transmit uplink data, transmit a PUCCH (for example, a scheduling report (SR) or a preamble for a random access), or perform a random access procedure.

If the cell activated to a BWP other than the BWP is the SCell, the UE may monitor the PDCCH, receive downlink data, perform channel measurement, report the measurement result, resume configured periodic transmission resources (for example, configured uplink grant type 1), configure or activate configured periodic transmission resources (for example, configured uplink grant type 2), transmit a sounding reference signal (SRS), transmit uplink data, transmit a PUCCH (for example, a scheduling report (SR) or a preamble for a random access), or perform a random access procedure.

If the cell activated to a BWP other than the BWP or the cell of which cell group resumption (SCG resumption) is indicated is the PSCell, the UE may monitor the PDCCH, receive downlink data, perform channel measurement, report the measurement result, resume configured periodic transmission resources (for example, configured uplink grant type 1), configure or activate configured periodic transmission resources (for example, configured uplink grant type 2), transmit a sounding reference signal (SRS), transmit uplink data, transmit a PUCCH (for example, a scheduling report (SR) or a preamble for a random access), or perform a random access procedure.

However, the deactivated mode or the deactivated state of the cell may mean that the UE does not monitor a PDCCH to identify an indication of the base station, does not measure a channel, does not transmit a measurement report, and does not transmit a pilot signal since BWPs configured in the cell are in the deactivated state, the configured BWPs are not activated, or there is no activated BWP among the configured BWPs.

Accordingly, in order to activate cells in the deactivated mode, the base station first configures frequency measurement configuration information in the UE through an RRC message, and the UE measures a cell or a frequency on the basis of the frequency measurement configuration information. Further, the base station may activate the deactivated cells on the basis of frequency/channel measurement information after receiving the cell or frequency measurement report from the UE. Accordingly, activation of the carrier aggregation or dual connectivity in the UE by the base station and starting of data transmission or reception may have much latency.

The disclosure proposes a dormant BWP or a dormant state for a BWP of each activated cell (or active Scell) or proposes configuration or introduction of a dormant bandwidth part (BWP) for each activated cell in order to reduce a battery of the UE and rapidly start data transmission or reception. Alternatively, when dual connectivity is configured in the UE, introduction of or configuration of an activated state, a dormant state, a suspended state, a deactivated state, or a resumed state for the cell group state of each cell group is provided, and a method of indicating a cell group state transition such as indicating a cell group suspension (or SCG suspension), or a cell group resumption (or SCG resumption) and a UE operation according thereto are provided.

In a BWP in a dormant mode of the activated cell or a dormant BWP (dormant BWP in the activated SCell) or when the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated. Accordingly, since the UE does not monitor the PDCCH in the dormant BWP in the activated cell and does not transmit the pilot signal, the UE may save a battery compared to a normal BWP (or a BWP other than the dormant BWP) or compared to the case in which a normal BWP (or a BWP other than the dormant BWP) of the activated cell is activated, and the base station may reduce a transmission delay by rapidly activating the normal BWP of the activated cell based on the measurement report or the measurement report of the dormant BWP of the activated cell to promptly use the carrier aggregation since the channel measurement report is transmitted unlike the case in which the cell is deactivated.

The active mode or the activated state of the cell may mean that the UE may exchange uplink or downlink data with the base station in a BWP other than an activated BWP of the cell, an activated normal BWP, or an activated dormant BWP in the active mode or the activated cell, monitors a PDCCH to identify an indication of the base station, measures a channel for a downlink of the cell in the active mode or the activated state (or a BWP other than an activated BWP, an activated normal BWP, or an activated dormant BWP of the cell), periodically reports measurement information, and periodically transmits a pilot signal (sounding reference signal (SRS)) to the base station so that the base station can measure an uplink channel. In the disclosure, the active mode or the activated state of the cell may mean that the UE cannot exchange uplink or downlink data with the base station in an activated dormant BWP of the cell, does not monitor a PDCCH to identify an indication of the base station but measures a channel for the downlink of the activated dormant BWP of the cell in the active mode or the activated state, and periodically reports measurement information to the base station in the active mode or the activated cell.

If the cell in which the dormant BWP is activated or the cell of which cell group suspension is indicated is the PSCell, the UE may not monitor the PDCCH, monitor the PDCCH according to a long period, not receive downlink data, perform channel measurement, report the measurement result, suspend configured periodic transmission resources (for example, configured uplink grant type 1), clear or initialize configured periodic transmission resources (for example, configured uplink grant type 2), transmit a sounding reference signal (SRS), not transmit uplink data, transmit a PUCCH (for example, a scheduling report (SR) or a preamble for a random access), or perform a random access procedure.

As another method, in case that the cell in which the cell group deactivation (or suspension) is indicated as described above is the PSCell (or SCG), the PDCCH may not be monitored, the PDCCH monitoring may be performed in a very long period, the downlink data may not be received, the channel measurement or the measurement result report may not be performed, the configured periodic transmission resource (e.g., type 1 periodic transmission resource (configured uplink grant type 1)) may be suspended, or the configured periodic transmission resource (e.g., type 2 periodic transmission resource (configured uplink grant type 2)) may be cleared or initialized, or the sounding reference signal (SRS) may not be transmitted, the uplink data may not be transmitted, or the PUCCH (e.g., preamble for a scheduling request (SR) or random access) may not be transmitted. However, when the cell group deactivation (or suspension) is indicated as described above, a frequency measurement process (radio resource management) may be performed through the frequency measurement configuration information configured by the base station in the RRC message that indicates the cell group deactivation (or suspension), or in case that radio link monitoring (RLM) configuration information is configured, a timer T310 is driven if an indication indicating that the signal is not synchronized is received from the RLM procedure (lower layer device (PHY layer device)) based on the timer T310, and a radio connection failure is declared when the timer T310 expires. If the indication indicating that the signal is synchronized is received, the timer T310 being driven may be suspended. Further, in case that beam-related configuration information is configured so as to perform a beam failure detection procedure in the RRC message that indicates the cell group deactivation (or suspension) when the cell group deactivation (or suspension) is indicated as described above, the UE may perform the beam failure detection procedure.

Further, in the disclosure, the dormant BWP may indicate a state of a BWP or may be used as the logical concept indicating a specific BWP. Accordingly, the dormant BWP may be activated, deactivated, or switched. For example, the dormant BWP may mean an indication of switching a second BWP activated in a first cell to a dormant BWP, an indication of transitioning a first cell to a hibernation or dormant mode, or an indication of activating a BWP of the first cell.

Further, in the disclosure, the normal BWP may indicate a BWP other than a dormant BWP among a BWP configured in each cell of the UE through an RRC message. In the normal BWP, the UE may exchange uplink or downlink data with the base station, monitors a PDCCH to identify an indication of the base station, measures a channel for the downlink, periodically reports measurement information to the base station, and periodically transmits a pilot signal (sounding reference signal (SRS)) to the base station to allow the base station to measure an uplink channel. Further, the normal BWP may indicate a first active BWP, a default BWP, a first active BWP activated from a dormant state, or an initial BWP.

Among the BWPs configured in each cell of the UE, the number of configured dormant BWPs may be only one and may be configured for the downlink. In another method, among the BWPs configured in each cell of the UE, the number of configured BWPs may be only one for the uplink or the downlink.

In the disclosure, the state of the cell group may be configured in the activated state, the suspended state, or the deactivated state. The state of the cell group may be indicated by a bitmap of PDCCH DCI or an indicator, MAC control information, or an indicator of an RRC message. When the state of the cell group is indicated as the activated state, configuration information of the cell group configured or indicated by the RRC message (for example, RRCReconfiguration message, RRCSetup message, or RRCResume message) may be stored, applied to the UE, reconstructed, or resumed, the UE may perform PDCCH monitoring, receive downlink data, perform channel measurement, perform a measurement result report, resume configured periodic transmission resources (for example, type 1 periodic transmission resources (configured uplink grant type 1)), configure or activate configured periodic transmission resources (for example, type 2 periodic transmission resources (configured uplink grant type 2)), transmit a sounding reference signal (SRS), transmit uplink data, transmit a PUCCH (for example, a scheduling request (SR) or a preamble for random access), or perform a random access procedure, according to the configuration of the RRC message in the PCell, PSCell, or the configured SCell of the cell group.

When the state of the cell group is indicated as the suspended state or the deactivated state, configuration information of the cell group configured or indicated by the RRC message (for example, RRCReconfiguration message, RRCSetup message, or RRCResume message) may be stored in the UE or not be discarded but the application thereof may be suspended, the UE may not monitor the PDCCH or perform the PDCCH monitoring according to a long period, not receive downlink data, perform channel measurement, perform a measurement result report, suspend configured periodic transmission resources (for example, type 1 periodic transmission resources (configured uplink grant type 1)), clear or reset configured periodic transmission resources (for example, type 2 periodic transmission resources (configured uplink grant type 2)), transmit a sounding reference signal (SRS), not transmit uplink data may, transmit a PUCCH (for example, a scheduling request (SR) or a preamble for random access), or perform a random access procedure, according to the configuration of the RRC message in the PCell, PSCell, or the configured SCell of the cell group.

When the state of the cell group is indicated as the deactivated state or when cell group configuration information release is indicated, configuration information of the cell group configured or indicated by the RRC message (for example, RRCReconfiguration message, RRCSetup message, or RRCResume message) may be released in the UE or may be discarded.

Figure 5:
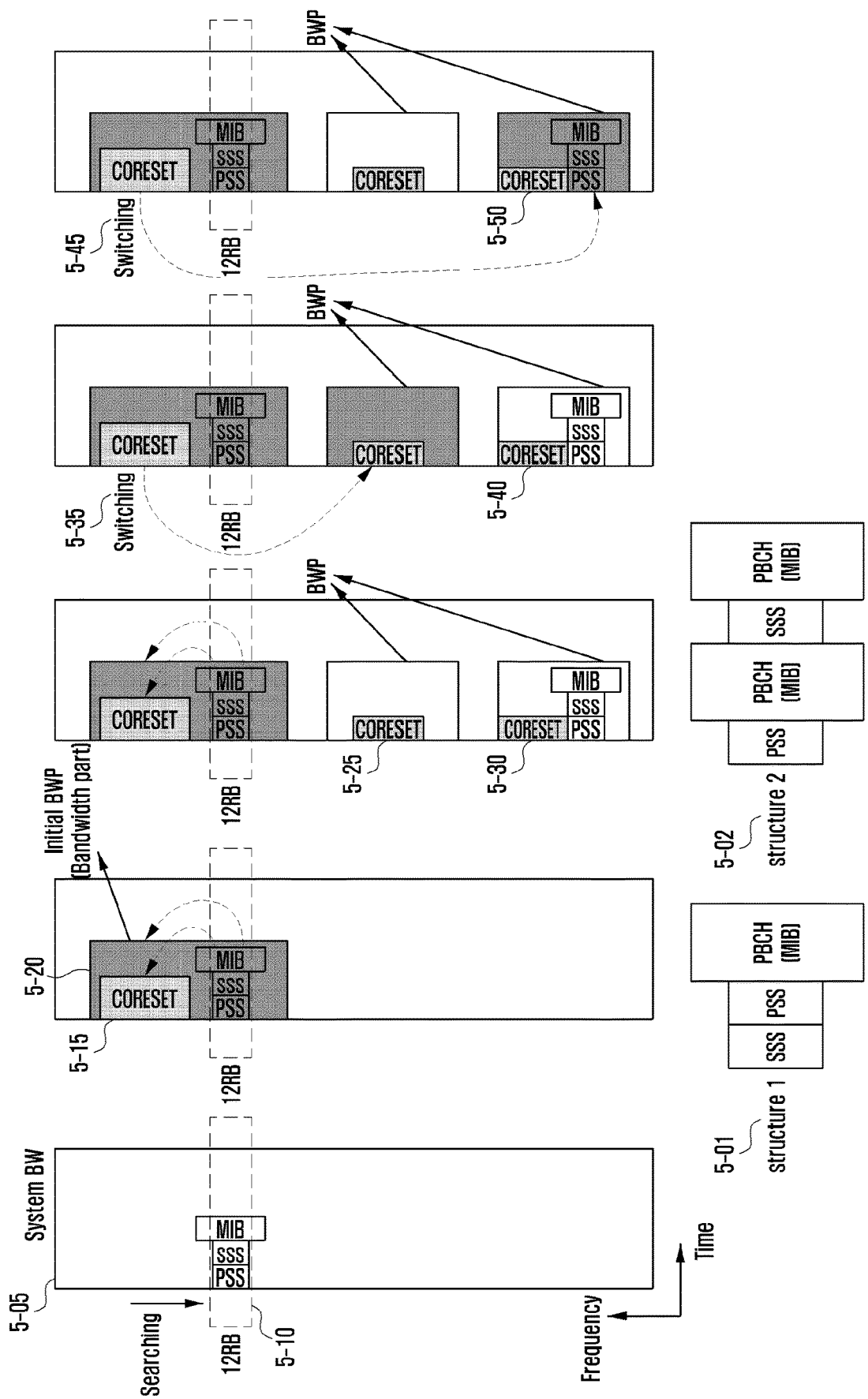
FIG. 5 illustrates a procedure of serving a UE efficiently using a significantly wide frequency bandwidth in a next-generation mobile communication system according to an embodiment of the present disclosure.

FIG. 5 illustrates a procedure of serving the UE efficiently using a significantly wide frequency bandwidth in a next-generation mobile communication system according to an embodiment of the present disclosure.

Referring to FIG. 5, a method of providing a service to UEs having different capabilities or categories by efficiently using a significantly wide frequency bandwidth and saving a battery in the next-generation mobile communication system is described.

One cell to which the base station provides a service may serve a significantly wide frequency band as indicated by reference numeral 5-05. However, in order to provide a service to UEs having different capabilities, the wide frequency bandwidth may be divided into a plurality of bandwidth parts to manage one cell.

First, the UE, when power thereof is initially turned on, may search the entire frequency band provided by a service provider (PLMN) in units of predetermined resource blocks (for example, in units of 12 resource blocks (RBs)). That is, the UE may start discovering a primary synchronization sequence (PSS)/secondary synchronization sequence (SSS) in the entire system bandwidth in units of resource blocks as indicated by reference numeral 5-10. If the UE searches for the PSS/SSS 5-01 or 5-02 in units of resource blocks and then detects the signals, the UE may read the signals, analyze (decode) the signals, and identify a boundary between a subframe and a radio transmission resource frame (radio frame).

Accordingly, the UE may identify subframes in units of 1 ms and synchronize a downlink signal with the base station. The Resource Block (RB) is the size of a predetermined frequency resource and a predetermined time resource, and may be defined as a two-dimensional unit. For example, time resources may be defined in units of 1 js, and frequency resources may be defined as 12 subcarriers (1 carrier×15 kHz=180 kHz). If the UE completes synchronization, the UE may identify information on a control resource set (CORESET) by checking a master system information block (MIB) or minimum system information (MSI) and identify initial access bandwidth part (BWP) information as indicated by reference numerals 5-15 and 5-20. CORESET information refers to the location of time/frequency transmission resources through which a control signal is transmitted from the base station, and may be, for example, the location of resources through which a PDCCH channel is transmitted. That is, the CORESET information is information indicating resources through which first system information (system information block 1: SIB 1) is transmitted and indicates frequency/time resources through which a PDCCH is transmitted. The UE may identify information on an initial BWP by reading the first system information. As described above, if the UE completes synchronization of the downlink signal with the base station and is able to receive a control signal, the UE may perform a random-access procedure in an initial BWP of a cell on which the UE camps, make a request for configuring an RRC connection, receive an RRC message, and make an RRC connection configuration.

In the RRC connection configuration, a plurality of BWPs may be configured per cell (Pcell, Pscell, Spcell, or Scell). A plurality of BWPs may be configured for the downlink within one cell, and separately, a plurality of BWPs may be configured for the uplink.

The plurality of bandwidth parts may be indicated and configured by a bandwidth part identifier (BWP identifier) to be used as an initial BWP, a default BWP, a first active BWP, a dormant BWP, or a first active BWP (first active BWP from dormant) that is activated from a dormant state.

The initial BWP may be used as a cell-specific BWP, one of which exists per cell, and may be used as a BWP in which the UE initially accessing the cell may configure the connection in the cell through a random-access procedure or in which the UE configuring the connection may perform synchronization. The base station may configure an initial downlink BWP to be used in downlink and an initial uplink BWP to be used in uplink for each cell. Configuration information of the initial BWP may be broadcasted through first system information (system information 1: SIB 1) indicated by the CORESET, and may be configured again in the UE which accesses the base station through an RRC message. The initial BWP may be used while being designated with BWP identifier number 0 in each of the uplink and the downlink. That is, all UEs accessing the same cell may equally designate the same initial BWP to BWP identifier number 0 use the initial BWP. This confers an advantage of easily performing a contention-based random-access procedure because the base station can transmit a random access response (RAR) message in the initial BWP, which all UEs can read, during the random access procedure.

The first active BWP may be configured to be UE specific and may be designated and indicated by a BWP identifier among a plurality of BWPs. The first active BWP may be configured for each of the downlink and the uplink, and include a first active downlink BWP and a first active uplink BWP configured as respective BWP identifiers. When a plurality of BWPs is configured in one cell, the first active BWP may be used to indicate which BWP is to be activated and used first. For example, when a Pcell or Pscell and a plurality of Scells are configured in the UE and a plurality of BWPs is configured in each Pcell or Pscell or each Scell, if the Pcell, the Pscell, or the Scell is activated, the UE may activate and use a first active BWP among the plurality of BWPs configured in the Pcell, Pscell, or Scell. That is, the first active downlink BWP may be activated and used for the downlink, and the first active uplink BWP may be activated and used for the uplink Upon receiving an indication indicating activation of the cell or the BWP in a deactivated state through an RRC message, MAC control information, or DCI, the UE may perform an operation of switching the current or activated downlink BWP of the Scell to activate the first active downlink BWP (or a BWP configured or indicated by an RRC message) or switching the current or activated uplink BWP to activate the first active uplink BWP (or a BWP configured or indicated by an RRC message). Further, the operation may be performed when an indication indicating transition of the cell or the BWP to the dormant state or indicating activation thereof to the dormant BWP is received through an RRC message, MAC control information, or DCI. This is because the base station can effectively use carrier aggregation only by measuring and reporting a frequency/channel for the first active downlink/uplink BWP even when a channel measurement report is transmitted in the dormant state since the current or activated downlink BWP is switched to activate the first active downlink BWP (or the BWP configured or indicated by the RRC message) or the uplink BWP is switched to activate the first active uplink BWP (or the BWP configured or indicated by the RRC message) when the Scell or the BWP is activated.

The default BWP may be configured to be UE-specific, and may be designated to and indicated by the identifier of a BWP among a plurality of BWPs. The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message, and the timer may start or restart when data transmission/reception is generated in an activated BWP rather than the default BWP, or may start or restart when the activated BWP is switched to another BWP. If the timer expires, the UE may fall back or switch the downlink BWP activated in the cell to the default BWP. The switching may be a procedure of deactivating the currently activated BWP and activating the BWP to which to switch, and may be triggered through an RRC message, MAC control information (MAC control element), or L1 signaling (downlink control information (DCI) of a PDCCH). The switching may be triggered through an indication of the BWP to be activated or switched to, and the BWP may be indicated by a BWP identifier (for example, 0, 1, 2, 3, or 4)

The reason why the default BWP is used only for the downlink is to make it easy to perform base station scheduling because the base station allows the UE to receive an indication of the base station (for example, DCI of a PDCCH) by falling back to the default BWP for each cell after a predetermined time. For example, if the base station configures the default BWP of the UEs accessing one cell as the initial BWP, the base station may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the base station, the default BWP may be defined and configured for the uplink and thus used like the default BWP of the downlink.

The dormant BWP refers to a BWP in a dormant mode of the activated cell or a dormant BWP (dormant BWP in the activated SCell). When the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated. Accordingly, since the UE does not monitor the PDCCH in the dormant BWP in the activated cell and does not transmit the pilot signal, the UE may save a battery compared to a normal BWP (or a BWP other than the dormant BWP) or compared to the case in which a normal BWP (or a BWP other than the dormant BWP) of the activated cell is activated, and the base station may reduce a transmission delay by rapidly activating the normal BWP of the activated cell based on the measurement report or the measurement report of the dormant BWP of the activated cell to promptly use the carrier aggregation since the channel measurement report is transmitted unlike the case in which the cell is deactivated.

A first active BWP activated after switching from a dormant state or a dormant BWP (or a first active non-dormant BWP or a BWP configured or indicated through an RRC message) may be a BWP which may be activated by switching the current or activated BWP of the activated cell by the UE or a BWP which may be activated from a dormant state configured in the RRC message according to an indication in the case in which the UE receives an indication of switching a BWP of the activated cell from a dormant BWP to a normal BWP (or a BWP which is not the dormant BWP) from the base station through PDCCH DCI, a MAC CE, or an RRC message, receives an indication of switching or transitioning an active BWP from a dormant BWP to a normal BWP, or receives an indication indicating switching or transitioning the active BWP from the dormant BWP to the normal BWP (for example, a first active BWP activated from a dormant state) when the UE operates a BWP of one activated cell as a dormant BWP or when an activated BWP of the activated cell is a dormant BWP or is switched to a dormant BWP in the cell.

Figure 6:
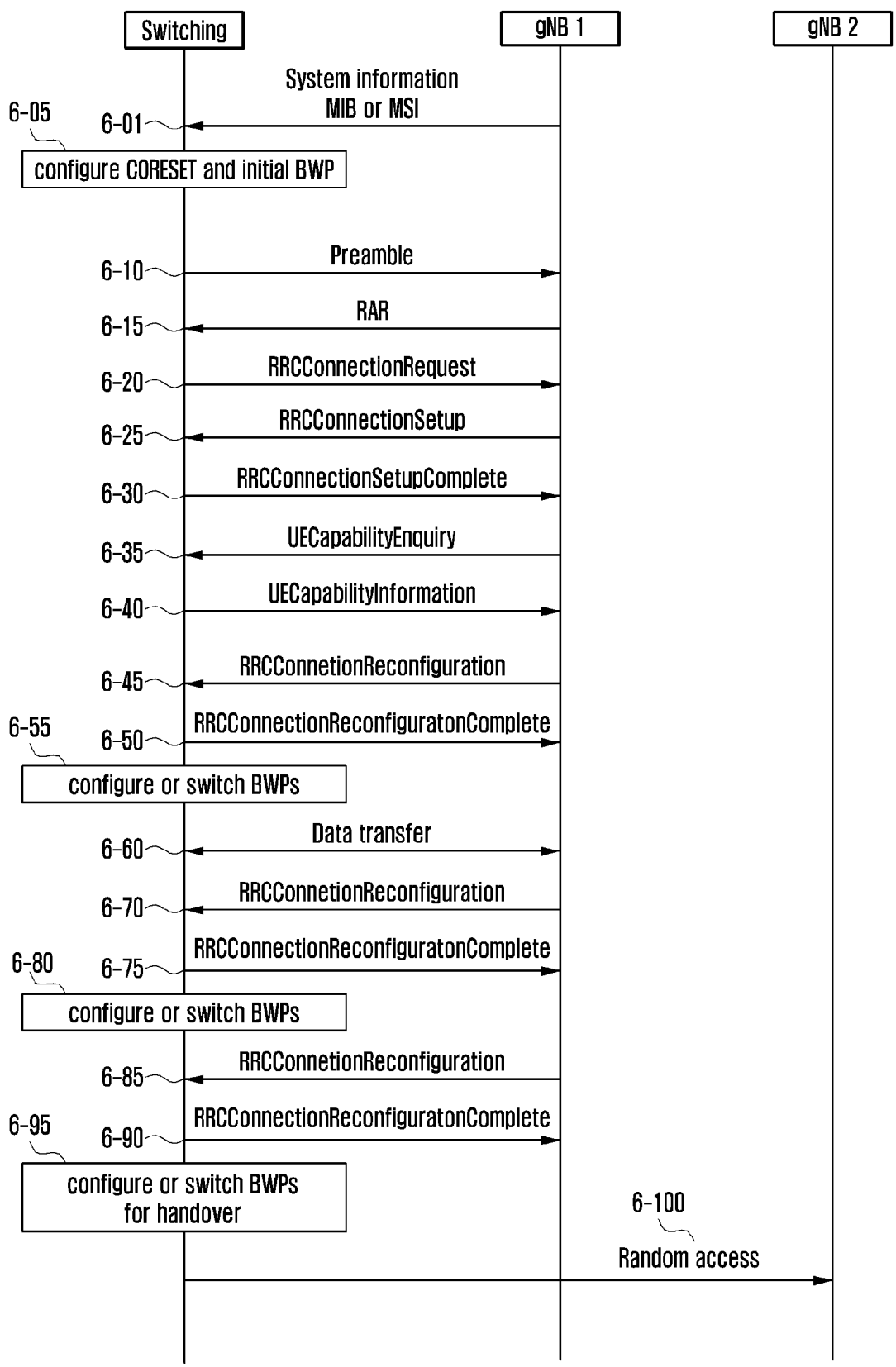
FIG. 6 illustrates a procedure in which a UE is switched from an RRC idle mode to an RRC connected mode in a next generation wireless communication system according to an embodiment of the present disclosure.

FIG. 6 illustrates a procedure in which a UE switches from an RRC-idle mode to an RRC-connected mode in a next-generation mobile communication system of the disclosure and a diagram illustrating a procedure for configuring bearer configuration information, cell group or cell configuration information, or channel measurement configuration information for connection to a UE.

Referring to FIG. 6, one cell to which the base station provides service may serve a very wide frequency band. First, the UE may search the entire frequency band provided by a service provider (PLMN) in units of predetermined resource blocks (for example, in units of 12 Resource Blocks (RBs)). That is, the UE may start discovering a Primary Synchronization Sequence (PSS)/Secondary Synchronization Sequence (SSS) in the entire system bandwidth in units of resource blocks. If the UE searches for the PSS/SSS in units of resource blocks and then detects the signals, the UE may read the signals, analyze (decode) the signals, and identify a boundary between a subframe and a radio transmission resource frame (radio frame). If the UE completes synchronization, the UE may read system information of a cell on which the UE currently camps. That is, the UE may identify information on a control resource set (CORESET) by checking a master system information block (MIB) or minimum system information (MSI) and identify initial bandwidth part (BWP) information by reading system information in operations 6-01 and 6-05. CORESET information refers to the location of time/frequency transmission resources through which a control signal is transmitted from the base station, and may be, for example, the location of resources through which a PDCCH channel is transmitted.

If the UE completes synchronization of the downlink signal with the base station and is able to receive a control signal, the UE may transmit a preamble for a random access procedure in the initial BWP 6-10, receive a random access response 6-15, make a request for configuring an RRC connection 6-20, receive an RRC message 6-25, and complete to configure the RRC connection 6-30.

If the basic RRC connection is completely configured, the base station may transmit an RRC message which asks about a UE capability to the UE (UECapabilityEnquire) in order to identify the UE capability in operation 6-35. In another method, the base station may ask the MME or the AMF about the UE capability in order to identify the UE capability. This is because the MME or the AMF may have UE capability information if the UE previously accessed the MME or the AMF. If there is no UE capability required by the base station, the base station may make a request for UE capability to the UE. The UE may report UE capability 6-40. When reporting the UE capability, the UE may report information indicating whether the UE supports a dormant BWP for the SCell of each cell group (master cell group or secondary cell group), whether the UE supports embodiment 1, embodiment 2, embodiment 3, or embodiment 4, whether the UE supports a dormant BWP for the PScell of each cell group, whether the UE supports a cell group suspension or resumption procedure for the PSCell of each cell group, or the number of supported cell groups to the base station as the UE capability. Further, in the RRC connection resumption procedures, the UE may report information indicating whether the UE may store and reconstruct configuration information of the SCell of the master cell group, the SCell of the secondary cell group, or the PSCell of the secondary cell group, discard the same, reconfigure some thereof, or activate the same to the base station through an RRCResume message as the UE capability.

The reason why the base station transmits the RRC message to the UE to identify the UE capability is to identify the UE capability, for example, information indicating a frequency band that the UE can read or an area of the frequency band that the UE can read. After identifying the UE capability, the base station may configure an appropriate BWP in the UE. If the UE receives the RRC message which enquires about the UE capability, the UE may indicate the range of bandwidths that the UE supports, a range of bandwidths supported in the current system bandwidth through an offset from a reference center frequency, directly indicate a start point and an end point of the supported frequency bandwidth, or indicate the same through a center frequency and a bandwidth in response to the RRC message.

The BWP may be configured through an RRCSetup message or an RRCResume message of the RRC connection configuration in operation 6-25 or an RRCReconfiguration message in operation 6-45, 6-70. The RRC message may include configuration information of a PCell, a Pscell, or a plurality of cells, and a plurality of BWPs may be configured for each cell (PCell, Pscell, or Scell). When a plurality of BWPs is configured for each cell, a plurality of BWPs to be used in the downlink of each cell may be configured. For example, in the case of a frequency division duplex (FDD) system, a plurality of BWPs to be used in the uplink of each cell may be configured to be distinguished from downlink BWPs. In the case of a time division duplex (TDD) system, a plurality of BWPs to be used in common in the downlink and the uplink of each cell may be configured.

The cell configuration information or the information for configuring the BWP of each cell (e.g., PCell, Pscell, or Scell) may include some pieces of the following information:

Cell identifier (SCell index);
    Cell configuration information:
    first channel measurement configuration information for each cell or each BWP, and
    second channel measurement configuration information for each cell or each BWP; and
    Downlink BWP configuration information of the cell:
    Initial downlink BWP configuration information,
    A plurality of BWP configuration information and BWP IDs corresponding to the respective BWPs,
    Initial state configuration information of the cell or downlink BWP (for example, activated state, dormant state, or deactivated state),
    A BWP ID indicating a first active downlink BWP,
    A BWP ID indicating a default BWP,
    Configuration information for monitoring a PDCCH for each BWP (For example, the configuration information includes CORESET information, search space resource information, PDCCH transmission resources, periodicity, and subframe number information),
    A BWP ID indicating a dormant BWP,
    A BWP ID indicating a first active BWP activated from a dormant state,
    BWP inactive timer configuration and a timer value,
    first channel measurement configuration information for each cell or each BWP, and
    second channel measurement configuration information for each cell or each BWP;
    Uplink BWP configuration information of the cell:
    Initial uplink BWP configuration information,
    A plurality of BWP configuration information and BWP IDs corresponding to the respective BWPs,
    Initial state configuration information of the cell or downlink BWP (for example, activated state, dormant state, or deactivated state), and
    A BWP ID indicating a first active uplink BWP; and
    Configuration information of transmission resources through which channel measurement is performed in a dormant BWP or a BWP other than the dormant BWP and a measurement result is reported (for example, PUCCH transmission resource information of the PCell, PUCCH SCell, or PSCell), In order for the base station to transmit the channel measurement signal temporarily much or frequently so as to quickly perform the channel measurement in the cell through the configuration information of the cell (e.g., PCell or PSCell or Scell) of the cell group for quick activation of the cell group, the first channel measurement configuration information that may be included and configured in the RRC message (RRCReconfiguration or RRCResume) may include periods for frequent channel measurement signals (e.g., radio resource, temporary reference signal (TRS), synchronization signal block (SSB), channel state information reference signal (CSI-RS), or reference signal (RS)), transmission resource information being transmitted (frequency or time transmission resource where the frequent channel measurement signals are transmitted), an interval or the number of times ( )he number of times of transmission of the frequent channel measurement signals), a timer value (time for transmission of the frequent channel measurement signal), a time interval (interval at which the frequent channel measurement signals are transmitted (e.g., an offset of the time unit (slot)) subframe or symbol))), or configuration information, such as a transmission resource, a period, an interval, the timing, or an offset, for which the UE may report the measurement result.

As described above, the first channel measurement configuration information may shorten the report period (or transmission resource) in which the UE can report the channel measurement result. Further, the first channel measurement configuration information may configure the transmission resource for the channel measurement so that the base station can much or frequently transmit many channel measurement signals (or transmission resources (e.g., radio resources or temporary reference signals (TRS)) in order for the base station to support the quick channel measurement or many signal measurements of the UE.

As described above, the first channel measurement configuration information may include configuration information about a channel measurement signal of the base station for a specific UE (or UEs) in the cell or the bandwidth part. For example, the first channel measurement configuration information may include a period of the channel measurement signal, the number of times of transmitted signals, a signal transmission period, an offset for a signal transmission time, a time duration between the transmitted signals, a list of a plurality of channel measurement signals that can be transmitted, a time transmission resource (or frequency transmission resource) representing the location of the transmitted signal, a transmission resource (time transmission resource or frequency transmission resource) to report the measurement result, or a period to report the measurement result. Further, the first channel measurement configuration information may be differently configured for each cell or bandwidth part with respect to a plurality of cells or bandwidth parts being configured through the RRC message, and may be configured together with beam-related configuration information (e.g., transmission configuration indication (TCI) state or quasi co-location (QCL)), such as a beam direction, a beam number, or a beam location, in order to support the UE to easily measure the transmission resource for the channel measurement.

Further, the first channel measurement configuration information may include a timing advance (TA) value (or an offset value) for synchronization with a downlink signal or an uplink signal of the base station, or a timer alignment timer (TAT) indicating effectiveness of the TA value or a TAT value, and by configuring the above-described values, the first channel measurement configuration information may enable the UE to correctly perform the channel measurement or the channel measurement report.

Further, the first channel measurement configuration information configured through the RRC message as described above may include a plurality of pieces of channel measurement signal information. In this case, the first channel measurement configuration information may enable the UE to perform the channel measurement or the channel measurement report by applying or using the indicated channel measurement signal information or beam configuration information through indication of one of the plurality of pieces of channel measurement signal information or the beam configuration information that is configured as above through the RRC message, the MAC CE, or the DCI. The above indication method may define mapping of a bitmap, an index, and an identifier onto the channel measurement signal information configured as above, and may indicate the same based on this. As another method, the UE may be enabled to perform the channel measurement or the channel measurement report by applying or using the configured (or indicated) channel measurement signal information through configuration or indication of the channel measurement signal information through the RRC message or the MAC CE.

The first channel measurement configuration information provided in the disclosure may be featured to be initially deactivated when being configured through the RRC message or after the handover, and thereafter, the first channel measurement configuration information may be activated by the MAC control information provided in the disclosure, the DCI information of the PDCCH, or the RRC message. In case that the first channel measurement configuration information is configured through the RRC message as described above, the initial state of the first channel measurement configuration information may be a deactivated state in order for the base station to easily manage the UE cell state or the channel measurement performing procedure and to correctly determine the timing in which when and how the UE performs the channel measurement without the problem of the processing delay of the RRC message.

Further second channel measurement configuration information may be included or configured in the RRC message (RRCReconfiguration or RRCResume). The second channel measurement configuration information may include general channel measurement configuration information, such as the transmission resource of the channel measurement signal, the period, the time interval, the number of times, the transmission resource for the channel measurement report, the period, or the time interval.

The configured initial BWP, default BWP, or first active BWP may be used for the following purpose, and may be operated so as to suit the purpose.

The initial BWP may be used as a cell-specific BWP, one of which exists per cell, and may be used as a BWP in which the UE initially accessing the cell may configure the connection in the cell through a random-access procedure or in which the UE configuring the connection may perform synchronization. The base station may configure an initial downlink BWP to be used in downlink and an initial uplink BWP to be used in uplink for each cell. Configuration information of the initial BWP may be broadcasted through first system information (system information 1: SIB 1) indicated by the CORESET, and may be configured again in the UE which accesses the base station through an RRC message. The initial BWP may be used while being designated with BWP identifier number 0 in each of the uplink and the downlink. That is, all UEs accessing the same cell may equally designate the same initial BWP to BWP identifier number 0 use the initial BWP. This confers an advantage of easily performing a contention-based random-access procedure because the base station can transmit a random access response (RAR) message in the initial BWP, which all UEs can read, during the random access procedure.

The first active BWP may be configured to be UE specific and may be designated and indicated by a BWP identifier among a plurality of BWPs. The first active BWP may be configured for each of the downlink and the uplink, and a first active downlink BWP and a first active uplink BWP may be configured using respective BWP identifiers. When a plurality of BWPs is configured in one cell, the first active BWP may be used to indicate which BWP is to be activated and used first. For example, when a Pcell or Pscell and a plurality of Scells are configured in the UE and a plurality of BWPs is configured in each Pcell or Pscell or each Scell, if the Pcell, the Pscell, or the Scell is activated, the UE may activate and use a first active BWP among the plurality of BWPs configured in the Pcell, Pscell, or Scell. That is, the first active downlink BWP may be activated and used for the downlink, and the first active uplink BWP may be activated and used for the uplink.

Upon receiving an indication indicating activation of any cell or a BWP of any activated cell in a deactivated state or a dormant state or switching or activation from a deactivated or dormant BWP to a normal BWP through an RRC message, MAC control information, or DCI of a PDCCH, the UE may perform an operation of switching the current or activated downlink BWP of the cell to activate the first active downlink BWP (or a BWP configured or indicated by an RRC message) or switching the current or activated uplink BWP to activate the first active uplink BWP (or a BWP configured or indicated by an RRC message). Further, upon receiving an indication indicating transition of the activated cell or BWP to the dormant state or an indication indicating switching or activation to the dormant BWP through the RRC message, MAC control information, or the DCI Of the PDCCH, the UE may switch the BWP to the dormant BWP, activate the BWP, or make the BWP be the dormant state.

The switching to the dormant state or the dormant BWP or the activation of the dormant BWP may be the performance of an operation provided in the dormant state in the disclosure. That is, an operation of measuring a channel in a downlink BWP (or a dormant BWP) and transmitting a report to the base station without monitoring a PDCCH may be performed. In another method, when the activated cell or BWP is activated or switched to the normal BWP, a first active downlink BWP may be activated by switching a downlink BWP and a first active uplink BWP may be activated by switching an uplink BWP, and thus the dormant BWP may be configured as the first active downlink or uplink BWP or a default BWP. The default BWP may be configured to be UE-specific, and may be designated to and indicated by the identifier of a BWP among a plurality of BWPs. The default BWP may be configured only for the downlink. The default BWP may be used as a BWP on which to fall back from the activated BWP, among a plurality of downlink BWPs, after a predetermined time.

For example, a BWP inactivity timer may be configured for each cell or each BWP through an RRC message, and the timer may start or restart when data transmission/reception is generated in an activated BWP rather than the default BWP, or may start or restart when the activated BWP is switched to another BWP. If the timer expires, the UE may fall back or switch the downlink BWP activated in the cell to the default BWP. The switching may be a procedure of deactivating the currently activated BWP and activating the BWP to which to switch, and may be triggered through an RRC message, MAC control information (MAC control element), or L1 signaling (downlink control information (DCI) of a PDCCH). The switching may be triggered through an indication of the BWP to be activated or switched to, and the BWP may be indicated by a BWP identifier (for example, 0, 1, 2, 3, or 4).

The reason why the default BWP is used only for the downlink is to make it easy to perform base station scheduling because the base station allows the UE to receive an indication of the base station (for example, DCI of a PDCCH) by falling back to the default BWP for each cell after a predetermined time. For example, if the base station configures the default BWP of the UEs accessing one cell as the initial BWP, the base station may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the base station, the default BWP may be defined and configured for the uplink and thus used like the default BWP of the downlink.

The dormant BWP refers to a BWP in a dormant mode of the activated cell or a dormant BWP (dormant BWP in the activated SCell). When the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated. Accordingly, since the UE does not monitor the PDCCH in the dormant BWP in the activated cell and does not transmit the pilot signal, the UE may save a battery compared to a normal BWP (or a BWP other than the dormant BWP) or compared to the case in which a normal BWP (or a BWP other than the dormant BWP) of the activated cell is activated, and the base station may reduce a transmission delay by rapidly activating the normal BWP of the activated cell based on the measurement report or the measurement report of the dormant BWP of the activated cell to promptly use the carrier aggregation since the channel measurement report is transmitted unlike the case in which the cell is deactivated.

The first active BWP activated from a dormant state (or a first active non-dormant BWP) may be a first active BWP activated from a dormant state, that is, BWP which the UE may switch or activate in the activated cell, configured in the RRC message according to an indication in the case in which the UE receives an indication indicating switching of the BWP of the activated cell from a dormant BWP to a normal BWP (or a BWP which is not the dormant BWP) through PDCCH DCI, a MAC CE, or an RRC message from the base station, receives an indication indicating switching or transmission of the active BWP from a dormant BWP to a normal BWP, and receives an information indicating switching, transition, or activation of the active BSP from a dormant BWP to a normal BWP (for example, a first active BWP activated from a dormant state).

In the disclosure, switching a first BWP to a second BWP may mean activating the second BWP or deactivating the activated first BWP and activating the second BWP.

In an RRCSetup message, an RRCResume message 6-25, or an RRCReconfiguration message 6-45 of the RRC connection configuration, a state transition timer may be configured to allow the UE to transition the state by itself even though the UE does not receive an indication through an RRC message, MAC control information, or DCI of a PDCCH. For example, if a cell deactivation timer (ScellDeactivationTimer) is configured for each cell and the cell deactivation timer expires, the cell may transition to the deactivated state.

In the RRCSetup message, the RRCResume message 6-25, or the RRCReconfiguration message 6-45 of the RRC connection configuration, frequency measurement configuration information (measurement configuration) and frequency measurement gap configuration information (measurement gap information) may be configured, and frequency measurement object information may be included. Further, in the RRCSetup message of the RRC connection configuration, the RRCResume message of operation 6-25, or the RRCReconfiguration message of operation 6-45, a function for reducing power consumption of the UE (power saving mode) may be configured, or configuration information such as a discontinuous reception (DRX) cycle, an offset, an on-duration interval (an interval in which the UE may monitor a PDCCH), or time information, time information indicating when the UE may monitor or search for a PDCCH from the base station before the on-duration interval during the DRX cycle, or short time period information may be configured together with the function for reducing power consumption.

If the function for reducing power consumption of the UE is configured, the UE may configure a DRX cycle and search for a Wake-Up Signal (WUS) in an interval configured to monitor the PDCCH by the base station before the on-duration interval, and the base station may indicate whether to skip (or not perform) or perform monitoring of the PDCCH in the on-duration interval to the UE through DCI of the PDCCH of the WUS. The UE may always monitor the PDCCH in the on-duration interval, but the base station may allow the UE to reduce battery consumption by making the UE not monitor the PDCCH in the on-duration interval through the WUS.

As described above, when the RRC connection configuration is completed, the UE may configure a plurality of BWPs according to the indication configured through the RRC message. Further, in order to save a battery, the UE may activate one or a small number of BWPs among the plurality of configured BWPs. For example, the base station may indicate one BWP to be activated. The base station may indicate activation of the BWP through the RRC message, MAC control information (MAC CE), or L1 signaling (PHY layer control signal such as DCI of the PDCCH) to indicate switching from the initial access BWP to a new BWP. In another method, new bitmap information may be defined and activation of the normal BWP (or a BWP other than the dormant BWP), activation of the dormant BWP, or deactivation of the BWP may be indicated in the PDCCH DCI. In another method, whether to activate the normal BWP (for example, the first active BWP that is activated from the dormant state), activate the dormant BWP, switch the dormant BWP, or switch the BWP may be indicated by the bitmap. Since there are many new accessing users in the initial access BWP, it may be more advantageous for scheduling to allocate a new BWP and separately manage the connected users. This is because the initial access BWP may be shared and used by all UEs in common rather than being configured in a UE-specific manner. Further, the default BWP may be dynamically indicated through the MAC control information, L1 signaling, or system information in order to reduce signaling overhead.

The RRC message (RRCSetup message, RRCResume message 6-25, or RRCReconfiguration message 6-70) may be included in configuration information for the cell group. The configuration information for the cell group may include some or a plurality of pieces of information below and may indicate a state, a procedure, or the application or release of configuration information for each cell group:

- A cell group identifier (or index) indicating a cell group (e.g., Cell Group identifier or Index);
- An indicator indicating a state of a cell group (for example, an activated state, a suspended state, or a deactivated state);
- An indicator indicating a state of a cell group (for example, an indicator indicating suspension (or deactivation) of the cell group (for example, a Cellgroup (SCG) suspension indicator) or an indicator indicating resumption (or activation) of the cell group (for example, Cellgroup (SCG) resumption indicator));
- An indicator triggering a procedure of a protocol layer device (for example, an SDAP layer device, a PDCP layer device, an RLC layer device, or a MAC layer device) corresponding to the indicator indicating the state of the cell group (for example, a PDCP re-establishment indicator, a PDCP data reconstruction indicator, an indicator triggering a new procedure, an RLC re-establishment indicator, a MAC layer device initialization indicator, or a MAC layer device partial initialization indicator);
- Second DRX configuration information for enabling PDCCH monitoring in the PSCell of the cell group to be performed with a very long period (e.g., monitoring period or on duration length or period or offset, etc.); and
- When an indicator indicating suspension (or deactivation) of the state of the cell group is included, second DRX configuration information (for example, a monitoring interval, an activation interval (on duration) length, period, offset, or the like) allowing PDCCH monitoring in the PSCell of the cell group to be performed according to a very long period.

For example, upon receiving the indicator indicating suspension of the cell group, the UE may apply the second DRX configuration information to perform PDCCH monitoring based on a very long period, thereby saving UE power. In another method, upon receiving the indicating suspension of the cell group, the UE may apply BWP configuration information for the PSCell of the cell group to activate or switch the downlink BWP of the PSCell of the cell group to the dormant BWP and perform the UE operation in the cell in which the dormant BWP provided in the disclosure is activated. Further, upon receiving the indicator indicating suspension of the cell group, the UE may deactivate all of the SCells configured in the cell group.

In another method, upon receiving the indicating suspension of the cell group, the UE may activate or switch the downlink BWP to the dormant BWP for the SCell in which the dormant BWP is configured among the Scells configured in the cell group, and perform the UE operation in the cell in which the dormant BWP is activated provided in the disclosure or deactivate the Scell in which no dormant BWP is configured. In another method, upon receiving the indicating suspension of the cell group in the RRC message, the UE may activate, deactivate, or hibernate each Scell or activate the dormant BWP according to configuration information for each Scell of the cell group included in the RRC message or the indicator or activate, deactivate, or hibernate each Scell of the cell group or activate the dormant BWP by an indicator (for example, bitmap) of the PDCCH, MAC control information, or the RRC message before or after receiving the indicating suspension of the cell group:

Configuration information of transmission resources through which channel measurement is performed in a dormant BWP or a BWP other than the dormant BWP and a measurement result is reported (for example, PUCCH transmission resource information of the PCell, PUCCH SCell, or PSCell); and When an indicator indicating resumption (or activation) of the state of the cell group is included, first DRX configuration information (for example, a monitoring interval, an activation interval (on duration) length, period, offset, or the like) allowing PDCCH monitoring in the PSCell of the cell group to be performed again may be configured. Alternatively, first DRX configuration information stored for the cell group may be reconstructed and applied.

For example, upon receiving the indicating resuming the cell group, the UE may apply the first DRX configuration information which is stored or received from the RRC message to perform PDCCH monitoring, thereby resuming data transmission or reception. In another method, upon receiving the indicating resumption of the cell group, the UE may apply BWP configuration information for the PSCell of the cell group to activate or switch the downlink BWP of the PSCell of the cell group to a BWP, which is not the dormant BWP (for example, a BWP configured by the RRC message), and perform the UE operation in the cell in which the dormant BWP is activated provided in the disclosure. Alternatively, upon receiving the indicator indicating resumption of the cell group, the UE may apply random access configuration information which is stored or received from the RRC message (random access transmission resource information for transmitting a preamble (time or frequency transmission resources), designated preamble information, or the like) to trigger a random access procedure in the PSCell of the cell group.

In another method, upon receiving the indicator indicating resumption of the cell group, if the random access configuration information (random access transmission resource information for transmitting a preamble (time or frequency transmission resources, designated preamble information, or the like) is included in the RRC message, the UE may apply the random access configuration information to trigger the random access procedure (for example, a contention-free random access procedure) in the PSCell of the cell group. If the random access configuration information (random access transmission resource information for transmitting a preamble (time or frequency transmission resources, designated preamble information, or the like) is not included in the RRC message, the UE may trigger the random access procedure (for example, a contention-based access procedure) in the PSCell of the cell group or trigger the random access procedure (a contention-based random access or 2-step random access procedure) on the basis of system information.

If there is random access configuration information (random access transmission resource information (time or frequency transmission resources) for transmitting a preamble, designated preamble information, or the like) stored in the UE before the indicator indicating resumption of the cell group is received, the random access configuration information may be released or discarded. In another method, the UE may perform PDCCH monitoring in the indicated or configured cell group or cell, and trigger and perform the random access procedure according to the indication by the PDCCH. When the indicator indicating resumption (or activation) of the state of the cell group is included or the indicator indicating resumption of the cell group is received, the UE may activate all of the SCells configured in the cell group. In another method, upon receiving the indicator indicating resumption of the cell group, the UE may activate or switch the downlink BWP to a BWP, which is not the dormant BWP (for example, a BWP configured by the RRC message or a first active BWP), for the SCell in which the dormant BWP is configured among the SCells configured in the cell group, and perform the UE operation in the cell in which the dormant BWP is activated provided in the disclosure or deactivate the SCell in which no dormant BWP is configured.

In another method, upon receiving the indicator indicating resumption of the cell group in the RRC message, the UE may activate, deactivate, or hibernate each SCell or activate the dormant BWP according to configuration information for each SCell of the cell group included in the RRC message or the indicator or activate, deactivate, or hibernate each SCell of the cell group or activate the dormant BWP by an indicator (for example, bitmap) of the PDCCH, MAC control information, or the RRC message before or after receiving the indicator indicating resumption of the cell group:

An indicator adding cell group configuration;

An indicator releasing cell group configuration;

Security configuration information (security key information for the cell group or additional information (for example, sk-counter));

An indicator indicating a handover, cell group addition, or cell group modification (for example, a ReconfigurationWithSync indicator or a mobilitycontrollnfo indicator);

First channel measurement configuration information for each cell or bandwidth part;

Second channel measurement configuration information for each cell or bandwidth part;

An indicator that adds the cell group configuration or an indicator (ReconfigurationWithSync) that indicates the cell group change or an indicator (ReconfigurationWithSync or newly defined indicator) that indicates a random access procedure;

An indicator (ReconfigurationWithSync or newly defined indicator) that indicates whether to activate the cell group by performing the random access procedure or to activate the cell group without the random access procedure when the cell group is activated;

Radio resource management (RRM) configuration information or frequency measurement configuration information, or Separate RRM configuration information or frequency measurement configuration information (e.g., frequency measurement configuration information (reduced or relaxed RRM configuration information) simplified for battery saving) to be applied or performed when the cell group is deactivated;

Configuration information for radio link monitoring (RLM) or configuration information for RLM to be applied or performed when the cell group is deactivated. For example, the configuration information for the RLM may be beam configuration information in the unit of a cell or beam configuration information for each bandwidth part to be measured by the UE when the cell group is deactivated, and may include beam-related configuration information (transmission configuration indication (TCI) state or quasi co-location (QCL)), or may include a timing advance (TA) value (or an offset value) for synchronization with a downlink signal or an uplink signal of the base station, a time alignment timer (TAT) indicating effectiveness of the TA value or a TAT value, or may include synchronization signal block (SSB) configuration information that becomes the target of measurement, channel state information reference signal (CSI-RS) configuration information, reference signal (RS) configuration information, or may include transmission resource information (e.g., PUCCH configuration information (e.g., scheduling request (SR) information or specific transmission resource) or frequency transmission resource or time transmission resource) that can report the result when a beam failure occurs. Further, the configuration information may include the bandwidth part configuration information (e.g., may be indicated as a bandwidth part identifier) indicating in which bandwidth part the RLM procedure is to be performed. As another method, when the cell group is in the deactivated state, the UE may minimize a cell group activation delay by performing the RLM procedure in the first activated bandwidth part (or first activated downlink bandwidth part (firstActiveDownlinkBWP-ID)) configured in the RRC message and by early monitoring the first activated bandwidth part to be activated when the cell group is activated. As still another method, in case that the cell group is configured in the deactivated state (or activated state), the UE may continuously maintain the connection state with the cell group (e.g., in case that the bandwidth part configuration information indicating in which bandwidth part the RLM procedure is to be performed is not configured) by performing the RLM procedure in the finally (or previously) activated bandwidth part before the cell group is deactivated, whereas in case that the cell group is activated, the UE may perform the activation procedure in the first activated bandwidth part (or first activated downlink bandwidth part (firstActiveDownlinkBWP-ID)) configured in the RRC message. If the bandwidth part related configuration information indicating in which bandwidth part the RLM procedure is to be performed is not configured when the cell group is activated, the RLM procedure may be performed in the finally (or previously) activated bandwidth part. Further, the configuration information may include the beam-related configuration information (e.g., may be indicated as the bandwidth part identifier or TCI state or QCL configuration information) indicating in which beam the RLM procedure is to be performed. As still another method, when the cell group is in the deactivated state, the UE may minimize the cell group activation delay by performing the RLM procedure in the beam (e.g., TCI state or QCL configuration information) configured in the RRC message and by activating the beam, performing the RLM procedure, and early monitoring the beam to be activated when the cell group is activated. As still another method, in case that the cell group is configured in the deactivated state (or activated state), the UE may continuously maintain the connection state with the cell group (e.g., in case that the beam-related configuration information indicating in which beam the RLM procedure is to be performed is not configured) by performing the RLM procedure in the finally (or previously) activated beam before the cell group is deactivated, whereas in case that the cell group is activated, the UE may perform the activation procedure in the beam configured in the RRC message. If the beam-related configuration information indicating in which beam the RLM procedure is to be performed is not configured when the cell group is activated, the RLM procedure may be performed in the finally (or previously) activated beam;

Configuration information for a beam failure detection procedure or beam failure detection (BFD) or configuration information for the BFD that may be applied or performed when the cell group is deactivated. For example, the configuration information may be beam configuration information in the unit of a cell or beam configuration information for each bandwidth part that may be measured by the UE when the cell group is deactivated, and may include beam-related configuration information (e.g., transmission configuration indication (TCI) state or quasi co-location (QCL)). Further, the configuration information may include a timing advance (TA) value (or an offset value) for synchronization with a downlink signal or an uplink signal of the base station, a time alignment timer (TAT) indicating effectiveness of the TA value, or a TAT value. Further, the configuration information may include synchronization signal block (SSB) configuration information that becomes the target of measurement, channel state information reference signal (CSI-RS) configuration information, reference signal (RS) configuration information, or transmission resource information (e.g., PUCCH configuration information (e.g., scheduling request (SR) information or specific transmission resource) or frequency transmission resource or time transmission resource) that can report the result when the beam failure occurs. Further, the configuration information may include the bandwidth part configuration information (e.g., may be indicated as a bandwidth part identifier) indicating in which bandwidth part the beam failure detection procedure is to be performed. As another method, when the cell group is in the deactivated state, the UE may minimize a cell group activation delay by performing the beam failure detection procedure in the first activated bandwidth part (or first activated downlink bandwidth part (firstActiveDownlinkBWP-ID)) configured in the RRC message and by early monitoring the first activated bandwidth part to be activated when the cell group is activated. As still another method, in case that the cell group is configured in the deactivated state (or activated state), the UE may continuously maintain the connection state with the cell group (e.g., in case that the bandwidth part configuration information indicating in which bandwidth part the beam failure detection procedure is to be performed is not configured) by performing the beam failure detection procedure in the finally (or previously) activated bandwidth part before the cell group is deactivated, whereas in case that the cell group is activated, the UE may perform the activation procedure in the first activated bandwidth part (or first activated downlink bandwidth part (firstActiveDownlinkBWP-ID)) configured in the RRC message. If the bandwidth part related configuration information indicating in which bandwidth part the beam failure detection procedure is to be performed is not configured when the cell group is activated, the beam failure detection procedure may be performed in the finally (or previously) activated bandwidth part. Further, the configuration information may include the beam-related configuration information (e.g., may be indicated as the bandwidth part identifier or TCI state or QCL configuration information) indicating in which beam the beam failure detection procedure is to be performed. As still another method, when the cell group is in the deactivated state, the UE may minimize the cell group activation delay by performing the beam failure detection procedure in the beam (e.g., TCI state or QCL configuration information) configured in the RRC message and by early monitoring the beam to be activated when the cell group is activated. As still another method, in case that the cell group is configured in the deactivated state (or activated state), the UE may continuously maintain the connection state with the cell group (e.g., in case that the beam-related configuration information indicating in which beam the beam failure detection procedure is to be performed is not configured) by performing the beam failure detection procedure in the finally (or previously) activated beam before the cell group is deactivated, whereas in case that the cell group is activated, the UE may perform the activation procedure in the beam configured in the RRC message. If the beam-related configuration information indicating in which beam the beam failure detection procedure is to be performed is not configured when the cell group is activated, the beam failure detection procedure may be performed in the finally (or previously) activated beam;

In the message, in order to efficiently perform a dual-connection technology configuration procedure (or SCG configuration procedure) or a handover procedure, a first timer (e.g., T304), a second timer (e.g., T310), a third timer (e.g., T312), or a fourth timer (e.g., timer for fallback) may be introduced and configured in the message. The timer is provided to be driven and applied in the dual-connection technology configuration procedure or the handover procedure. As described above, the first timer (e.g., T304) is a timer for determining whether the dual-connection technology configuration procedure or the handover procedure has been successfully performed, and the second timer (e.g., T310) is a timer for determining whether the wireless connection is effective. The third timer (e.g., T312) is an auxiliary timer for determining whether the wireless connection is effective, and is a timer for triggering the frequency measurement procedure and reporting the result of the frequency measurement. Further, the fourth timer (e.g., timer for fallback) is a timer that is introduced to attempt the cell group activation by performing a fallback procedure through a random access procedure (general random access procedure (4-step random access procedure or 2-step random access procedure)) in case that the activation of the cell group (or SCG or PSCell) has failed (i.e., the timer has expired) without the random access procedure provided in the disclosure. The fourth timer may be the first timer, and the first timer may be used as the timer for the fallback; and SDAP layer device configuration information (sdap-config).

The disclosure proposes to include the indicator indicating the handover, cell group addition, or cell group modification (for example, the ReconfigurationWithSync indicator or the mobilitycontrolInfo indicator) if the RRC message (for example, RRCReconfiguration message) includes an indicator indicating resume of the cell group or configuration information configuring the cell group, and not to include the indicator indicating the handover, cell group addition, or cell group modification if the RRC message includes the indicator indicating suspension (or deactivation) of the cell group. This is because, when the cell group is resumed, the connection with the corresponding cell group may be made again, and thus synchronization may be performed, system information may be received, or the random access procedure may be performed as necessary. For example, in case that the base station configures the cell group of the UE in the deactivated state through the RRC message, the base station may enable the UE not to perform an unnecessary synchronization procedure, connection procedure, or random access procedure by limiting the cell group of the UE not to configure the cell group additional indicator, a cell group change indicator, an indicator indicating the random access procedure, or a ReconfigurationWithSync indicator together.

As described above, when the UE is connected to an NR or E-UTRA connected to 5GC through the SDAP configuration information (sdap-config), the base station may configure information for determining how to perform mapping of a QoS flow and a DRB, or may configure existence/nonexistence of an SDAP header for the uplink or the downlink.

In case that the RRC message includes configuration information (or indicator) for configuring a cell group (or secondary cell group) in the deactivated state, or in case that the cell group is configured in the deactivated state, the RRC message may limit the cell group (or DRB belonging to the cell group) to be unable to reconfigure the SDAP configuration information (e.g., information for determining how to perform the mapping of the QoS flow and the DRB). This is because in case of reconfiguring the QoS flow, an end marker may be transmitted to an SDAP control PDU, and due to this, the SDAP control PDU may be transmitted from the deactivated cell group. Further, in the SDAP configuration information, a default DRB (this may be a default DRB configured through the RRC message, and may be configured as the DRB for transmitting data of the QoS flow having no QoS flow mapping information) may be made not to be configured as the DRB that belongs to the cell group (e.g., SCG or secondary cell group or PSCell) that is deactivated. This is because in case of transmitting data of the QoS flow having no QoS flow mapping information, the data may be transmitted through the default DRB, and in this case, if the cell group is configured in the deactivated state, the data is unable to be transmitted (or the UE may unnecessarily perform a request for activation of the cell group).

For example, if the RRC message includes configuration information (or indicator) for configuring the cell group (or secondary cell group) in the deactivated state, or if the cell group is configured to be in the deactivated state, the SDAP configuration information (or information for determining how to perform the mapping of the QoS flow and the DRB) may not be configured (or may not exist). As another method, in order for the base station to reconfigure the SDAP configuration information (or information for determining how to perform the mapping of the QoS flow and the DRB) of the UE, the base station may transmit the RRC message for reconfiguring the SDAP configuration information (or information for determining how to perform the mapping of the QoS flow and the DRB) to the UE before the cell group is deactivated (or before the RRC message including the indicator (or cell group state information) for deactivating the cell group is transmitted), and then may include the indicator (or cell group state information) for deactivating the cell group in the next RRC message to be transmitted to the UE.

As still another method, in case that the RRC message includes the configuration information (or indicator) for configuring the cell group (or secondary cell group) in the deactivated state, or the cell group is configured to be in the deactivated state, if the SDAP configuration information (or information for determining how to perform the mapping of the QoS flow and the DRB) is reconfigured, the data or the SDAP control PDU generated in the SDAP layer device may be transmitted, and then the cell group may be deactivated, or the UE may trigger (or perform) a request procedure for requesting the activation of the cell group.

Hereinafter, the disclosure newly proposes the dormant BWP in the next-generation mobile communication system and proposes in detail the UE operation in each BWP when each BWP is transitioned or switched.

Figure 7:
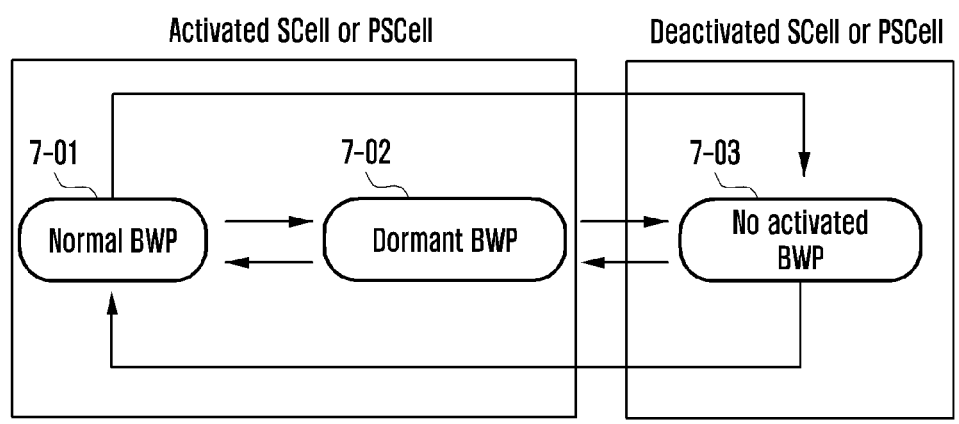
FIG. 7 illustrates an example of a bandwidth part state transition or bandwidth part switching procedure according to an embodiment of the present disclosure.

FIG. 7 illustrates state transition for each BWP or a BWP switching procedure according to an embodiment of the present disclosure.

Referring to FIG. 7, the BWP of each cell (for example, SCell) of the UE may be activated to a normal BWP as indicated by reference numeral 7-01, activated to a dormant BWP as indicated by reference numeral 7-02, or deactivated as indicated by reference numeral 7-03, and the normal BWP or the dormant BWP may be activated or deactivated through an indication by configuration information of the RRC message, MAC control information, or DCI of the PDCCH.

The state transition operation for each BWP of the cell (activation, deactivation, or hibernation) or the operation of activating the normal BWP, activating the dormant BWP, activating the first active BWP activated from the dormant state, or deactivating the normal BWP or the dormant BWP may be performed by one indication or configuration among the following cases:

If the state of the BWP of the cell is configured through the RRC message, the BWP of each cell is configured through RRC message, the dormant BWP is configured in the cell, or the first active BWP is configured as the dormant BWP, the cell may start through switching or activation to the dormant BWP and operation in the dormant BWP may be performed;

The case in which cell activation, deactivation, or dormant MAC CE is received;

The case in which a MAC CE indicating activation or deactivation of the normal BWP or the first active BWP or the dormant BWP from the dormant state is received;

The case in which DCI of a PDCCH indicating activation, deactivation, or switching of the normal BWP or the first active BWP or the dormant BWP from the dormant state is received;

The case in which a cell hibernation timer is not configured in an activated state cell and a configured cell deactivation timer expires; and/or The case in which a BWP hibernation timer is not configured in the active BWP and a configured BWP deactivation timer (for example, a bwpDeactivatedTimer) expires.

Further, the state transition operation or the dormant BWP operation method provided in the disclosure have the following features:

No dormant BWP may be configured in the Spcell (Pcell or Pscell) (or downlink BWP or uplink BWP of the cell) but only a normal BWP is configured therein and is always in an activated state. The Spcell performs synchronization and transmits/receives a primary control signal, and thus if the BWP of the Spcell is dormant or inactive or operated as the dormant BWP, the connection with the NR base station is released, so that the Spcell may be always maintained in the activated state;

If a PUCCH is configured in spite of the Scell or the BWP of the SCell, a dormant state or a dormant BWP cannot be configured. The Scell may be in the activated state or use a normal BWP after activating the same since there may be another cell which may transmit a feedback of HARQ ACK/NACK through the PUCCH;

Due to such a characteristic, the cell deactivation timer (ScellDeactivationTimer) or the BWP hibernation timer may not be applied to the Spcell or the BWP of the Spcell and the Scell or the BWP of the SCell in which the PUCCH is configured, and may be driven only for the other Scells;

The cell or BWP hibernation timer (ScellHibernationTimer) is prioritized than the cell or BWP deactivation timer (ScellDeactivationTimer). If one value is set as a timer value through the RRC message, the same value may be applied to all cells. In another method, the NR gNB may configure different timer values for Scells or BWPs in consideration of the characteristics of each Scell or BWP; and/or.

If the cell or BWP is not indicated as being active or dormant through the RRC message, the Scell or BWP may fundamentally operate in the deactivated state initially.

In the disclosure, the uplink may indicate an uplink BWP and the downlink may indicate a downlink BWP. This is because only one active or dormant BWP can be operated for each uplink or downlink.

According to an embodiment of the disclosure, the activated state, the deactivated state, or the dormant state are operated and cell or BWP transition or switching is performed in units of BWPs. When state transition or switching is performed in units of BWPs, a BWP indicated to have state transition or switching (a downlink BWP or an uplink BWP) is transitioned or switched according to an indication of state transition or switching. For example, if a BWP (a downlink or uplink BWP) is transitioned from an activated state to a dormant state or switched to a dormant BWP (or activated), the BWP may be transitioned to the dormant state or switched to the dormant BWP (or activated).

In the disclosure, BWP switching means that, if BWP switching is indicated by a BWP ID through PDCCH DCI while downlink assignment is allocated, the downlink BWP is switched to a BWP indicated by the BWP ID, and if BWP switching is indicated with a BWP identifier through PDCCH DCI while a UL grant is allocated, the uplink BWP is switched to a BWP indicated by the BWP ID. The UE operation follows a DCI format although description for the uplink and the downlink is not separated since PDCCH DCI formats are different for the downlink assignment (format1) and the UL grant (format0).

The method of operating the state transition in units of BWPs (BWP levels) and the operation of the BWP according to each state provided in the disclosure may be expanded and applied to various embodiments. Hereinafter, the disclosure describes detailed embodiments for expanding and applying the content provided in the disclosure.

Figure 8:
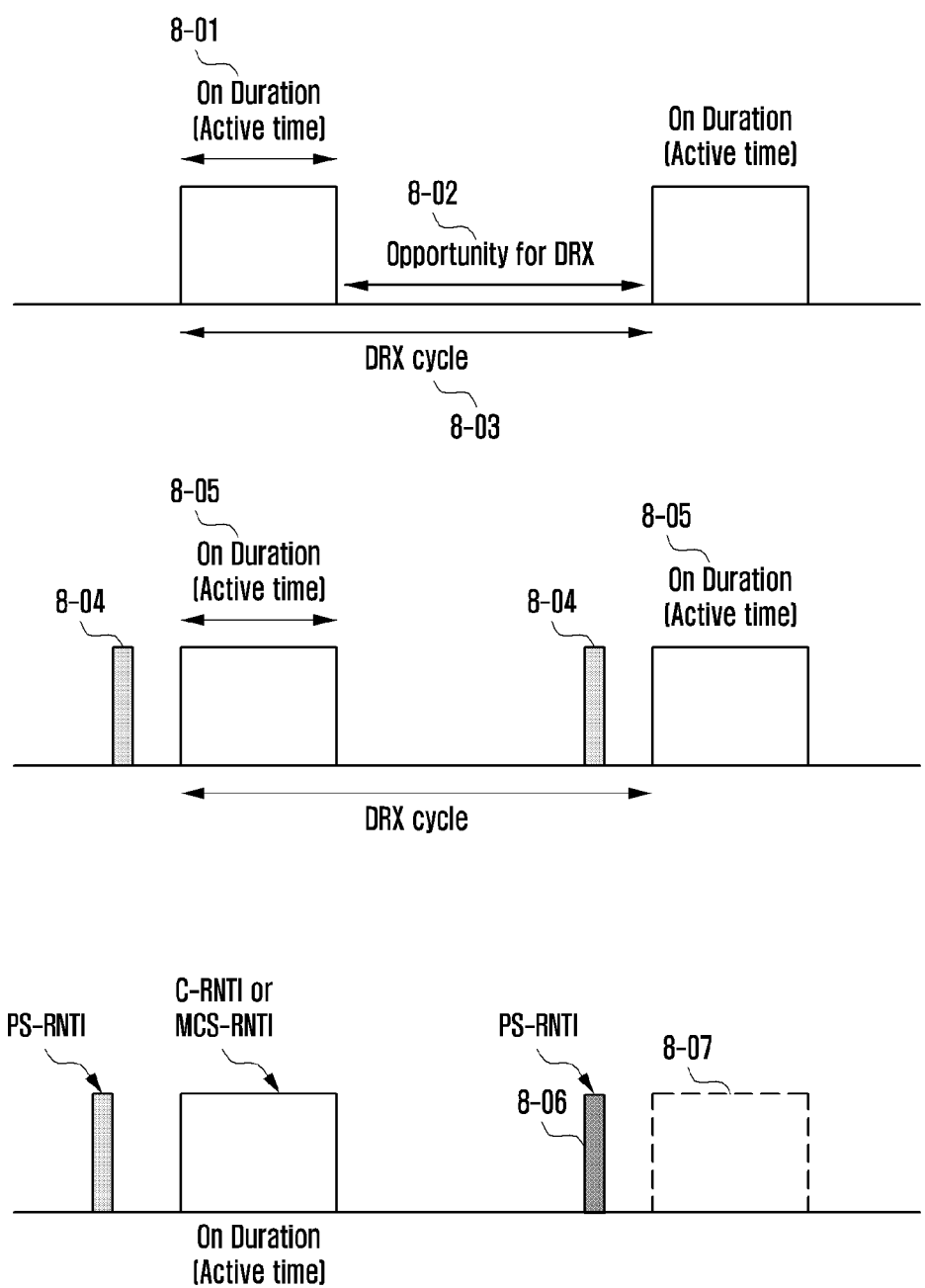
FIG. 8 illustrates a DRX configuration or DRX operation method that can save a battery of a UE according to an embodiment of the present disclosure.

FIG. 8 illustrates a method of configuring or operating DRX to save a UE battery according to an embodiment of the present disclosure.

Referring to FIG. 8, the base station may configure a DRX function such as a DRX cycle, a start point, an offset, or on-duration (active time) in the PCell, the SCell, or the PSCell for the UE through the RRC message as illustrated in FIG. 6. The disclosure considers configuration of the DRX function in the PCell, SpCell, or the PSCell.

As described above, if the DRX function is configured in the PCell (SpCell or PSCell), the UE may consider a DRX cycle 8-03, a DRX start time, or an offset to apply the DRX function. When the DRX function is applied, the UE may monitor a PDCCH or DCI of the PDCCH which can be received from the base station in the PCell only within the active time (or on-duration) 8-01 of the DRX. Further, the UE does not need to monitor the PDCCH or the DCI of the PDCCH outside the active time 8-02 of the DRX function, thereby reducing UE battery consumption.

In FIG. 8, the base station may configure a power saving function (power saving mode) in the UE through the RRC message in order to further reduce battery consumption of the UE. When the power saving function is configured along with the DRX function, the PDCCH is monitored outside the active time during a short time interval 8-04 configured through RRC before the active time 8-01 in which the UE may monitor the PDCCH, and a Wake Up Signal (WUS) is monitored and received outside the active time. The base station may indicate whether the UE may monitor the PDCCH or not in the next active time 8-05 or 8-07 through a bit of the DCI of the PDCCH of the WUS That is, the UE in which the power saving function or the DRX function is configured may monitor the WUS during the short time interval 8-04 configured in the RRC message before the active time 8-05. If a bit value of the DCI of the PDCCH for the next active time 8-05 or 8-07 is 0 (or 1) in the WUS, the bit value may indicate that the UE does not monitor the PDCCH within the next active time 8-07 or indicate that the UE does not monitor the PDCCH by not driving a timer corresponding to the next active time in the MAC layer device. If the bit value of the DCI of the PDCCH for the next active time 8-05 or 8-07 is 1 (or 0) in the received WUS, the bit value may indicate that the UE monitors the PDCCH within the next active time 8-05 or may indicate that the UE monitors the PDCCH by driving a timer corresponding to the next active time in the MAC layer device.

Further, the UE may not monitor the WUS or the PDCCH for searching for the WUS within the active time.

When the UE in which the power-saving function or the DRX function is configured monitors the WUS during a short time interval 8-04 configured in the RRC message before the active time 8-05, the UE may identify the PDCCH by a first RNTI (for example, PS-RNTI) to detect a signal. The first RNTI (for example, the PS-RNTI) 8-06 may be configured in a plurality of UEs, and the base station may indicate simultaneously whether to monitor the PDCCH within the next active time to the plurality of UEs through the first RNTI (for example, PS-RNTI).

When monitoring and detecting the PDCCH in the active time 8-05, the UE in which the power-saving function or the DRX function is configured may detect a signal on the basis of a second RNTI (for example, a C-RNTI), a third RNTI (for example, an MCS-C-RNTI), or a fourth RNTI (SPS-C-RNTI) uniquely configured in the UE through the RRC message. The second RNTI (for example, C-RNTI) may be used to indicate general UE scheduling, the third RNTI (for example, MCS-C-RNTI) may be used to indicate a modulation and coding scheme of the UE, and the fourth RNTI (SPS-C-RNTI) may be used to indicate periodic transmission resources of the UE.

Based on the method provided in FIG. 8 as above, the base station may instruct the UE to activate, deactivate, or rest the cell or the cell group of the UE through the DCI of the PDCCH in an activation time 8-05 or in a short time interval 8-04 configured in the RRC message. Further, the UE may perform a monitoring procedure of the PDCCH in order to receive the instructions for the state of the cell or cell group in the activation time 8-05 or in the short time interval 8-04 configured in the RRC message.

In case that the dual-connection technology is configured to the UE, the UE may monitor the PDCCH in the activation time 8-05 or in the short time interval 8-04 configured in the RRC message in the PCell of the MCG. The DCI of the PDCCH may include instructions for the activated, deactivated, or dormant state with respect to the cell (SCell) of the MCG or the PSCell (or SCell) of the SCG, and the UE may perform the corresponding cell (or bandwidth part) activation procedure, deactivation procedure, dormant procedure, or bandwidth part switching procedure. That is, the base station may instruct the UE on the activated, deactivated, or dormant state with respect to the cell (SCell) of the MCG or the PSCell (or SCell) of the SCG through the DCI of the PDCCH in the activation time 8-05 or in the short time interval 8-04 configured in the RRC message in the PCell of the MCG.

Figure 9:
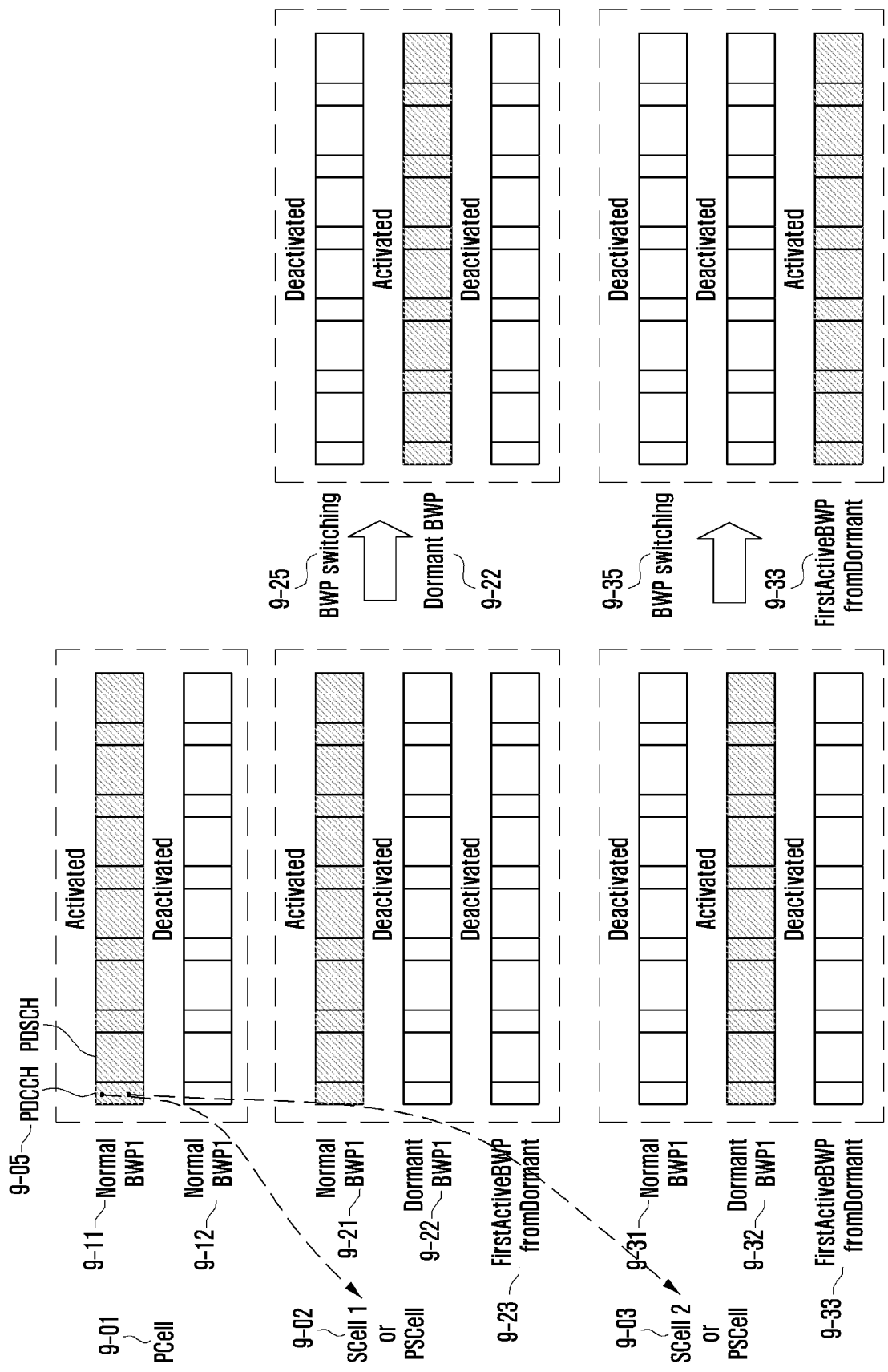
FIG. 9 illustrates a method in which an activated SCell or PSCell operates a dormant bandwidth part according to an embodiment of the present disclosure.

FIG. 9 illustrates a method of operating a dormant BWP in an activated SCell or PSCell according to an embodiment of the present disclosure.

As in FIG. 6, the base station may configure a plurality of SCells in the UE through the RRC message for carrier aggregation, allocate respective SCell identifiers, configure a dormant BWP for each SCell. Alternatively, the base station may configure a plurality of cell groups for dual connectivity, allocate a cell group identifier, configure or indicate a cell group suspension indicator for each cell group or a PSCell of each cell group, or configure a dormant BWP. Further, the plurality of SCells may be included in each SCell, and one SCell group may include a plurality of SCells. An SCell group identifier may be allocated to each SCell group, and a plurality of SCell identifier may be included in or mapped to each SCell group identifier. An SCell identifier value or an SCell group identifier value may be allocated as a predetermined bit value and have an integer value (or a natural number value). Alternatively, the PSCell of each cell may be indicated by a cell group identifier.

Referring to FIG. 9, the base station may define a new bitmap in DCI of the PDCCH transmitted in the PCell, perform mapping such that each bit value of the bitmap indicates each SCell identifier value, each SCell group identifier value, a cell group (or secondary cell group) identifier, or a PSCell (or SCell) of a cell group, define each bit value, and indicate whether to switch an SCell corresponding to the bit, SCells belonging to an SCell group, a cell group (or secondary cell group), a PSCell (or SCell) of the cell group (or secondary cell group) to a dormant BWP, activate the dormant BWP, or whether to suspend or resume the cell group. Further, the base station may indicate whether to switch the SCell corresponding to the bit, SCells belonging to the SCell group, a cell group (or secondary cell group) identifier, or a PSCell (or SCell) of the cell group (or secondary cell group) from the dormant BWP to the normal BWP (for example, a first active BWP activated from the dormant state) or activate the normal BWP (for example, a first active BWP activated from the dormant state).

Referring to FIG. 9, after receiving DCI of the PDCCH in the PCell 9-01, while reading the DCI, the UE may identify whether there is a bitmap including an indication for an SCell or a BWP of SCell groups (for example, switching or activation to a dormant BWP or switching or activation to a normal BWP) or an indication indicating suspension or resumption of a cell group (or secondary cell group) or a PSCell (or SCell) of the cell group (or secondary cell group). When there is the bitmap, the UE may switch or activate the BWP or suspend or resume the cell group according to the bit value for an SCell corresponding to each bit of the bitmap, SCells 9-02 and 9-03 belonging to an SCell group, a cell group (or secondary cell group), or a PSCell (or SCell) of the cell group (or secondary cell group).

For example, when the bit of the bitmap indicates a first SCell 9-02 (or a first SCell identifier), a cell group (or secondary cell group), or a PSCell (or SCell) of the cell group (or secondary cell group), indicates an SCell group including the first SCell (or an SCell group identifier), and the bit value is 0 (or 1), the UE may activate a BWP 9-21 to a dormant BWP 9-22 for the first SCell 9-02, the cell group (or secondary cell group), or the PSCell (or SCell) of the cell group (or secondary cell group), switch the current BWP to the dormant BWP 9-22, or switch the current BWP to the dormant BWP 9-22 and, when the current BWP is not the dormant BWP, switch or activate the currently activated BWP 9-21 to the dormant BWP 9-22 as indicated by reference numeral 9-25 or suspend or deactivate the cell group in BWP 9-23.

In another method, it is possible to reducing UE power consumption by maintaining the cell group (or secondary cell group) or the BWP of the PSCell (or SCell) of the cell group (or secondary cell group), applying the second DRX configuration information or second SRS configuration information provided in the disclosure, and performing PDCCH monitoring according to a long period or performing SRS transmission according to a long period.

Referring to FIG. 9, after receiving DCI of the PDCCH in the PCell 9-01, while reading the DCI, the UE may identify whether there is a bitmap including an indication for an SCell or a BWP of SCell groups (for example, switching or activation to a dormant BWP or switching or activation to a normal BWP) or an indication indicating suspension or resumption of a cell group (or secondary cell group) or a BWP of a PSCell (or SCell) of the cell group (or secondary cell group)

When there is the bitmap, the UE may switch or activate the BWP or suspend or resume the cell group according to the bit value for an SCell indicated by each bit of the bitmap, SCells 9-02 and 9-03 belonging to an SCell group, a cell group (or secondary cell group), or a PSCell (or SCell) of the cell group (or secondary cell group). For example, when the bit of the bitmap indicates a second SCell 9-03 (or a second SCell identifier), indicates an SCell group (or an SCell group identifier) including the second SCell, and the bit value is 1 (or 0), if the currently activated BWP for the second SCell 9-03 is a dormant BWP 9-32, the currently activated BWP is not a normal BWP, the current BWP (or cell) is activated, and the current BWP is activated to the dormant BWP 9-32 (or activated to a BWP which is not the normal BWP), the UE may switch or activate the BWP of the second SCell 9-03 to a BWP 9-33 (for example, a first active BWP activated from the dormant state) configured through the RRC message as indicated by reference numeral 9-35 or suspend or activate the cell group.

When the bit value is 1 (or 0) and thus an SCell indicated by the bit, SCells belonging to an SCell group, a cell group (or secondary cell group), or a PSCell (or SCell) of the cell group (or secondary cell group) may be switched or activated to a BWP which is not a dormant BWP or when the cell group may be resumed, if the state of the SCell is the deactivated state or if the state of the SCell is the activated state among the SCell or the SCells belonging to the Scell group and the activated BWP is not the dormant BWP (or is the normal BWP), the bit value may not be applied, may be ignored, or may not be read and, if the cell group (or secondary cell group) or the PSCell (or SCell) of the cell group (or secondary cell group) is already in the activated state or the resumed state, the bit value may be applied, may be ignored, or may not be read.

Further, when the bit value is 0 (or 1) and thus an SCell indicated by the bit, SCells belonging to an SCell group, a cell group (or secondary cell group), or a PSCell (or SCell) of the cell group (or secondary cell group) may be switched or activated to a dormant BWP or when the cell group may be suspended, if the state of the SCell is the activated state among the SCell or the SCells belonging to the Scell group and the activated BWP is the dormant BWP, the bit value may not be applied, may be ignored, or may not be read and, if the cell group (or secondary cell group) or the PSCell (or SCell) of the cell group (or secondary cell group) is already in the suspended state or the deactivated state, the bit value may be applied, may be ignored, or may not be read.

Hereinafter, the disclosure proposes methods for quickly activating a cell (SCell or PSCell or SCell) during the cell activation.

Specifically, the base station may configure first channel measurement configuration information for quickly measuring and reporting the channel when the UE activates the cell in the RRC message (RRCReconfiguration or RRCResume).

In order for the base station to transmit the channel measurement signal temporarily much or frequently so as to quickly perform the channel measurement in the cell through the configuration information of the cell (e.g., PCell or PSCell or SCell) of the cell group for quick activation of the cell or the cell group, the first channel measurement configuration information may include periods for frequent channel measurement signals (e.g., radio resource, temporary reference signal (TRS), synchronization signal block (SSB), channel state information reference signal (CSI-RS), or reference signal (RS)), transmission resource information being transmitted (frequency where the frequent channel measurement signals are transmitted or time transmission resource), an interval or the number of times (the number of times of transmission of the frequent channel measurement signals), a timer value (time for transmission of the frequent channel measurement signal), a time interval (interval at which the frequent channel measurement signals are transmitted (e.g., an offset of the time unit (slot or subframe or symbol))), or configuration information, such as a transmission resource, a period, an interval, the timing, or an offset, for which the UE may report the measurement result.

As described above, the first channel measurement configuration information may be featured to shorten the report period (or transmission resource) in which the UE can report the channel measurement result and to configure the transmission resource for the channel measurement so that the base station can much or frequently transmit many channel measurement signals (or transmission resources (e.g., radio resources or temporary reference signals (TRS)) in order for the base station to support the quick channel measurement or many signal measurements of the UE.

As described above, the first channel measurement configuration information may include configuration information about the channel measurement signal of the base station for a specific UE (or UEs) in the cell or the bandwidth part. Further, the first channel measurement configuration information may be differently configured for each cell or bandwidth part with respect to a plurality of cells or bandwidth parts being configured through the RRC message, and may be configured together with beam-related configuration information (e.g., transmission configuration indication (TCI) state or quasi co-location (QCL)), such as a beam direction, a beam number, or a beam location, in order to support the UE to easily measure the transmission resource for the channel measurement.

Further, the first channel measurement configuration information may include a timing advance (TA) value (or an offset value) for synchronization with a downlink signal or an uplink signal of the base station, or a time alignment timer (TAT) indicating effectiveness of the TA value or a TAT value, and by configuring the above-described values, the first channel measurement configuration information may enable the UE to correctly perform the channel measurement or the channel measurement report. For example, the first channel measurement configuration information may include a period of the channel measurement signal, the number of times of transmitted signals, a signal transmission period, an offset for a signal transmission time, a time duration between transmitted signals, a list of a plurality of channel measurement signals that can be transmitted, a time transmission resource (or frequency transmission resource) representing the location of the transmitted signal, a transmission resource (time transmission resource or frequency transmission resource) to report the measurement result, a period to report the measurement result, or beam-related configuration information (e.g., transmission configuration indication (TCI) state or quasi co-location (QCL)) for measurement of the channel measurement signals.

Further, the first channel measurement configuration information configured through the RRC message as described above may include a plurality of pieces of channel measurement signal information, and the first channel measurement configuration information may enable the UE to perform the channel measurement or the channel measurement report by applying or using the indicated channel measurement signal information or beam configuration information through indication of one of the plurality of pieces of channel measurement signal information or the beam configuration information that is configured as above through the RRC message, the MAC CE, or the DCI. The above indication method may define mapping of a bitmap, an index, or an identifier onto the channel measurement signal information configured as above, and may indicate the same based on this. As another method, the UE may be enabled to perform the channel measurement or the channel measurement report by applying or using the configured (or indicated) channel measurement signal information through configuration or indication of the channel measurement signal information through the RRC message or the MAC CE.

As still another method, in case that the RRC message indicates to activate the cell through the RRC message through configuration of the cell in the activated state when the RRC message including the first channel measurement configuration information is configured to the UE, the cell may be quickly activated through quick measurement or report of the channel by applying or using the first channel measurement configuration information. For example, in case that the first channel measurement configuration information that can be applied when the RRC message indicates to activate the cell through the RRC message through configuration of the cell in the activated state, the channel measurement signal information, or the beam-related configuration information is configured as separate configuration information (default configuration) in the RRC message, or in case that only one piece of channel measurement signal information (or beam-related configuration information) corresponding to identifier 0 is configured, the channel measurement signal information (or beam-related configuration information) may be applied.

The first channel measurement configuration information provided in the disclosure can be configured only with respect to the downlink bandwidth part configuration information of each cell. That is, the first channel measurement configuration information provided in the disclosure may not be configured with respect to the uplink bandwidth part configuration information of each cell. This is because the UE may first measure the channel with respect to the downlink in order for the UE to correctly receive a PDCCH and to follow the instructions of the base station after reporting the measurement result for the channel or the cell.

The first channel measurement configuration information provided in the disclosure may be featured to be initially deactivated when being configured through the RRC message or after a handover, and thereafter, the first channel measurement configuration information may be activated by MAC control information provided in the disclosure, DCI information of the PDCCH, or the RRC message. In case that the first channel measurement configuration information is configured through the RRC message, the initial state of the first channel measurement configuration information may be a deactivated state in order for the base station to easily manage the UE cell state or channel measurement performing procedure and to correctly determine the timing in which when and how the UE performs the channel measurement without the problem of the processing delay of the RRC message.

Further, second channel measurement configuration information may be included or configured in the RRC message (RRCReconfiguration or RRCResume). The second channel measurement configuration information may include general channel measurement configuration information, such as the transmission resource of the channel measurement signal, the period, the time interval, the number of times, the transmission resource for the channel measurement report, the period, or the time interval.

Next, the disclosure proposes a structure of a MAC control element or an indication method that can quickly measure the channel based on the first channel measurement configuration information while activating the cell when the first channel measurement configuration information or the second channel measurement configuration information are configured to the UE through the RRC message as provided above, report the measurement result, or quickly activate the cell.

For example, the MAC control element (or RRC message) provided in the disclosure may indicate which cell is activated or deactivated among the plurality of cells (SCells) configured through the RRC, or in case of indicating which cell is activated, the MAC control element (or RRC message) may indicate which measurement signal information of the first channel measurement configuration information configured through the RRC message is applied, how the signal is measured (e.g., how many times the signal transmission resource is measured, how many signals are transmitted, at which time interval the measurement is performed, based on which offset the measurement time interval is determined, in which period the signal is measured, or on which transmission resource the signal is measured may be indicated), or how to report the measurement result (e.g., how many times the measurement result is reported, at which time interval the measurement result is reported, based on which offset the measurement result report transmission resource is determined, in which period the measurement result is reported, or on which transmission resource the measurement result is reported may be indicated), and thus can quickly activate the cell based on the first channel measurement configuration information configured through the RRC message.

Figure 10:
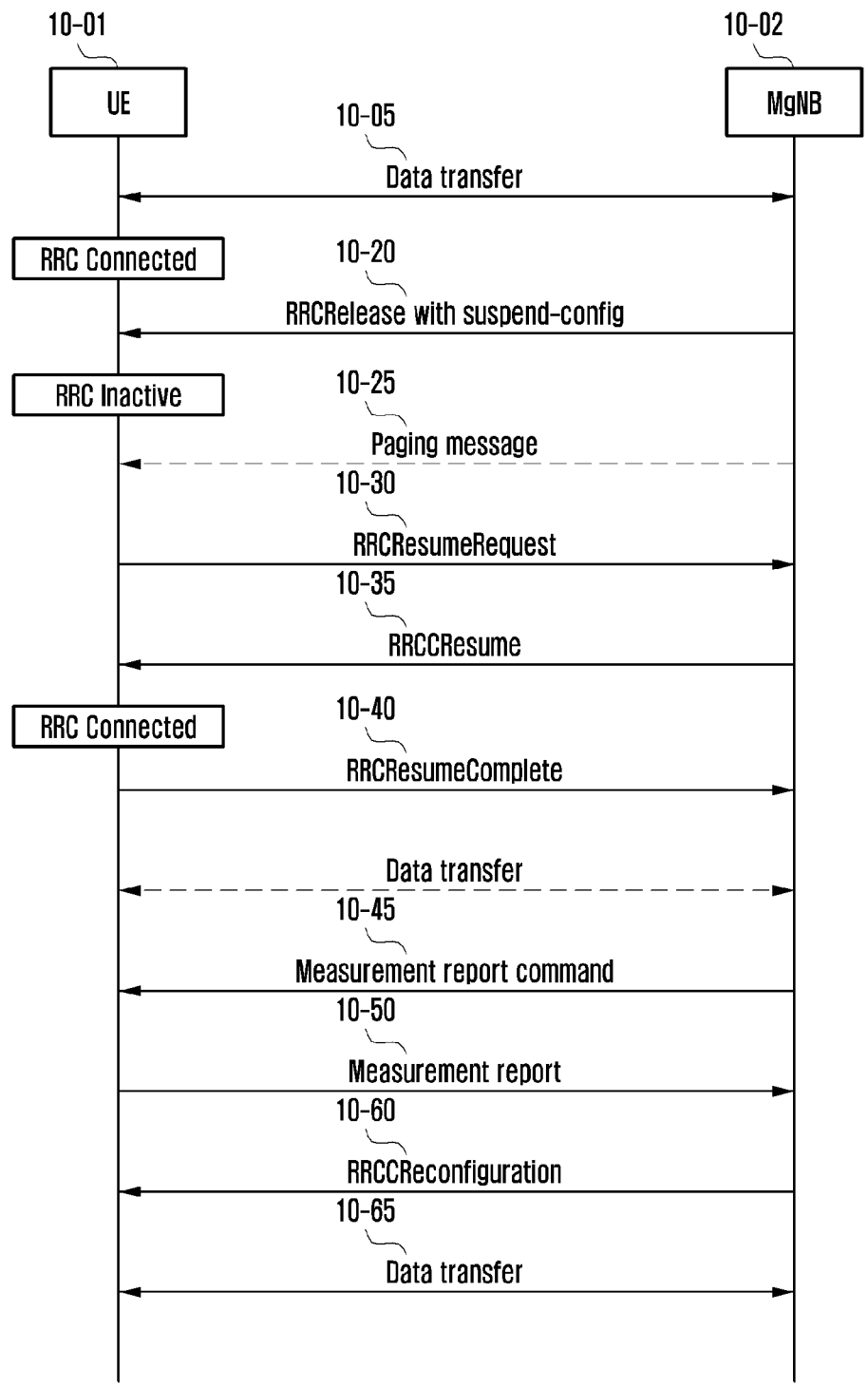
FIG. 10 illustrates an example of signaling procedure in an RRC inactive mode according to an embodiment of the present disclosure.

FIG. 10 illustrates an example of signaling procedures in an RRC inactive mode according to an embodiment of the present disclosure.

In the disclosure, the cell group or the cell may indicate a PCell of a master cell group (MCG), an SCell of the MCG, a PSCell of a secondary cell group (SCG), or an SCell of the SCG.

The embodiment proposes continuous storage of SCell configuration information (for example, the configuration information described or provided in FIG. 6) configured or stored for the above provided embodiments in the RRC-connected mode or PSCell (or SCell) configuration information of the cell group (for example, secondary cell group) as illustrated in FIG. 6 without releasing or discarding the configuration information even though the UE transitions to the RRC-inactive mode. Further, when performing an RRC connection resumption procedure, the UE in the RRC-inactive mode proposes determining whether to discard, release, maintain and apply, or reconfigure the stored SCell configuration information (for example, the configuration information described or provided in FIG. 6) or PSCell (or SCell) configuration information of the cell group (for example, secondary cell group) through an indicator of an RRCResume message or an RRCReconfiguration message transmitted by the base station or through a reconfiguration procedure.

When transmitting an RRCRelease message including a configuration or an indicator indicating transition to the RRC-inactive mode to the UE, the base station may also transmit an indicator or configuration information indicating whether to discard, release, maintain and apply, or reconfigure the SCell configuration information (for example, the configuration information described or provided in FIG. 6) or PSCell (or SCell) configuration information of the cell group (for example, secondary cell group) stored in the RRCRelease message to the UE. When updating an RAN Notification Area (RNA) while moving in the RRC-inactive mode, the UE may receive and apply an indicator or configuration information indicating whether to discard, release, maintain and apply, or reconfigure the SCell configuration information (for example, the configuration information described or provided in FIG. 6) or PSCell (or SCell) configuration information of the cell group (for example, secondary cell group) stored in the RRCRelease message transmitted from the base station to the UE.

In one embodiment provided in the disclosure, the base station may allow the configuration of a first active BWP of downlink or uplink BWP configuration information of each cell as a dormant BWP in the SCell configuration information (for example, the configuration information described or provided in FIG. 6) or PSCell (or SCell) configuration information of the cell group (for example, secondary cell group) of the RRC message and thus, when the UE activates each SCell, each cell group, or the PSCell of each cell group, the UE may directly operate each SCell, each cell group, or the downlink BWP or the uplink BWP of the PSCell of each cell group as the dormant BWP, thereby suspending or resuming the cell group and reducing UE battery consumption In one embodiment provided in the disclosure according to another method, the base station may not configure a first active BWP of downlink or uplink BWP configuration information of each cell as a dormant BWP in the SCell configuration information (for example, the configuration information described or provided in FIG. 6) or PSCell (or SCell) configuration information of the cell group (for example, secondary cell group) of the RRC message and thus, when the UE activates or resumes each SCell, each cell group, or the PSCell of each cell group, the UE may always activate each SCell, each cell group, or the downlink BWP or the uplink BWP of the PSCell of each cell group as the first active BWP and activate or switch to the dormant BWP by embodiments provided in the disclosure or suspend or resume the cell group, thereby reducing UE battery consumption.

Further, one embodiment provided above may be extended to configuration information of each SCell of a master cell group (MCG) or a secondary cell group (SCG) of the UE in which the dual connectivity is configured and then applied. That is, SCell configuration information or PSCell configuration information of the SCG may be stored when the UE transitions to the RRC-inactive mode, and an indicator or configuration information indicating whether to discard, release, maintain and apply, or reconfigure the SCell configuration information of the MCG or the SCG (for example, the configuration information described or provided in FIG. 6) or the PSCell configuration information stored in the RRC message (for example, RRCResume, RRCReconfiguration, or RRCRelease) may be included and transmitted to the UE when the RRC connection resumption procedure is performed or the UE transitions to the RRC-inactive mode.

Referring to FIG. 10, a UE 10-01 makes a network connection with an MgNB 10-02 and transmit and receive data in operation 10-05. If the MgNB needs to transition the UE to the RRC-inactive mode for a predetermined reason, the MgNB may transmit an RRCRelease message 10-20 to transition the UE to the RRC-inactive mode. The MgNB may transmit the indicator or configuration information indicating whether to discard, release, maintain and apply, or reconfigure the SCell configuration information of the MCG or the SCG (for example, the configuration information described or provided in FIG. 6) or PSCell (or SCell) configuration information of the cell group (for example, secondary cell group) stored in the RRC message (for example, RRCRelease) to the UE. In the case of the UE applying the dual connectivity, the MgNB may determine whether to stop or resume master cell group bearer configuration, RRC configuration information, or SCell configuration information of the MCG or the SCG, ask the secondary cell MgNB about whether to stop or resume the secondary cell group bearer configuration and the RRC configuration information, receive a response, and make a decision in operation. Further, the MgNB may configure a list of frequencies which the UE measures in the RRC-idle mode or the RRC-inactive mode, frequency measurement configuration information, or a period during which the frequency is measured in the RRCRelease message.

When the UE in the RRC-inactive mode receives a paging message during movement in operation 10-25, has a need to transmit uplink data, or has a need to update a RAN notification area, the UE may perform the RRC connection resumption procedure.

When the UE needs to configure the connection, the UE performs a random access procedure, and when an RRCResumeRequest message is transmitted to the MgNB, a provided UE operation related to transmission of the message is described below in operation 10-30.
1. The UE identifies system information and, when the system information indicates transmission of a complete UE connection resume identifier (I-RNTI or a full resume ID), prepares transmission by inserting the stored complete UE connection resume identifier (I-RNTI) into the message. If the system information indicates transmission of a truncated UE connection resume identifier (truncated I-RNTI or a truncated resume ID), the UE configures the stored complete UE connection resume identifier (I-RNTI) as the truncated UE connection resume identifier (truncated resume ID) through a predetermined method and prepares transmission by inserting the configured truncated UE connection resume identifier into the message.
2. The UE restores RRC connection configuration information and security context information from stored UE context.
3. The UE may update a new KgNB security key corresponding to a master cell group on the basis of a current KgNB security key, a NextHop (NH) value, and an NCC value received and stored in the RRCRelease message.
4. Upon receiving an SCG-counter value (or sk-counter) in the RRCRelease message, the UE may update a new SKgNB security key corresponding to a secondary cell group on the basis of the KgNB security key and the SCG-counter value (or sk-counter).
5. The UE may induce new security keys (K_RRCenc, K_RRC_int, K_UPint, and K_UPenc) to be used in an integrity protection and verification procedure and an encryption and decryption procedure using the newly updated KgNB security key.
6. Upon receiving the SCG-counter value (or sk-counter) in the RRCRelease message, the UE may induce new security keys (K_RRCenc, K_RRC_int, K_UPint, and K_UPenc) to be used in an integrity protection and verification procedure and an encryption and decryption procedure using the newly updated SKgNB security key corresponding to the secondary cell group.
7. The UE may prepare transmission by calculating a MAC-I and inserting the same into the message.
8. The UE may resume SRB1 (The UE may resume in advance since the UE may receive an RRCResume message through SRB1 in response to an RRCResumeRequest message to be transmitted).
9. The UE may configure the RRCResumeRequest message and transmits the same to a lower layer device.
10. The UE may resume the integrity protection and verification procedure by applying the updated security keys and a previously configured algorithm to all bearers except for SRB0 and then apply integrity verification and protection to transmitted and received data (This is to increase reliability and security of data transmitted and received from SRB1 or DRBs in the future).
11. The UE may resume the integrity protection and verification procedure by applying the updated security keys and a previously configured algorithm to all bearers except for SRB0 and then apply integrity verification and protection to transmitted and received data (This is to increase reliability and security of data transmitted and received from SRB1 or DRBs in the future).
12. Upon receiving the SCG-counter value (or sk-counter) in the RRCRelease message, the UE may resume the integrity protection and verification procedure by applying the updated security keys and a previously configured algorithm to all bearers corresponding to the secondary cell group and then apply integrity verification and protection to transmitted and received data (This is to increase reliability and security of data transmitted and received from or DRBs in the future).
13. Upon receiving the SCG-counter value (or sk-counter) in the RRCRelease message, the UE may resume the encryption and decryption procedure by applying the updated security keys and a previously configured algorithm to all bearers (SCG terminated RBs) corresponding to the secondary cell group and then apply encryption and decryption to transmitted and received data (This is to increase reliability and security of data transmitted and received from DRBs in the future).

The UE operation provided when the UE has a need to configure the connection, performs a random access procedure, transmits an RRCResumeRequest message to the MgNB, and receives an RRCResume message in response thereto is described below in operation 10-35. If the RRCResume message includes an indicator indicating a report on an effective frequency measurement result measured in the RRC-inactive mode to the UE, the UE may configure the frequency measurement result in an RRCResumeComplete message and report the same. Further, the MgNB may insert an indicator or configuration information indicating whether to discard, release, maintain and apply, or reconfigure SCell configuration information of the MCG or SCG} (for example, the configuration information described or provided in FIG. 6) stored in the UE into the RRC message (for example, RRCResume) and transmit the same to the UE.
1. Upon receiving the message, the UE may restore a PDCP state corresponding to the master cell group, reset a count value, and reestablishes PDCP layer devices of SRB2 corresponding to the master cell group and all DRBs (MCG terminated RBs).
2. Upon receiving the SCG-counter value (or sk-counter) in the message, the UE may update a new SKgNB security key corresponding to the secondary cell group on the basis of the KgNB security key and the SCG-counter value (or sk-counter). Further, the UE may induce new security keys (SK_RRCenc, SK_RRC_int, SK_UPint, and SK_UPenc) to be used in an integrity protection and verification procedure and an encryption and decryption procedure using the newly updated KgNB security key corresponding to the second cell group.
3. If the message includes master cell group (masterCellgroup) configuration information, the UE may execute and apply the master cell group configuration information included in the message. The master cell group information may contain configuration information of RLC layer devices belonging to the master cell group, a logical channel identifier, and a bearer identifier.
4. If the message includes bearer configuration information (radioBearerConfig), the UE may execute and apply the bearer configuration information (radioBearerConfig) included in the message. The bearer configuration information (radioBearerConfig) may contain configuration information of PDCP layer devices for respective bearers, configuration information of SDAP layer devices, a logical channel identifier, and a bearer identifier.
5. If the message includes secondary cell group (secondaryCellgroup) configuration information, the UE may execute and apply the secondary cell group configuration information included in the message. The secondary cell group information may contain configuration information of RLC layer devices belonging to the second cell group, a logical channel identifier, a bearer identifier, and the like.
6. If the message includes secondary bearer configuration information (radioBearerConfig), the UE may execute and apply secondary bearer configuration information (radioBearerConfig) included in the message. The secondary bearer configuration information (radioBearerConfig) may contain configuration information of PDCP layer devices for respective bearers, configuration information of SDAP layer devices, a logical channel identifier, a bearer identifier, and the like.
7. The UE resumes SRB2 corresponding to the master cell group and all DRBs (MCG terminated RBs).
8. If the message includes frequency measurement configuration information (measConfig), the UE may execute and apply the frequency measurement configuration information included in the message. That is, the frequency measurement may be performed according to the configuration.
9. The UE may transition to the RRC-connected mode.
10. The UE may indicate that the RRC connection, which had been suspended, has been resumed to a higher layer device.
11. The UE may configure an RRCResumeComplete message and transmits the same to a lower layer device in operation 10-40.

When the UE has bearer configuration information and UE text information for the suspended secondary cell group, or when the UE may perform frequency measurement on the basis of frequency configuration information configured in system information, the RRCRelease message, or the RRCResume message and there is an effective result, the UE may insert an indicator indicating the result into the RRCResumeComplete message, and transmit the same. Upon receiving the indicator, the MgNB instructs the UE to report the frequency measurement result in operation 10-45 when resumption of the carrier aggregation or the dual connectivity is needed and may receive a report on the frequency measurement result or receive the report on the frequency measurement result through the RRCResumeComplete message in operation 10-50.

Upon receiving the frequency measurement result, the MgNB may ask the secondary cell MgNB about whether to resume bearer information for the suspended secondary cell group, receive a response thereto, make a decision, transmit an RRCReconfiguation message to the UE, and indicate whether to resume or release bearers for the second cell group. Further, the MgNB may insert an indicator or configuration information indicating whether to discard, release, maintain and apply, or reconfigure SCell configuration information of the MCG or SCG (for example, the configuration information described or provided in FIG. 6) stored in the UE into the RRC message (for example, RRCReconfiguration) and transmit the same to the UE.

In one embodiment provided in FIG. 10, the MgNB may allow the configuration of a first active BWP of downlink or uplink BWP configuration information of each cell as a dormant BWP in the SCell configuration information (for example, the configuration information described or provided in FIG. 6) or PSCell (or SCell) configuration information of the cell group (for example, secondary cell group) of the RRC message and thus, when the UE activates each SCell or the PSCell of the cell group (for example, secondary cell group), the UE may directly operate the downlink BWP or the uplink BWP of the PSCell of each SCell or PSCell as the dormant BWP, thereby suspending or resuming the cell group and reducing UE battery consumption.

For example, when the state of the SCell is configured as the activated state, the state of the cell group is configured as the activated state, the suspended state, or the deactivated state, or an indication indicating suspension or resumption of the cell group is configured in SCell configuration information or cell group configuration information of the RRC message (for example, RRCRelease, RRCResume, or RRCReconfiguration), a method of saving a UE battery may be used by activating, resuming, or suspending the SCell or PSCell if an indication indicating activation of the SCell is received in MAC control information provided in the disclosure and directly activating a downlink BWP or an uplink BWP of the SCell or PSCell to a dormant BWP.

When the UE in the RRC-inactive mode transitions to the RRC-connected mode and the SCell configuration information or the PSCell (or SCell) configuration information of the cell group (for example, secondary cell group) provided in the disclosure is reconstructed, applied, or reconfigured, switching or activation between BWPs may be performed or the BWP may be activated or applied for each activated SCell or the PSCell (or SCell) of the cell group according to an embodiment provided in the disclosure. Further, embodiments of the disclosure may be extended and applied when the handover is performed.

When the UE receives an indication indicating suspension, resumption, activation, or deactivation of the cell group or the PSCell of the cell group by MAC control information provided in embodiments, a PHY layer device or a MAC layer device receiving the indication may transmit the indication to a higher layer device (for example, a MAC layer device, an RLC layer device, a PDCP layer device, or an RRC layer device). When receiving the indication (for example, cell group suspension, resumption, activation, or deactivation) from the lower layer device, the higher layer device may perform a procedure of a protocol layer device for cell group suspension, resumption, activation, or deactivation corresponding thereto.

Alternatively, when the UE receives the indication of suspension, resumption, activation, or deactivation for the cell group or the PSCell of the cell group through the RRC message as in an embodiment of the disclosure, the RRC layer device receiving the indication may transmit the indication to the lower layer device (for example, the PHY layer device, the MAC layer device, the RLC layer device, or the PDCP layer device). When receiving the indication (for example, cell group suspension, resumption, activation, or deactivation) from the higher layer device (for example, the RRC layer device), the lower layer device may perform a procedure of a protocol layer device for cell group suspension, resumption, activation, or deactivation corresponding thereto.

Various embodiments may be configured and implemented through combination or expansion of embodiments provided in the disclosure.

Figure 11:
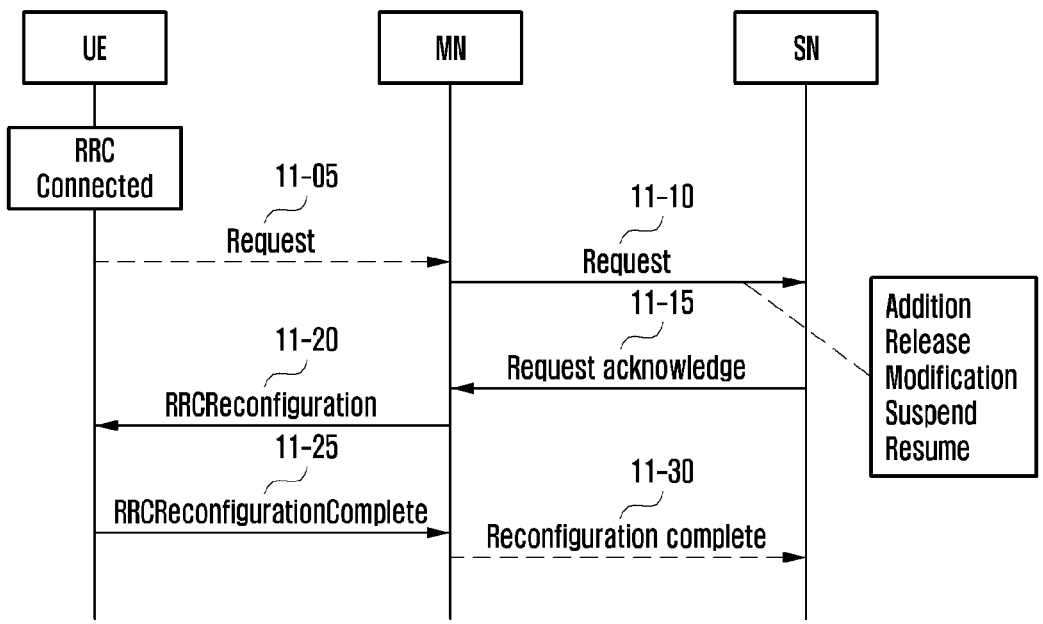
FIG. 11 illustrates a signaling procedure in which a dual-connection technology is configured or cleared, or a secondary cell group configured by the dual-connection technology is activated, resumed, suspended, or deactivated according to an embodiment of the present disclosure.
Figure 11:
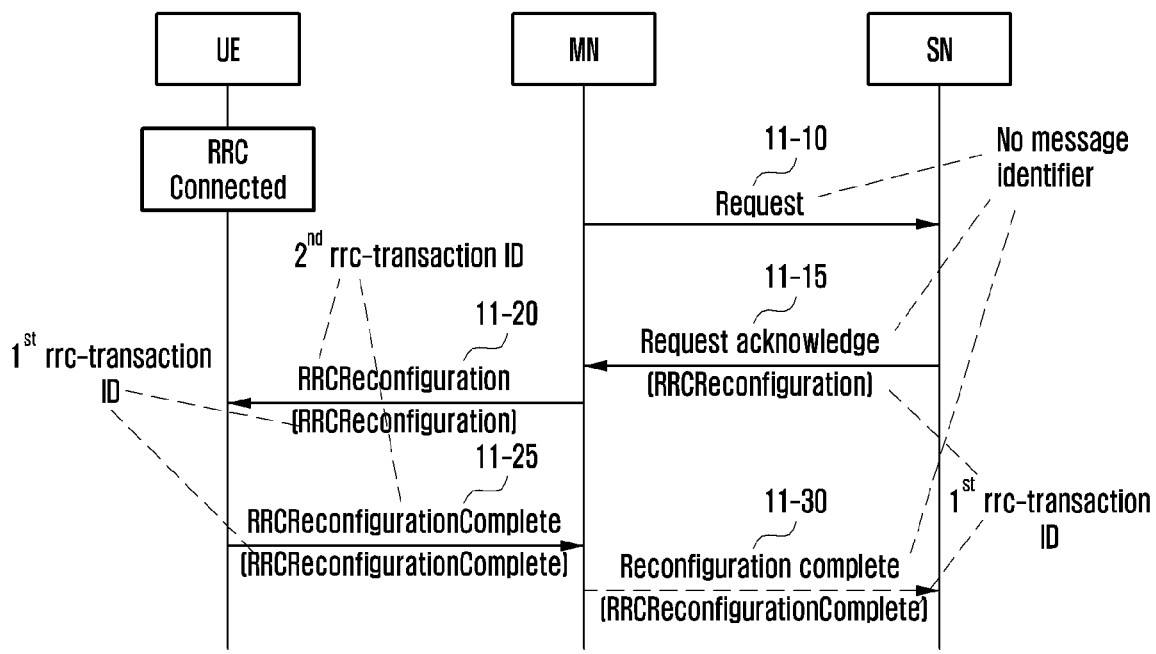

FIG. 11 illustrates a signaling procedure of configuring or releasing dual connectivity, or activating, resuming, suspending, or deactivating a secondary cell group through the dual connectivity in the next-generation mobile communication system of the present disclosure.

FIG. 11 is a sequence diagram illustrating a first signaling procedure of configuring or releasing dual connectivity or activating, resuming, suspending, or deactivating a secondary cell group through the dual connectivity.

Referring to FIG. 11, as illustrated in FIG. 6 of the disclosure, the UE may establish an RRC connection with the network or the base station and transmit or receive data to or from the base station (for example, a master cell group, a master node (MN), or an MCG, or cells (PCell or SCell) of the master cell group.

The base station may configure dual connectivity in the UE for a predetermined reason (for example, when a high data transmission rate is required, by a request from the UE in operation 11-05, or when a high QoS requirement may be satisfied). For example, the UE may make a request for configuring, releasing, activating, deactivating, resuming, or suspending the dual connectivity, the cell group (for example, secondary cell group), or the cell to the base station, and the request message may include a frequency (or channel) measurement result report, a cell group identifier, cell identifiers, or measurement results in operation 11-05. In another method, the base station may determine whether to configure, release, add, deactivate, activate, resume, modify, reconfigure, or suspend the dual connectivity, the cell group (for example, secondary cell group), or the cell in consideration of an amount of downlink (or uplink) data or an amount of buffers.

The master base station (master node (MN) or master cell group (MCG)) may receive a frequency or channel measurement report for each frequency or channel received from the UE and determine a secondary base station (secondary node (SN) or secondary cell group (SCG)) to configure dual connectivity therein on the basis of the measurement report. Alternatively, the master base station may determine whether to configure, release, add, deactivate, activate, resume, modify, reconfigure, or suspend the dual connectivity, the cell group (for example, secondary cell group), or the cell in consideration of an amount of downlink (or uplink) data or an amount of buffers.

In order to configure, release, add, deactivate, activate, resume, modify, reconfigure, or suspend the dual connectivity, the cell group (for example, secondary cell group), or the cell, the master base station may transmit a message to request for configuring or adding a secondary cell group of the UE to the determined secondary base station through an Xn interface (for example, interface between base stations) or an Sn interface (interface between the base station and an AMF or UMF or interface between base stations) in operation 11-10.

For the request message, each separate new request message may be defined and used to configure, release, add, deactivate, activate, resume, modify, reconfigure, or suspend the dual connectivity, the cell group (for example, secondary cell group), or the cell, or, in another method, a new indicator may be defined in the existing message (for example, SN addition request message, SN modification request message, SN release request message, or the like) to indicate (make a request for) configuring, releasing, adding, deactivating, activating, resuming, modifying, reconfiguring, or suspending the dual connectivity, the cell group (for example, secondary cell group), or the cell to the secondary base station. The request message may include information such as cell group configuration information (for example, master cell group configuration information), bearer configuration information, UE capability information, or UE frequency (or channel) measurement result information, currently configured in the UE, and when configuring the secondary cell group in the UE with reference to the information, the secondary base station may configure secondary cell group configuration information or bearer configuration information suitable for the UE capability, not to exceed the UE capability, or suitable for bearer configuration information of the master cell group.

When the secondary base station receiving the request message in operation 11-10 rejects the request message of operation 11-10, the secondary base station may configure a rejection message and transmit the same to the master base station through the Xn interface (for example, interface between base stations) or the Sn interface (interface between the base station and the AMF or UMF or between base stations) in operation 11-15.

When the secondary base station accepts the request message, the secondary base station may transmit a request acceptance (or request acknowledgement) message including configuration information or an indicator for configuring, releasing, adding, deactivating, activating, resuming, modifying, reconfiguring, or suspending the dual connectivity, the cell group (for example, secondary cell group), or the cell to the master base station through the Xn interface (for example, interface between base stations) or the Sn interface (interface between the base station and the AMF or UMF or interface between base stations) in operation 11-15. The request acceptance message may include some pieces of the following information:

An identifier which is the same as a message identifier included in the request message or an indicator indicating acceptance of the request contained in the request message;

Configuration information or an indicator (for example, configuration information or an indicator for a master cell group) for configuring, releasing, adding, deactivating, activating, resuming, modifying, reconfiguring, or suspending the dual connectivity, the cell group (for example, secondary cell group), or the cell; or A first RRC message (for example, RRCReconfiguration message) including configuration information or an indicator for configuring, releasing, adding, deactivating, activating, resuming, modifying, reconfiguring, or suspending the dual connectivity, the cell group (for example, secondary cell group), or the cell.

The first RRC message may include some pieces of the following information:

A first RRC message identifier (for example, rrc-Transaction identifier) for identifying the first RRC message. Since the UE and the base station (for example, secondary base station) transmit or receive a plurality of RRC messages, an identifier for identifying each RRC message may be inserted into the RRC message. For example, an RRC message (for example, RRCReconfigurationComplete) corresponding to the RRC message (for example, RRCReconfiguration) transmitted by a transmission side or the RRC message (for example, RRCReconfiguration) transmitted by a reception side or an RRC message corresponding to the RRC message transmitted by the transmission side may include the same first RRC message identifier;

Configuration information or an indicator (for example, configuration information or an indicator for the UE) for configuring, releasing, adding, deactivating, activating, resuming, modifying, reconfiguring, or suspending the dual connectivity, the cell group (for example, secondary cell group), or the cell;

An indicator indicating a state of the cell group (for example, activation, deactivation, suspension, or resumption);

A cell group identifier for identifying a cell group (The cell group identifier may be allocated by the master base station, or one of the pre-appointed identifiers may be allocated by the secondary base station);

Cell group or cell configuration information;

Bearer configuration information (for example, indicator information (for example, a PDCP suspension indicator, a PDCP reestablishment indicator, a PDCP data reconstruction indicator, an RLC reestablishment indicator, a MAC partial reset indicator, a MAC reset indicator, or an indicator triggering a new operation) indicating an operation of a protocol layer device of each bearer (for example, SDAP layer device, PDCP layer device, RLC layer device, or MAC layer device);

A first indicator (for example, mobilityControlInfor or ReconfigurationWithSync) also may be included if the configuration information or the indicator for configuring, adding, activating, resuming, modifying, or reconfiguring the dual connectivity, the cell group (for example, secondary cell group), or the cell is included. However, the first indicator (for example, mobilityControlInfor or ReconfigurationWithSync) may not be included if the configuration information or the indicator for releasing, deactivating, reconfiguring, or suspending the dual connectivity, the cell group (for example, secondary cell group), or the cell is included. The first indicator may be an indicator triggering the random access procedure to the cell group or the cell, an indicator making signal synchronization with a new cell, an indicator indicating frequency movement of the UE, or an indicator indicating the cell group (or cell) modification;

Random access configuration information also may be included if the configuration information or the indicator for configuring, adding, activating, resuming, modifying, or reconfiguring the dual connectivity, the cell group (or secondary cell group), or the cell is included. However, the random access configuration information may not be included if the configuration information or the indicator for releasing, deactivating, reconfiguring, or suspending the dual connectivity, the cell group (or secondary cell group), or the cell is included. The random access configuration information may include random access transmission resource information (time or frequency transmission resources) for transmitting a preamble for the cell group or the cell or predetermined preamble information;

Time information indicating when the dual connectivity, the cell group (for example, secondary cell group), or the cell (PSCell or SCG SCell) is activated, resumed, deactivated, or suspended (for example, information indicating timing (for example, X), a time unit, a subframe, a time slot, or a symbol unit), for example, time information indicating whether to, if the message is received in an nth time unit, activate, resume, deactivate, or suspend the cell in an (n+X)th time unit);

First channel measurement configuration information for each cell or bandwidth part;

Second channel measurement configuration information for each cell or bandwidth part;

An indicator that adds the cell group configuration or an indicator (ReconfigurationWithSync) that indicates the cell group change or an indicator (ReconfigurationWithSync or newly defined indicator) that indicates a random access procedure;

An indicator (ReconfigurationWithSync or newly defined indicator) that indicates whether to activate the cell group by performing the random access procedure or to activate the cell group without the random access procedure when the cell group is activated;

Radio resource management (RRM) configuration information or frequency measurement configuration information, or separate RRM configuration information or frequency measurement configuration information (e.g., frequency measurement configuration information (reduced or relaxed RRM configuration information) simplified for battery saving) to be applied or performed when the cell group is deactivated; and/or Configuration information for radio link monitoring (RLM) or the configuration information for the RLM to be applied or performed when the cell group is deactivated.

For example, the configuration information for the RLM may be beam configuration information in the unit of a cell or beam configuration information for each bandwidth part to be measured by the UE when the cell group is deactivated, and may include beam-related configuration information (transmission configuration indication (TCI) state or quasi co-location (QCL)).

Alternatively, the configuration information for the RLM may include a timing advance (TA) value (or an offset value) for synchronization with a downlink signal or an uplink signal of the base station, a time alignment timer (TAT) indicating effectiveness of the TA value or a TAT value.

Alternatively, the configuration information for the RLM may include synchronization signal block (SSB) configuration information that becomes the target of measurement, channel state information reference signal (CSI-RS) configuration information, reference signal (RS) configuration information, or transmission resource information (e.g., PUCCH configuration information (e.g., scheduling request (SR) information or specific transmission resource) or frequency transmission resource or time transmission resource) that can report the result when a beam failure occurs.

Further, the configuration information may include the bandwidth part configuration information (e.g., may be indicated as a bandwidth part identifier) indicating in which bandwidth part the RLM procedure is to be performed.

As another method, when the cell group is in the deactivated state, the UE may minimize a cell group activation delay by performing the RLM procedure in the first activated bandwidth part (or first activated downlink bandwidth part (firstActiveDownlinkBWP-ID)) configured in the RRC message and by early monitoring the first activated bandwidth part to be activated when the cell group is activated.

As still another method, in case that the cell group is configured in the deactivated state (or activated state), the UE may continuously maintain the connection state with the cell group (e.g., in case that the bandwidth part configuration information indicating in which bandwidth part the RLM procedure is to be performed is not configured) by performing the RLM procedure in the finally (or previously) activated bandwidth part before the cell group is deactivated, whereas in case that the cell group is activated, the UE may perform the activation procedure in the first activated bandwidth part (or first activated downlink bandwidth part (firstActiveDownlinkBWP-ID)) configured in the RRC message. If the bandwidth part related configuration information indicating in which bandwidth part the RLM procedure is to be performed is not configured when the cell group is activated, the RLM procedure may be performed in the finally (or previously) activated bandwidth part.

Further, the configuration information may include the beam-related configuration information (e.g., may be indicated as the bandwidth part identifier or TCI state or QCL configuration information) indicating in which beam the RLM procedure is to be performed. As still another method, when the cell group is in the deactivated state, the UE may minimize the cell group activation delay by performing the RLM procedure in the beam (e.g., TCI state or QCL configuration information) configured in the RRC message and by activating the beam, performing the RLM procedure, and early monitoring the beam to be activated when the cell group is activated. As still another method, in case that the cell group is configured in the deactivated state (or activated state), the UE may continuously maintain the connection state with the cell group (e.g., in case that the beam-related configuration information indicating in which beam the RLM procedure is to be performed is not configured) by performing the RLM procedure in the finally (or previously) activated beam before the cell group is deactivated, whereas in case that the cell group is activated, the UE may perform the activation procedure in the beam configured in the RRC message. If the beam-related configuration information indicating in which beam the RLM procedure is to be performed is not configured when the cell group is activated, the RLM procedure may be performed in the finally (or previously) activated beam.

Configuration information for a beam failure detection procedure or beam failure detection (BFD) or configuration information for the BFD that may be applied or performed when the cell group is deactivated.

For example, the configuration information for the BFD may be beam configuration information in the unit of a cell or beam configuration information for each bandwidth part that may be measured by the UE when the cell group is deactivated, and may include beam-related configuration information (e.g., transmission configuration indication (TCI) state or quasi co-location (QCL)).

Alternatively, the configuration information for the BFD may include a timing advance (TA) value (or an offset value) for synchronization with a downlink signal or an uplink signal of the base station, a time alignment timer (TAT) indicating effectiveness of the TA value, or a TAT value.

Alternatively, the configuration information for the BFD may include synchronization signal block (SSB) configuration information that becomes the target of measurement, channel state information reference signal (CSI-RS) configuration information, reference signal (RS) configuration information, or transmission resource information (e.g., PUCCH configuration information (e.g., scheduling request (SR) information or specific transmission resource) or frequency transmission resource or time transmission resource) that can report the result when the beam failure occurs.

Further, the configuration information may include the bandwidth part configuration information (e.g., may be indicated as a bandwidth part identifier) indicating in which bandwidth part the beam failure detection procedure is to be performed.

As another method, when the cell group is in the deactivated state, the UE may minimize a cell group activation delay by performing the beam failure detection procedure in the first activated bandwidth part (or first activated downlink bandwidth part (firstActiveDownlinkBWP-ID)) configured in the RRC message and by early monitoring the first activated bandwidth part to be activated when the cell group is activated.

As still another method, in case that the cell group is configured in the deactivated state (or activated state), the UE may continuously maintain the connection state with the cell group (e.g., in case that the bandwidth part configuration information indicating in which bandwidth part the beam failure detection procedure is to be performed is not configured) by performing the beam failure detection procedure in the finally (or previously) activated bandwidth part before the cell group is deactivated, whereas in case that the cell group is activated, the UE may perform the activation procedure in the first activated bandwidth part (or first activated downlink bandwidth part (firstActiveDownlinkBWP-ID)) configured in the RRC message. If the bandwidth part related configuration information indicating in which bandwidth part the beam failure detection procedure is to be performed is not configured when the cell group is activated, the beam failure detection procedure may be performed in the finally (or previously) activated bandwidth part.

Further, the configuration information may include the beam-related configuration information (e.g., may be indicated as the bandwidth part identifier or TCI state or QCL configuration information) indicating in which beam the beam failure detection procedure is to be performed. As still another method, when the cell group is in the deactivated state, the UE may minimize the cell group activation delay by performing the beam failure detection procedure in the beam (e.g., TCI state or QCL configuration information) configured in the RRC message and by early monitoring the beam to be activated when the cell group is activated. As still another method, in case that the cell group is configured in the deactivated state (or activated state), the UE may continuously maintain the connection state with the cell group (e.g., in case that the beam-related configuration information indicating in which beam the beam failure detection procedure is to be performed is not configured) by performing the beam failure detection procedure in the finally (or previously) activated beam before the cell group is deactivated, whereas in case that the cell group is activated, the UE may perform the activation procedure in the beam configured in the RRC message. If the beam-related configuration information indicating in which beam the beam failure detection procedure is to be performed is not configured when the cell group is activated, the beam failure detection procedure may be performed in the finally (or previously) activated beam.

When the master base station (MCG) receives the request acceptance message of operation 11-15, the master base station may identify the request acceptance message and transmit a second RRC message (for example, RRCReconfiguration) including information included in the request acceptance message (for example, the first RRC message included in the request acceptance message of operation 11-15) to the UE in operation 11-20. The second RRC message may include some pieces of the following information:

A second RRC message identifier (for example, rrc-Transaction identifier) for identifying the second RRC message. Since the UE and the base station transmit or receive a plurality of RRC messages, an identifier for identifying each RRC message may be included in the RRC message. For example, an RRC message (for example, RRCReconfigurationComplete) corresponding to the RRC message (for example, RRCReconfiguration) transmitted by a transmission side or the RRC message (for example, RRCReconfiguration) transmitted by a reception side or an RRC message corresponding to the RRC message transmitted by the transmission side may include the same second RRC message identifier;

The first RRC message included in the request acceptance (or request acknowledgement) message of operation 11-15;

Configuration information or an indicator (for example, configuration information or an indicator for the UE) for configuring, releasing, adding, deactivating, activating, resuming, modifying, reconfiguring, or suspending the dual connectivity, the cell group (for example, secondary cell group), or the cell;

An indicator indicating a state of the cell group (for example, activation, deactivation, suspension, or resumption);

A cell group identifier for identifying a cell group. The cell group identifier may be allocated by the master base station, or one of the pre-appointed identifiers may be allocated by the secondary base station;

Cell group or cell configuration information;

Bearer configuration information, for example, indicator information (for example, a PDCP suspension indicator, a PDCP reestablishment indicator, a PDCP data reconstruction indicator, an RLC reestablishment indicator, a MAC partial reset indicator, a MAC reset indicator, or an indicator triggering a new operation) indicating an operation of a protocol layer device of each bearer (for example, SDAP layer device, PDCP layer device, RLC layer device, or MAC layer device);

A first indicator (for example, mobilityControlInfor or ReconfigurationWithSync) also may be included if the configuration information or the indicator for configuring, releasing, adding, deactivating, activating, resuming, modifying, reconfiguring, or suspending the dual connectivity, the cell group (for example, secondary cell group), or the cell is included. However, the first indicator (for example, mobilityControlInfor or ReconfigurationWithSync) may not be included if the configuration information or the indicator for releasing, deactivating, reconfiguring, or suspending the dual connectivity, the cell group (for example, secondary cell group), or the cell is included. The first indicator may be an indicator triggering the random access procedure to the cell group or the cell, an indicator making signal synchronization with a new cell, an indicator indicating frequency movement of the UE, or an indicator indicating the cell group (or cell) modification. In another method, the UE may perform PDCCH monitoring in the indicated or configured cell group or cell, and trigger and perform the random access procedure according to the indication by the PDCCH. For example, the higher layer device (for example, RRC layer device) may transmit an indicator for triggering the random access procedure to the lower layer device (for example, MAC layer device);

Random access configuration information also may be included if the configuration information of the indicator for configuring, adding, activating, resuming, modifying, or reconfiguring the dual connectivity, the cell group (for example, secondary cell group), or the cell. However, the random access configuration information may not be included if the configuration information or the indicator for releasing, deactivating, reconfiguring, or suspending the dual connectivity, the cell group (or secondary cell group), or the cell. The random access configuration information may include random access transmission resource information (time or frequency transmission resources) for transmitting a preamble for the cell group or the cell or predetermined preamble information;

Time information indicating when the dual connectivity, the cell group (for example, secondary cell group), or the cell (PSCell or SCG SCell) is activated, resumed, deactivated, or suspended (for example, information indicating timing (for example, X), a time unit, a subframe, a time slot, or a symbol unit), for example, time information indicating whether to, if the message is received in an nth time unit, activate, resume, deactivate, or suspend the cell in an (n+X)th time unit);

First channel measurement configuration information for each cell or bandwidth part;

Second channel measurement configuration information for each cell or bandwidth part;

An indicator that adds the cell group configuration or an indicator (ReconfigurationWithSync) that indicates the cell group change or an indicator (ReconfigurationWithSync or newly defined indicator) that indicates a random access procedure;

An indicator (ReconfigurationWithSync or newly defined indicator) that indicates whether to activate the cell group by performing the random access procedure or to activate the cell group without the random access procedure when the cell group is activated;

Radio resource management (RRM) configuration information or frequency measurement configuration information or separate RRM configuration information or frequency measurement configuration information (e.g., frequency measurement configuration information (reduced or relaxed RRM configuration information) simplified for battery saving) to be applied or performed when the cell group is deactivated; and/or Configuration information for radio link monitoring (RLM) or configuration information for RLM to be applied or performed when the cell group is deactivated.

For example, the configuration information for the RLM may be beam configuration information in the unit of a cell or beam configuration information for each bandwidth part to be measured by the UE when the cell group is deactivated, and may include beam-related configuration information (transmission configuration indication (TCI) state or quasi co-location (QCL)).

Alternatively, the configuration information for RLM may include a timing advance (TA) value (or an offset value) for synchronization with a downlink signal or an uplink signal of the base station, and a time alignment timer (TAT) indicating effectiveness of the TA value or a TAT value.

Alternatively, the configuration information for the RLM may include synchronization signal block (SSB) configuration information that becomes the target of measurement, channel state information reference signal (CSI-RS) configuration information, reference signal (RS) configuration information, or transmission resource information (e.g., PUCCH configuration information (e.g., scheduling request (SR) information or specific transmission resource) or frequency transmission resource or time transmission resource) that can report the result when a beam failure occurs.

Further, the configuration information for the RLM may include the bandwidth part configuration information (e.g., may be indicated as a bandwidth part identifier) indicating in which bandwidth part the RLM procedure is to be performed. As another method, when the cell group is in the deactivated state, the UE may minimize a cell group activation delay by performing the RLM procedure in the first activated bandwidth part (or first activated downlink bandwidth part (firstActiveDownlinkBWP-ID)) configured in the RRC message and by early monitoring the first activated bandwidth part to be activated when the cell group is activated.

As still another method, in case that the cell group is configured in the deactivated state (or activated state), the UE may continuously maintain the connection state with the cell group (e.g., in case that the bandwidth part configuration information indicating in which bandwidth part the RLM procedure is to be performed is not configured) by performing the RLM procedure in the finally (or previously) activated bandwidth part before the cell group is deactivated, whereas in case that the cell group is activated, the UE may perform the activation procedure in the first activated bandwidth part (or first activated downlink bandwidth part (firstActiveDownlinkBWP-ID)) configured in the RRC message. If the bandwidth part related configuration information indicating in which bandwidth part the RLM procedure is to be performed is not configured when the cell group is activated, the RLM procedure may be performed in the finally (or previously) activated bandwidth part.

Further, the configuration information for the RLM may include the beam-related configuration information (e.g., may be indicated as the bandwidth part identifier or TCI state or QCL configuration information) indicating in which beam the RLM procedure is to be performed. As still another method, when the cell group is in the deactivated state, the UE may minimize the cell group activation delay by performing the RLM procedure in the beam (e.g., TCI state or QCL configuration information) configured in the RRC message and by activating the beam, performing the RLM procedure, and early monitoring the beam to be activated when the cell group is activated. As still another method, in case that the cell group is configured in the deactivated state (or activated state), the UE may continuously maintain the connection state with the cell group (e.g., in case that the beam-related configuration information indicating in which beam the RLM procedure is to be performed is not configured) by performing the RLM procedure in the finally (or previously) activated beam before the cell group is deactivated, whereas in case that the cell group is activated, the UE may perform the activation procedure in the beam configured in the RRC message. If the beam-related configuration information indicating in which beam the RLM procedure is to be performed is not configured when the cell group is activated, the RLM procedure may be performed in the finally (or previously) activated beam.

Configuration information for a beam failure detection procedure or beam failure detection (BFD) or configuration information for the BFD that may be applied or performed when the cell group is deactivated.

For example, the configuration information for the BFD may be beam configuration information in the unit of a cell or beam configuration information for each bandwidth part that may be measured by the UE when the cell group is deactivated, and may include beam-related configuration information (e.g., transmission configuration indication (TCI) state or quasi co-location (QCL)), or the configuration information may include a timing advance (TA) value (or an offset value) for synchronization with a downlink signal or an uplink signal of the base station, a time alignment timer (TAT) indicating effectiveness of the TA value, or a TAT value, or the configuration information may include synchronization signal block (SSB) configuration information that becomes the target of measurement, channel state information reference signal (CSI-RS) configuration information, reference signal (RS) configuration information, or transmission resource information (e.g., PUCCH configuration information (e.g., scheduling request (SR) information or specific transmission resource) or frequency transmission resource or time transmission resource) that can report the result when the beam failure occurs.

Further, the configuration information for the BFD may include the bandwidth part configuration information (e.g., may be indicated as a bandwidth part identifier) indicating in which bandwidth part the beam failure detection procedure is to be performed. As another method, when the cell group is in the deactivated state, the UE may minimize a cell group activation delay by performing the beam failure detection procedure in the first activated bandwidth part (or first activated downlink bandwidth part (firstActiveDownlinkBWP-ID)) configured in the RRC message and by early monitoring the first activated bandwidth part to be activated when the cell group is activated. As still another method, in case that the cell group is configured in the deactivated state (or activated state), the UE may continuously maintain the connection state with the cell group (e.g., in case that the bandwidth part configuration information indicating in which bandwidth part the beam failure detection procedure is to be performed is not configured) by performing the beam failure detection procedure in the finally (or previously) activated bandwidth part before the cell group is deactivated, whereas in case that the cell group is activated, the UE may perform the activation procedure in the first activated bandwidth part (or first activated downlink bandwidth part (firstActiveDownlinkBWP-ID)) configured in the RRC message. If the bandwidth part related configuration information indicating in which bandwidth part the beam failure detection procedure is to be performed is not configured when the cell group is activated, the beam failure detection procedure may be performed in the finally (or previously) activated bandwidth part.

Further, the configuration information for the BFD may include the beam-related configuration information (e.g., may be indicated as the bandwidth part identifier or TCI state or QCL configuration information) indicating in which beam the beam failure detection procedure is to be performed. As still another method, when the cell group is in the deactivated state, the UE may minimize the cell group activation delay by performing the beam failure detection procedure in the beam (e.g., TCI state or QCL configuration information) configured in the RRC message and by early monitoring the beam to be activated when the cell group is activated.

As still another method, in case that the cell group is configured in the deactivated state (or activated state), the UE may continuously maintain the connection state with the cell group (e.g., in case that the beam-related configuration information indicating in which beam the beam failure detection procedure is to be performed is not configured) by performing the beam failure detection procedure in the finally (or previously) activated beam before the cell group is deactivated, whereas in case that the cell group is activated, the UE may perform the activation procedure in the beam configured in the RRC message. If the beam-related configuration information indicating in which beam the beam failure detection procedure is to be performed is not configured when the cell group is activated, the beam failure detection procedure may be performed in the finally (or previously) activated beam.

When receiving the second RRC message of operation 11-20, the UE may read and identify the second RRC message or read information (for example, the first RRC message included in the second RRC message) included in the second RRC message and configure, add, modify, resume, suspend, or deactivate the dual connectivity or the cell group (for example, secondary cell group).

When the first indicator triggering the random access procedure is included in the second RRC message or the first RRC message, the random access procedure may be triggered for the configured or indicated cell group or cell. If there is the random access information in the RRC message or there is the stored random access information when the random access procedure is performed, the random access procedure (for example, contention free-based random access procedure (for example, 4-step random access or 2-step random access)) may be performed on the basis of the random access information that has been stored or received in the RRC message or on the basis of system information. If there is no random access information in the RRC message, the random access procedure (for example, contention-based random access procedure (for example, 4-step random access or 2-step random access)) may be performed based on system information or random access configuration information received previously.

In another method, the UE may perform PDCCH monitoring in the indicated or configured cell group or cell, and trigger and perform the random access procedure according to the indication by the PDCCH. For example, the higher layer device (for example, RRC layer device) may transmit an indicator for triggering the random access procedure to the lower layer device (for example, MAC layer device).

Next, the disclosure proposes a first embodiment of a UE operation in consideration of dual-connection technology configuration information when the RRC message (e.g., RRCReconfiguration message) is received. The embodiment proposes a procedure capable of activating a cell group without a random access procedure (RACH less activation) when the UE activates, adds, or changes the cell group.

If the UE receives the RRCReconfiguration message, the UE may perform the following procedures.
1> If MCG (or master node (MN)) is configured to LTE (E-UTRA) and SCG (secondary node (SN)) is configured to NR (i.e., E-UTRA nr-SecondaryCellGroupConfig is configured) for the UE, or if the UE is configured to (NG)EN-DC (next generation E-UTRA NR-dual connectivity connected to 5GC),
  2> If the RRCReconfiguration message is received through an E-UTRA RRC message in a MobilityFromNRCommand message (message indicating a handover from NR to (NG)EN-DC),
    3> If the reconfigurationWithSync configuration information is included in spCellConfig of the SCG in the message, or if the cell group of the SCG is not configured to be in a deactivated state,
  2> The UE may perform (or trigger or start) a random access procedure with respect to SpCell (or SCG or PSCell).
  2> Alternatively, if the UE is configured (or indicated) to perform the random access procedure, or if the UE is configured (or indicated) to activate the cell group, the UE may perform the random access procedure, or may stop a TAT timer (or TAT timer for PTAG) connected (or configured) to the PSCell (or SCG) (or may consider that the TAT timer has expired).
    3> Else if the cell group of the SCG is not configured to be in a deactivated state, or if a new indicator (e.g., RACH-less indication) is included in the message and is indicated not to perform the random access procedure, or if the reconfigurationWithSync configuration information is not included in the spCellConfig of the SCG in the message,
      4> The UE may not perform (or trigger or start) the random access procedure with respect to the SpCell (or SCG or PSCell).
      4> The UE may activate the SpCell without the random access procedure, or the UE may start PDCCH monitoring with respect to the SpCell, or the UE may start the PDSCH reception.
    3> Else
      4> The UE may end the performing procedure.
1> If MCG (or master node (MN)) is configured to NR and SCG (secondary node (SN) is configured to NR (i.e., E-UTRA nr-SecondaryCellGroupConfig is configured) for n the UE, or if the UE is configured to NR-DC (NR-dual connectivity connected to 5GC), or if the RRCReconfiguration message is received in nr-SCG of the mrdc-SecondaryCellGroup configuration information through SRB1, or if the mrdc-SecondaryCellGroup configuration information is received in the RRCReconfiguration or RRCResume message through the SRB1,
  2> If the reconfigurationWithSync configuration information is included in the spCellConfig of the nr-SCG in the message, or if the cell group of the SCG is not configured to be in the deactivated state,
    3> The UE may perform (or trigger or start) the random access procedure with respect to the SpCell (or SCG or PSCell).
    3> alternatively, if the UE is configured (or indicated) to perform the random access procedure, or if the UE is configured (or indicated) to activate the cell group, the UE may perform the random access procedure, or may stop a TAT timer (or TAT timer for PTAG) connected (or configured) to the PSCell (or SCG) (or may consider that the TAT timer has expired).
  2> Else if the cell group of the SCG is not configured to be in the deactivated state, or if a new indicator (e.g., RACH-less indication) is included in the message and is indicated not to perform the random access procedure, or if the reconfigurationWithSync configuration information is not included in the spCellConfig of the SCG in the message,
    3> The UE may not perform (or trigger or start) the random access procedure with respect to the SpCell (or SCG or PSCell).
    3> The UE may activate the SpCell without the random access procedure, or the UE may start PDCCH monitoring with respect to the SpCell, or the UE may start the PDSCH reception.
  2> Else
    3> The UE may end the performing procedure.
1> If the reconfigurationWithSync configuration information is included in the spCellConfig of the MCG or SCG in the message, and if the MAC layer device of the NR cell group has successfully completed the random access procedure triggered as above,
  2> The first timer T304 for the cell group may be stopped (or if the timer is being driven).
  2> The second timer T310 for the cell group or the source SpCell may be stopped (or if the timer is being driven).

The message includes the reconfigurationWithSync, and when the UE performs a reconfiguration procedure (reconfiguration with Sync) for synchronization, the following procedures may be performed.

1> If a dual active protocol stack (DAPS) bearer is not configured, or if the cell group (or SCG) is not configured to be in the deactivated state, or if RLM-related configuration for the deactivated cell group or beam failure detection related configuration information is not configured (if the cell group is configured to be in the deactivated state, quick cell group activation is supported by continuously driving the second timer and performing the RLM procedure), or if this procedure is not performed with respect to the deactivated cell group (or SCG),
   2> The second timer T310 for the cell group or the SpCell may be stopped (or if the timer is running).
1> The third timer T312 for the cell group or the SpCell may be stopped (or if the timer is running).
1> If the cell group (or SCG) is not configured to be in the deactivated state, or if this procedure is not performed with respect to the deactivated cell group (or SCG),
   2> The value of the first timer T304 included in the reconfigurationWithSync configuration information of the message is configured, and the first timer T304 for the SpCell (PCell of MCG or PSCell of SCG) may start.

As provided in the disclosure, if RLM-related configuration information or beam failure detection related configuration information is configured with respect to the deactivated cell group (or SCG) in an RRC message (e.g., RRCReconfiguration message), the UE may perform a radio link failure detection procedure as follows.

1> If the cell group is configured to be in the deactivated state (or if the beam failure detection procedure or the RLM procedure is configured with respect to the deactivated cell group), or if an indication indicating asynchronous SpCell is received from a lower layer device as many as a specific number of times (e.g., value of N310),
   2> The second timer T310 for the SpCell may start. (When the cell group is activated, or when the cell group is configured to be activated, or when the cell group is not configured to be deactivated, or when the random access procedure for the SpCell starts or is performed, the second timer being driven may be stopped. Further, if the second timer expires, the occurrence of the radio link failure for the cell group may be declared).
1> If a certain DAPS bearer is configured, or if an indication indicating asynchronous source SpCell is received from a lower layer device as many as a specific number of times (e.g., value of N310), or if the first timer is being driven,
   2> The second timer T310 for the source SpCell may start.
1> If the indication indicating the asynchronous SpCell is received from the lower layer device as many as a specific number of times (e.g., value of N310), or if the first timer T304 or the fourth timer is not being driven,
   2> The second timer T310 for the source SpCell may start.

Next, the disclosure proposes a second embodiment of a UE operation in consideration of dual-connection technology configuration information when the RRC message (e.g., RRCReconfiguration message) is received. The embodiment proposes a procedure capable of activating a cell group without a random access procedure (RACH less activation) when the UE activates, adds, or changes the cell group.

If the UE receives the RRCReconfiguration message, the UE may perform the following procedures.

1> If MCG (or master node (MN)) is configured to LTE (E-UTRA) and SCG (or secondary node (SN)) is configured to NR (i.e., E-UTRA nr-SecondaryCellGroupConfig is configured) for the UE, or the UE is configured to (NG)EN-DC (next generation E-UTRA NR-dual connectivity connected to 5GC),
   2> If the RRCReconfiguration message is received through an E-UTRA RRC message in a MobilityFromNRCommand message (message indicating a handover from NR to (NG)EN-DC),
     3> If the reconfigurationWithSync configuration information is included in the spCellConfig of the SCG in the message, or if the cell group of the SCG is not configured to be in the deactivated state, or if a TimeAlignmentTimer (TAT) timer being driven in the MAC layer device (timer that determines effectiveness of a timing advance (TA) value for synchronization between the UE and the base station) is not being driven (or if the TAT timer has expired or if an indication indicating the TAT timer expiration is received from a lower layer device), or if an indication indicating the beam failure detection is received from the lower layer device (or if beam failure has occurred), or if the beam failure detection procedure or the RLM procedure for the deactivated cell group is not configured, or if a radio link failure procedure is detected in the RLM procedure (or if the second timer T310 has expired or a radio link to the SCG is not effective),
        4> The UE may perform (or trigger or start) a random access procedure with respect to the SpCell (or SCG or PSCell).
        4> Further, if the UE is configured (or indicated) to perform the random access procedure, or if the UE is configured (or indicated) to activate the cell group, the UE may perform the random access procedure, or may stop the TAT timer (or TAT timer for PTAG) connected (or configured) to the PSCell (or SCG) (or may consider that the TAT timer has expired).
     3> Else if the cell group of the SCG is not configured to be in the deactivated state, or if a new indicator (e.g., RACH-less indication) is included in the message and is indicated not to perform the random access procedure, or if the TimeAlignmentTimer (TAT) timer being driven in the MAC layer device (timer that determines effectiveness of a timing advance (TA) value for synchronization between the UE and the base station) is being driven (or if the TAT timer has not expired, or if an indication indicating the TAT timer expiration is not received from the lower layer device), or if an indication indicating the beam failure detection is not received from the lower layer device (or if the beam failure has not occurred), or if the beam failure detection procedure or the RLM procedure for the deactivated cell group is configured, or if a radio link failure procedure is not detected in the RLM procedure (or if the second timer T310 has not expired, or if the radio link to the SCG is effective), or if the reconfigurationWithSync configuration information is not included in the spCellConfig of the SCG in the message,
- 4> The UE may not perform (or trigger or start) the random access procedure with respect to the SpCell (or SCG or PSCell).
- 4> The UE may activate the SpCell without the random access procedure, or the UE may start PDCCH monitoring with respect to the SpCell, or the UE may start PDSCH reception.

3> Else if the cell group of the SCG is not configured to be in the deactivated state, or if a new indicator (e.g., RACH-less indication) is included in the message and is indicated not to perform the random access procedure, or if the TimeAlignmentTimer (TAT) timer being driven in the MAC layer device (timer that determines effectiveness of the timing advance (TA) value for synchronization between the UE and the base station) is not being driven (or if the TAT timer has expired, or if an indication indicating the TAT timer expiration is received from the lower layer device), or if an indication indicating the beam failure detection is received from the lower layer device (or if beam failure has occurred), or if the beam failure detection procedure or the RLM procedure for the deactivated cell group is not configured, or if the radio link failure procedure is detected in the RLM procedure (or if the second timer T310 has expired, or if the radio link to the SCG is not effective), or if the reconfigurationWithSync configuration information is not included in the spCellConfig of the SCG in the message,
- 4> The UE may perform (or trigger or start) the random access procedure with respect to the SpCell (or SCG or PSCell).
- 4> alternatively, if the UE is configured (or indicated) to activate the cell group, the UE may perform the random access procedure, or may stop the TAT timer (or TAT timer for PTAG) connected (or configured) to the PSCell (or SCG) (or may consider that the TAT timer has expired).

3> Else
- 4> The UE may end the performing procedure.

1> If MCG (or master node (MN)) is configured to NR and SCG (secondary node (SN) is configured to NR (i.e., E-UTRA nr-SecondaryCellGroupConfig is configured) for the UE, or if the UE is configured to NR-DC (NR-dual connectivity connected to 5GC), or if the RRCReconfiguration message is received in nr-SCG of the mrdc-SecondaryCellGroup configuration information through SRB1, or if the mrdc-SecondaryCellGroup configuration information is received in the RRCReconfiguration or RRCResume message through the SRB1, 2> If the reconfigurationWithSync configuration information is included in the spCellConfig of the nr-SCG in the message, or if the cell group of the SCG is not configured to be in the deactivated state, or if the TimeAlignmentTimer (TAT) timer being driven in the MAC layer device (timer that determines effectiveness of the timing advance (TA) value for synchronization between the UE and the base station) is not being driven (or if the TAT timer has expired, or if an indication indicating the TAT timer expiration is received from the lower layer device), or if an indication indicating the beam failure detection is received from the lower layer device (or if the beam failure has occurred), or if the beam failure detection procedure or the RLM procedure for the deactivated cell group is not configured, or if the radio link failure procedure is detected in the RLM procedure (or if the second timer T310 has expired or the radio link to the SCG is not effective),
- 3> The UE may perform (or trigger or start) the random access procedure with respect to the SpCell (or SCG or PSCell).
- 3> Alternatively, if the UE is configured (or indicated) to perform the random access procedure, or if the UE is configured (or indicated) to activate the cell group, the UE may perform the random access procedure, or may stop the TAT timer (or TAT timer for PTAG) connected (or configured) to the PSCell (or SCG) (or may consider that the TAT timer has expired).

2> Else if the cell group of the SCG is not configured to be in the deactivated state, or if a new indicator (e.g., RACH-less indication) is included in the message and is indicated not to perform the random access procedure, or if the TimeAlignmentTimer (TAT) timer being running in the MAC layer device (timer that determines effectiveness of the timing advance (TA) value for synchronization between the UE and the base station) is running (or if the TAT timer has not expired, or if an indication indicating the TAT timer expiration is not received from the lower layer device), or if an indication indicating the beam failure detection is not received from the lower layer device (or if the beam failure has not occurred), or if the beam failure detection procedure or the RLM procedure for the deactivated cell group is configured, or if the reconfigurationWithSync configuration information is not included in the spCellConfig of the SCG in the message, or if the radio link failure procedure is not detected in the RLM procedure (or if the second timer T310 has not expired, or if the radio link to the SCG is effective),
- 3> The UE may not perform (or trigger or start) the random access procedure with respect to the SpCell (or SCG or PSCell).
- 3> The UE may activate the SpCell without the random access procedure, or the UE may start PDCCH monitoring with respect to the SpCell, or the UE may start the PDSCH reception 2> Else if the cell group of the SCG is not configured to be in the deactivated state, or if a new indicator (e.g., RACH-less indication) is included in the message and is indicated not to perform the random access procedure, or if the TimeAlignmentTimer (TAT) timer being driven in the MAC layer device (timer that determines effectiveness of the timing advance (TA) value for synchronization between the UE and the base station) is not being driven (or if the TAT timer has expired, or if an indication indicating the TAT timer expiration is received from the lower layer device), or if an indication indicating the beam failure detection is received from the lower layer device (or if the beam failure has occurred), or if the beam failure detection procedure or the RLM procedure for the deactivated cell group is not configured, or if the radio link failure procedure is detected in the RLM procedure (or if the second timer T310 has expired, or if the radio link to the SCG is not effective), or if the reconfigurationWithSync configuration information is not included in the spCell-Config of the SCG in the message,
- 3> The UE may perform (or trigger or start) the random access procedure with respect to the SpCell (or SCG or PSCell).
- 3> Alternatively, if the UE is configured (or indicated) to activate the cell group, the UE may perform the random access procedure, or the UE may stop the TAT timer (or TAT timer for PTAG) connected (or configured) to the PSCell (or SCG) (or may consider that the TAT timer has expired).
- 2> Else
- 3> The UE may end the performing procedure.
- 1> If the reconfigurationWithSync configuration information is included in the spCellConfig of the MCG or SCG in the message, and if the MAC layer device of the NR cell group has successfully completed the random access procedure triggered as above,
- 2> The first timer T304 for the cell group may be stopped (or if the timer is being driven).
- 2> The second timer T310 for the cell group or the source SpCell may be stopped (or if the timer is being driven).

The message includes the reconfigurationWithSync, and when the UE performs a reconfiguration procedure (reconfiguration with Sync) for synchronization, the following procedures may be performed.
- 1> If a dual active protocol stack (DAPS) bearer is not configured, or if the cell group (or SCG) is not configured to be in the deactivated state, or if RLM-related configuration for the deactivated cell group or beam failure detection related configuration information is not configured (if the cell group is configured to be in the deactivated state, quick cell group activation is supported by continuously driving the second timer and performing the RLM procedure), or if this procedure is not performed with respect to the deactivated cell group (or SCG),
- 2> The second timer T310 for the cell group or the SpCell may be stopped (or if the timer is running).
- 1> The third timer T312 for the cell group or the SpCell may be stopped (or if the timer is running).
- 1> If the cell group (or SCG) is not configured to be in the deactivated state, or if this procedure is not performed with respect to the deactivated cell group (or SCG),
- 2> The value of the first timer T304 included in the reconfigurationWithSync configuration information of the message is configured, and the first timer T304 for the SpCell (PCell of MCG or PSCell of SCG) may start.

As provided in the disclosure, if the RLM-related configuration information or the beam failure detection related configuration information is configured with respect to the deactivated cell group (or SCG) in the RRC message (e.g., RRCReconfiguration message), the UE may perform a radio link failure detection procedure as follows.
- 1> If the cell group is configured to be in the deactivated state (or if the beam failure detection procedure or the RLM procedure is configured with respect to the deactivated cell group), or if an indication indicating asynchronous SpCell is received from the lower layer device as many as a specific number of times (e.g., value of N310),
- 2> The second timer T310 for the SpCell may start. (When the cell group is activated (or when the cell group is configured to be activated), or when the cell group is not configured to be deactivated, or when the random access procedure for the SpCell starts or is performed, the second timer T310 being driven may be stopped. Further, if the second timer expires, the occurrence of the radio link failure for the cell group may be declared).
- 1> If a certain DAPS bearer is configured, or if an indication indicating asynchronous source SpCell is received from the lower layer device as many as a specific number of times (e.g., value of N310), or if the first timer is being driven,
- 2> The second timer T310 for the source SpCell may start.
- 1> If the indication indicating the asynchronous SpCell is received from the lower layer device as many as a specific number of times (e.g., value of N310), or if the first timer T304 or the fourth timer is not being driven,
- 2> The second timer T310 for the source SpCell may start.

Next, the disclosure proposes a third embodiment of a UE operation in consideration of dual-connection technology configuration information when the RRC message (e.g., RRCReconfiguration message) is received. The embodiment proposes a procedure capable of activating a cell group without a random access procedure (RACH less activation) when the UE activates, adds, or changes the cell group.

If the UE receives the RRCReconfiguration message, the UE may perform the following procedures.
- 1> If MCG (or master node (MN)) is configured to LTE (E-UTRA) and SCG (or secondary node (SN)) is configured to NR (i.e., E-UTRA nr-SecondaryCellGroupConfig is configured) for the UE, or the UE is configured to (NG)EN-DC (next generation E-UTRA NR-dual connectivity connected to 5GC),
  - 2> If the RRCReconfiguration message is received through an E-UTRA RRC message in a MobilityFromNRCommand message (message indicating a handover from NR to (NG)EN-DC),
    - 3> If the reconfigurationWithSync configuration information is included in the spCellConfig of the SCG in the message, or if the cell group of the SCG is not configured to be in the deactivated state, or if a TimeAlignmentTimer (TAT) timer being driven in the MAC layer device (timer that determines effectiveness of a timing advance (TA) value for synchronization between the UE and the base station) is not being driven (or if the TAT timer has expired or if an indication indicating the TAT timer expiration is received from a lower layer device), or if an indication indicating the beam failure detection is received from the lower layer device (or if beam failure has occurred), or if the beam failure detection procedure or the RLM procedure for the deactivated cell group is not configured, or if a radio link failure procedure is detected in the RLM procedure (or if the second timer T310 has expired or a radio link to the SCG is not effective),
      - 4> The UE may perform (or trigger or start) a random access procedure with respect to the SpCell (or SCG or PSCell).
      - 4> Further, if the UE is configured (or indicated) to perform the random access procedure, or if the UE is configured (or indicated) to activate the cell group, the UE may perform the random access procedure, or may stop the TAT timer (or TAT timer for PTAG) connected (or configured)

to the PSCell (or SCG) (or may consider that the TAT timer has expired).
3> Else if the cell group of the SCG is not configured to be in the deactivated state, or if a new indicator (e.g., RACH-less indication or the second reconfigurationWithSync) is included in the message and is indicated not to perform the random access procedure, or if the TimeAlignmentTimer (TAT) timer being driven in the MAC layer device (timer that determines effectiveness of a timing advance (TA) value for synchronization between the UE and the base station) is being driven (or if the TAT timer has not expired, or if an indication indicating the TAT timer expiration is not received from the lower layer device), or if an indication indicating the beam failure detection is not received from the lower layer device (or if the beam failure has not occurred), or if the beam failure detection procedure or the RLM procedure for the deactivated cell group is configured, or if a radio link failure procedure is not detected in the RLM procedure (or if the second timer T310 has not expired, or if the radio link to the SCG is effective), or if the reconfigurationWithSync configuration information is not included in the spCellConfig of the SCG in the message,
    4> The UE may not perform (or trigger or start) the random access procedure with respect to the SpCell (or SCG or PSCell).
    4> The UE may activate the SpCell without the random access procedure, or the UE may start PDCCH monitoring with respect to the SpCell, or the UE may start PDSCH reception.
    4> In order to identify whether the UE has successfully activated the SpCell without the random access procedure, a new fourth timer may be introduced. For example, when the above condition is satisfied, the fourth timer may start. The fourth timer may be stopped in case that the PDCCH or PDSCH is successfully received from the SpCell. If the fourth timer expires, the UE may trigger an SCG failure report procedure, and may report this through MCG. As another method, if the fourth timer expires, the UE may perform a random access procedure (e.g., contention based random access (CBRA) or contention free random access (CFRA)) or a 2-step random access procedure (2-step RACH) (i.e., a random access procedure as a fallback) based on configuration information (e.g., it may be configured as the second reconfigurationWithSync, or may be configured as preamble information, smtc information, or new UE identifier (RNTI value), or may be configured, stored, and used as a Need code of S) for a separate random access procedure, being configured in the RRC message or being broadcasted through the system information. As still another method, if a cell group activation procedure has failed (e.g., if the PDCCH or the PDSCH has not been successfully received for a predetermined time) without the random access procedure, the UE may perform a random access procedure (e.g., contention based random access (CBRA) or contention free random access (CFRA)) or a 2-step random access procedure (2-step RACH) (i.e., a random access procedure as a fallback) based on configuration information for a separate random access procedure, being configured in the RRC message or being broadcasted through the system information. The configuration information for the separate random access procedure may be configured when the instructions to deactivate the cell group is transmitted to the UE through the RRC message, or may be configured when the instructions (or reconfigurationWithSync) to activate the cell group to the UE through the RRC message.
3> Else if the cell group of the SCG is not configured to be in the deactivated state, or if a new indicator (e.g., RACH-less indication) is included in the message and is indicated not to perform the random access procedure, or if the TimeAlignmentTimer (TAT) timer being driven in the MAC layer device (timer that determines effectiveness of the timing advance (TA) value for synchronization between the UE and the base station) is not being driven (or if the TAT timer has expired, or if an indication indicating the TAT timer expiration is received from the lower layer device), or if an indication indicating the beam failure detection is received from the lower layer device (or if beam failure has occurred), or if the beam failure detection procedure or the RLM procedure for the deactivated cell group is not configured, or if the radio link failure procedure is detected in the RLM procedure (or if the second timer T310 has expired, or if the radio link to the SCG is not effective), or if the reconfigurationWithSync configuration information is not included in the spCellConfig of the SCG in the message,
    4> The UE may perform (or trigger or start) the random access procedure with respect to the SpCell (or SCG or PSCell).
    4> Further, if the UE is configured (or indicated) to activate the cell group, the UE may perform the random access procedure, or may stop the TAT timer (or TAT timer for PTAG) connected (or configured) to the PSCell (or SCG) (or may consider that the TAT timer has expired).
3> Else
    4> The UE may end the performing procedure.
1> If MCG (or master node (MN)) is configured to NR and SCG (secondary node (SN)) is configured to NR (i.e., E-UTRA nr-SecondaryCellGroupConfig is configured) for the UE, or if the UE is configured to NR-DC (NR-dual connectivity connected to 5GC), or if the RRCReconfiguration message is received in nr-SCG of the mrdc-SecondaryCellGroup configuration information through SRB1, or if the mrdc-SecondaryCellGroup configuration information is received in the RRCReconfiguration or RRCResume message through the SRB1,
  2> If the reconfigurationWithSync configuration information is included in the spCellConfig of the nr-SCG in the message, or if the cell group of the SCG is not configured to be in the deactivated state, or if the TimeAlignmentTimer (TAT) timer being driven in the MAC layer device (timer that determines effectiveness of the timing advance (TA) value for synchronization between the UE and the base station) is not being driven (or if the TAT timer has expired, or if an indication indicating the TAT timer expiration is received from the lower layer device), or if an indication indicating the beam failure detection is received from the lower layer device (or if the beam failure has occurred), or if the beam failure detection procedure or the RLM procedure for the deactivated cell group is not configured, or if the radio link failure procedure is detected in the RLM procedure (or if the second timer T310 has expired or the radio link to the SCG is not effective), 3> The UE may perform (or trigger or start) the random access procedure with respect to the SpCell (or SCG or PSCell).

3> Alternatively, if the UE is configured (or indicated) to perform the random access procedure, or if the UE is configured (or indicated) to activate the cell group, the UE may perform the random access procedure, or may stop the TAT timer (or TAT timer for PTAG) connected (or configured) to the PSCell (or SCG) (or may consider that the TAT timer has expired).

2> Else if the cell group of the SCG is not configured to be in the deactivated state, or if a new indicator (e.g., RACH-less indication or the second reconfigurationWithSync) is included in the message and is indicated not to perform the random access procedure, or if the TimeAlignmentTimer (TAT) timer being driven in the MAC layer device (timer that determines effectiveness of the timing advance (TA) value for synchronization between the UE and the base station) is being driven (or if the TAT timer has not expired, or if an indication indicating the TAT timer expiration is not received from the lower layer device), or if an indication indicating the beam failure detection is not received from the lower layer device (or if the beam failure has not occurred), or if the beam failure detection procedure or the RLM procedure for the deactivated cell group is configured, or if the radio link failure procedure is not detected in the RLM procedure (or if the second timer T310 has not expired, or if the radio link to the SCG is effective), or if the reconfigurationWithSync configuration information is not included in the spCellConfig of the SCG in the message, 3> The UE may not perform (or trigger or start) the random access procedure with respect to the SpCell (or SCG or PSCell).

3> The UE may activate the SpCell without the random access procedure, or the UE may start PDCCH monitoring with respect to the SpCell, or the UE may start the PDSCH reception.

3> In order to identify whether the UE has successfully activated the SpCell without the random access procedure, a new fourth timer may be introduced. For example, when the above condition is satisfied, the fourth timer may start. The fourth timer may be stopped in case that the PDCCH or PDSCH is successfully received from the SpCell. If the fourth timer expires, the UE may trigger an SCG failure report procedure, and may report this through MCG. As another method, if the fourth timer expires, the UE may perform a random access procedure (e.g., contention based random access (CBRA) or contention free random access (CFRA)) or a 2-step random access procedure (2-step RACH) (i.e., a random access procedure as a fallback) based on configuration information (e.g., it may be configured as the second reconfigurationWithSync, or may be configured as preamble information, smtc information, or new UE identifier (RNTI value), or may be configured, stored, and used as a Need code of S) for a separate random access procedure, being configured in the RRC message or being broadcasted through the system information. As still another method, if a cell group activation procedure has failed (e.g., if the PDCCH or the PDSCH has not been successfully received for a predetermined time) without the random access procedure, the UE may perform a random access procedure (e.g., contention based random access (CBRA) or contention free random access (CFRA)) or a 2-step random access procedure (2-step RACH) (i.e., a random access procedure as a fallback) based on configuration information for a separate random access procedure, being configured in the RRC message or being broadcasted through the system information. The configuration information for the separate random access procedure may be configured when the instructions to deactivate the cell group is transmitted to the UE through the RRC message, or may be configured when the instructions (or reconfigurationWithSync) to activate the cell group to the UE through the RRC message.

2> Else if the cell group of the SCG is not configured to be in the deactivated state, or if a new indicator (e.g., RACH-less indication) is included in the message and is indicated not to perform the random access procedure, or if the TimeAlignmentTimer (TAT) timer being driven in the MAC layer device (timer that determines effectiveness of the timing advance (TA) value for synchronization between the UE and the base station) is not being driven (or if the TAT timer has expired, or if an indication indicating the TAT timer expiration is received from the lower layer device), or if an indication indicating the beam failure detection is received from the lower layer device (or if the beam failure has occurred), or if the beam failure detection procedure or the RLM procedure for the deactivated cell group is not configured, or if the radio link failure procedure is detected in the RLM procedure (or if the second timer T310 has expired, or if the radio link to the SCG is not effective), or if the reconfigurationWithSync configuration information is not included in the spCellConfig of the SCG in the message, 3> The UE may perform (or trigger or start) the random access procedure with respect to the SpCell (or SCG or PSCell).

3> Alternatively, if the UE is configured (or indicated) to activate the cell group, the UE may perform the random access procedure, or the UE may stop the TAT timer (or TAT timer for PTAG) connected (or configured) to the PSCell (or SCG) (or may consider that the TAT timer has expired).

2> Else

3> The UE may end the performing procedure.

1> If the reconfigurationWithSync configuration information is included in the spCellConfig of the MCG or SCG in the message, and if the MAC layer device of the NR cell group has successfully completed the random access procedure triggered as above, 2> The first timer T304 for the cell group may be stopped (or if the timer is running).

2> The second timer T310 for the cell group or the source SpCell may be stopped (or if the timer is running).

The message includes the reconfigurationWithSync, and when the UE performs a reconfiguration procedure (reconfiguration with Sync) for synchronization, the following procedures may be performed.

1> If a dual active protocol stack (DAPS) bearer is not configured, or if the cell group (or SCG) is not configured to be in the deactivated state, or if RLM-related configuration for the deactivated cell group or beam failure detection related configuration information is not configured (if the cell group is configured to be in the deactivated state, quick cell group activation is supported by continuously driving the second timer and performing the RLM procedure), or if this procedure is not performed with respect to the deactivated cell group (or SCG), 2> The second timer T310 for the cell group or the SpCell may be stopped (or if the timer is running).

1> The third timer T312 for the cell group or the SpCell may be stopped (or if the timer is running).

1> If the cell group (or SCG) is not configured to be in the deactivated state, or if this procedure is not performed with respect to the deactivated cell group (or SCG), 2> The value of the first timer T304 included in the reconfigurationWithSync configuration information of the message is configured, and the first timer T304 for the SpCell (PCell of MCG or PSCell of SCG) may start.

As provided in the disclosure, if the RLM-related configuration information or the beam failure detection related configuration information is configured with respect to the deactivated cell group (or SCG) in the RRC message (e.g., RRCReconfiguration message), the UE may perform a radio link failure detection procedure as follows.

1> If the cell group is configured to be in the deactivated state (or if the beam failure detection procedure or the RLM procedure is configured with respect to the deactivated cell group), or if an indication indicating asynchronous SpCell is received from the lower layer device as many as a specific number of times (e.g., value of N310), 2> The second timer T310 for the SpCell may start. (When the cell group is activated (or when the cell group is configured to be activated), or when the cell group is not configured to be deactivated, or when the random access procedure for the SpCell starts or is performed, the second timer T310 being driven may be stopped. Further, if the second timer expires, the occurrence of the radio link failure for the cell group may be declared).

1> If a certain DAPS bearer is configured, or if an indication indicating asynchronous source SpCell is received from the lower layer device as many as a specific number of times (e.g., value of N310), or if the first timer is being driven, 2> The second timer T310 for the source SpCell may start.

1> If the indication indicating the asynchronous SpCell is received from the lower layer device as many as a specific number of times (e.g., value of N310), or if the first timer T304 or the fourth timer is not being driven, 2> The second timer T310 for the source SpCell may start.

The UE may receive the second RRC message in operation 11-20 or apply the received configuration information, generate a third RRC message in operation 11-25 or a fourth RRC message, and transmit the same to the base station in operation 11-25. The third RRC message may include some pieces of the following information:

A second RRC message identifier having a value which is the same as the second RRC message identifier included in the second RRC message;

An indicator or an identifier indicating successful reception of the second RRC message; or A fourth RRC message including a response indicating successful reception of the first message generated and transmitted by the secondary base station.

The fourth RRC message may include some pieces of the following information:

A first RRC message identifier having a value which is the same as the first RRC message identifier included in the first RRC message;

An indicator or an identifier indicating successful reception of the first RRC message; or A response indicator indicating successful application of the first RRC message.

When receiving the third RRC message, the base station (for example, master base station) may identify whether the third RRC message is a response message of the second RRC message through the second identifier. The base station may identify the fourth RRC message included in the third RRC message, insert the fourth RRC message into a setup completion message including an indication of configuration completion to the secondary cell group base station, and transmit the configuration completion message to the secondary base station through the Xn interface (for example, interface between base stations) or the Sn interface (interface between the base station and the AMF or UMF or between base stations) in operation 11-30. The configuration completion message may include at least one of the following information:

The fourth RRC message included in the third RRC message; or

An indicator or an identifier indicating completion of the configuration (cell group addition, modification, or release) or indication (cell group activation, deactivation, suspension, or resumption) indicated by the request acceptance message or the first RRC message.

When receiving the configuration completion message, the base station (for example, secondary base station) may read or identify the fourth RRC message included in the configuration completion message and identify whether the fourth RRC message is a response message of the first RRC message through the first identifier. Further, it may be identified whether the configuration or indication indicated by the base station is completed. When receiving the configuration completion message or the fourth RRC message, the secondary base station may transmit a response message indicating reception of the configuration completion message or the fourth RRC message to the master base station.

Figure 12:
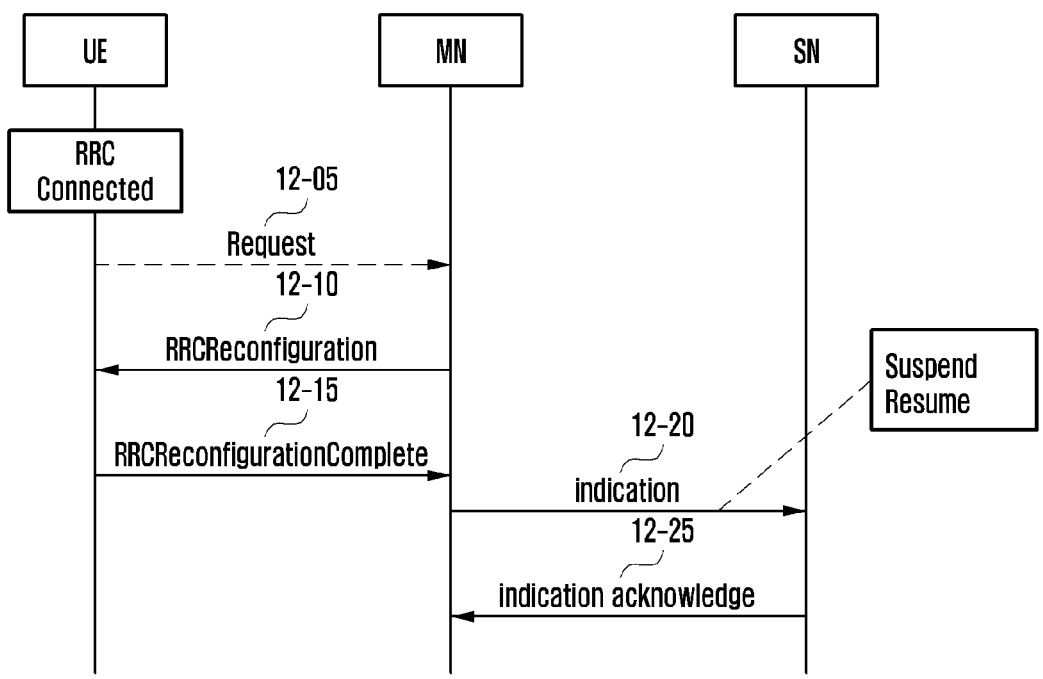
FIG. 12 illustrates an example of a second signaling procedure in which a dual-connection technology is configured or cleared, or a secondary cell group configured by the dual-connection technology is configured or cleared, activated, resumed, suspended, or deactivated according to an embodiment of the present disclosure.

FIG. 12 illustrates a second signaling procedure of configuring or releasing a dual connectivity or configuring, releasing, activating, resuming, suspending, or deactivating a secondary cell group configured by the dual connectivity according to an embodiment of the present disclosure.

Referring to FIG. 12, as illustrated in FIG. 6 of the disclosure, the UE may establish an RRC connection with the network or the base station and transmit or receive data to or from the base station (for example, a master cell group, a master node (MN), or an MCG, or cells (PCell or SCell) of the master cell group).

The base station may configure dual connectivity in the UE for a predetermined reason (for example, when a high data transmission rate is required, by a request from the UE in operation 12-05, or when a high QoS requirement may be satisfied). For example, the UE may make a request for configuring, releasing, releasing, activating, deactivating, resuming, or suspending the dual connectivity, the cell group (for example, secondary cell group), or the cell to the base station, and the request message may include a frequency (or channel) measurement result report, a cell group identifier, cell identifiers, or measurement results in operation 12-05. In another method, the base station may determine whether to configure, release, add, deactivate, activate, resume, modify, reconfigure, or suspend the dual connectivity, the cell group (for example, secondary cell group), or the cell in consideration of an amount of downlink (or uplink) data or an amount of buffers.

The master base station (master node (MN) or master cell group (MCG)) may receive a frequency or channel measurement report for each frequency or channel received from the UE and determine a secondary base station (secondary node (SN) or secondary cell group (SCG)) to configure dual connectivity therein on the basis of the measurement report. Alternatively, the master base station may determine whether to configure, release, add, deactivate, activate, resume, modify, reconfigure, or suspend the dual connectivity, the cell group (for example, secondary cell group), or the cell in consideration of an amount of downlink (or uplink) data or an amount of buffers.

The master base station may transmit the first RRC message to the UE in order to configure, release, add, deactivate, activate, resume, modify, reconfigure, or suspend the dual connectivity for the determined secondary cell base station, the cell group (for example, secondary cell group), or the cell in operation 12-10. For the first RRC message, each separate new request message may be defined and used to indicate, to the UE, configuration, release, addition, deactivation, activation, resumption, modification, reconfiguration, or suspension of the dual connectivity, the cell group (for example, secondary cell group), or the cell, or, in another method, a new indicator may be defined in the existing message (for example, RRCReconfiguration message, RRCResume message, or the like) to indicate (make a request for) configuration, release, addition, deactivation, activation, resumption, modification, reconfiguration, or suspension of the dual connectivity, the cell group (for example, secondary cell group), or the cell.

The first RRC message may include at least one of the following information:
  A first RRC message identifier (for example, rrc-Transaction identifier) for identifying the first RRC message. Since the UE and the base station transmit or receive a plurality of RRC messages, an identifier for identifying each RRC message may be included in the RRC message. For example, an RRC message (for example, RRCReconfigurationComplete) corresponding to the RRC message (for example, RRCReconfiguration) transmitted by a transmission side or the RRC message (for example, RRCReconfiguration) transmitted by a reception side or an RRC message corresponding to the RRC message transmitted by the transmission side may include the same first RRC message identifier;
  Configuration information or an indicator (for example, configuration information or an indicator for the UE) for configuring, releasing, adding, deactivating, activating, resuming, modifying, reconfiguring, or suspending the dual connectivity, the cell group (for example, secondary cell group), or the cell;
  An indicator indicating a state of the cell group (for example, activation, deactivation, suspension, or resumption);
  A cell group identifier for identifying a cell group. The cell group identifier may be allocated by the master base station, or one of the pre-appointed identifier may be allocated by the secondary base station;
  Cell group or cell configuration information;
  Bearer configuration information, for example, indicator information (for example, a PDCP suspension indicator, a PDCP reestablishment indicator, a PDCP data reconstruction indicator, an RLC reestablishment indicator, a MAC partial reset indicator, a MAC reset indicator, or an indicator triggering a new operation) indicating an operation of a protocol layer device of each bearer (for example, SDAP layer device, PDCP layer device, RLC layer device, or MAC layer device);
  A first indicator (for example, mobilityControlInfor or ReconfigurationWithSync) also may be included if the configuration information or the indicator for configuring, adding, activating, resuming, modifying, or reconfiguring the dual connectivity, the cell group (for example, secondary cell group), or the cell is included. However, the first indicator (for example, mobilityControlInfor or ReconfigurationWithSync) may not be included if the configuration information or the indicator for releasing, deactivating, reconfiguring, or suspending the dual connectivity, the cell group (for example, secondary cell group), or the cell is included. The first indicator may be an indicator triggering the random access procedure to the cell group or the cell, an indicator making signal synchronization with a new cell, an indicator indicating frequency movement of the UE, or an indicator indicating the cell group (or cell) modification. In another method, the UE may perform PDCCH monitoring in the indicated or configured cell group or cell, and trigger and perform the random access procedure according to the indication by the PDCCH. For example, the higher layer device (for example, RRC layer device) may transmit an indicator for triggering the random access procedure to the lower layer device (for example, MAC layer device);
  Random access configuration information also may be included if the configuration information of the indicator for configuring, adding, activating, resuming, modifying, or reconfiguring the dual connectivity, the cell group (for example, secondary cell group), or the cell. However, the random access configuration information may not be included if the configuration information or the indicator for releasing, deactivating, reconfiguring, or suspending the dual connectivity, the cell group (or secondary cell group), or the cell. The random access configuration information may include random access transmission resource information (time or frequency transmission resources) for transmitting a preamble for the cell group or the cell or predetermined preamble information;
  Time information indicating when the dual connectivity, the cell group (for example, secondary cell group), or the cell (PSCell or SCG SCell) is activated, resumed, deactivated, or suspended (for example, information indicating timing (for example, X), a time unit, a subframe, a time slot, or a symbol unit), for example, time information indicating whether to, if the message is received in an $n^{th}$ time unit, activate, resume, deactivate, or suspend the cell in an $(n+X)^{th}$ time unit);

First channel measurement configuration information for each cell or bandwidth part;

Second channel measurement configuration information for each cell or bandwidth part;

An indicator that adds the cell group configuration or an indicator (ReconfigurationWithSync) that indicates the cell group change or an indicator (ReconfigurationWithSync or newly defined indicator) that indicates a random access procedure;

An indicator (ReconfigurationWithSync or newly defined indicator) that indicates whether to activate the cell group by performing the random access procedure or to activate the cell group without the random access procedure when the cell group is activated;

Radio resource management (RRM) configuration information or separate RRM configuration information or frequency measurement configuration information (e.g., frequency measurement configuration information (reduced or relaxed RRM configuration information) simplified for battery saving) to be applied or performed when the cell group is deactivated; and Configuration information for radio link monitoring (RLM) or configuration information for the RLM to be applied or performed when the cell group is deactivated.

For example, the configuration information for the RLM may be beam configuration information in the unit of a cell or beam configuration information for each bandwidth part to be measured by the UE when the cell group is deactivated, and may include beam-related configuration information (transmission configuration indication (TCI) state or quasi co-location (QCL)).

Alternatively, the configuration information for the RLM may include a timing advance (TA) value (or an offset value) for synchronization with a downlink signal or an uplink signal of the base station, and a time alignment timer (TAT) indicating effectiveness of the TA value or a TAT value.

Alternatively, the configuration information for the RLM may include synchronization signal block (SSB) configuration information that becomes the target of measurement, channel state information reference signal (CSI-RS) configuration information, reference signal (RS) configuration information, or transmission resource information (e.g., PUCCH configuration information (e.g., scheduling request (SR) information or specific transmission resource) or frequency transmission resource or time transmission resource) that can report the result when a beam failure occurs.

Further, the configuration information for the RLM may include the bandwidth part configuration information (e.g., may be indicated as a bandwidth part identifier) indicating in which bandwidth part the RLM procedure is to be performed. As another method, when the cell group is in the deactivated state, the UE may minimize a cell group activation delay by performing the RLM procedure in the first activated bandwidth part (or first activated downlink bandwidth part (firstActiveDownlinkBWP-ID)) configured in the RRC message and by early monitoring the first activated bandwidth part to be activated when the cell group is activated. As still another method, in case that the cell group is configured in the deactivated state (or activated state), the UE may continuously maintain the connection state with the cell group (e.g., in case that the bandwidth part configuration information indicating in which bandwidth part the RLM procedure is to be performed is not configured) by performing the RLM procedure in the finally (or previously) activated bandwidth part before the cell group is deactivated, whereas in case that the cell group is activated, the UE may perform the activation procedure in the first activated bandwidth part (or first activated downlink bandwidth part (firstActiveDownlinkBWP-ID)) configured in the RRC message. If the bandwidth part related configuration information indicating in which bandwidth part the RLM procedure is to be performed is not configured when the cell group is activated, the RLM procedure may be performed in the finally (or previously) activated bandwidth part.

Further, the configuration information for the RLM may include the beam-related configuration information (e.g., may be indicated as the bandwidth part identifier or TCI state or QCL configuration information) indicating in which beam the RLM procedure is to be performed. As still another method, when the cell group is in the deactivated state, the UE may minimize the cell group activation delay by performing the RLM procedure in the beam (e.g., TCI state or QCL configuration information) configured in the RRC message and by activating the beam, performing the RLM procedure, and early monitoring the beam to be activated when the cell group is activated.

As still another method, in case that the cell group is configured in the deactivated state (or activated state), the UE may continuously maintain the connection state with the cell group (e.g., in case that the beam-related configuration information indicating in which beam the RLM procedure is to be performed is not configured) by performing the RLM procedure in the finally (or previously) activated beam before the cell group is deactivated, whereas in case that the cell group is activated, the UE may perform the activation procedure in the beam configured in the RRC message. If the beam-related configuration information indicating in which beam the RLM procedure is to be performed is not configured when the cell group is activated, the RLM procedure may be performed in the finally (or previously) activated beam.

Configuration information for a beam failure detection procedure or beam failure detection (BFD) or configuration information for the BFD that may be applied or performed when the cell group is deactivated.

For example, the configuration information for the BFD may be beam configuration information in the unit of a cell or beam configuration information for each bandwidth part that may be measured by the UE when the cell group is deactivated, and may include beam-related configuration information (e.g., transmission configuration indication (TCI) state or quasi co-location (QCL)), or the configuration information may include a timing advance (TA) value (or an offset value) for synchronization with a downlink signal or an uplink signal of the base station, a time alignment timer (TAT) indicating effectiveness of the TA value, or a TAT value, or the configuration information for the BFD may include synchronization signal block (SSB) configuration information that becomes the target of measurement, channel state information reference signal (CSI-RS) configuration information, reference signal (RS) configuration information, or transmission resource information (e.g., PUCCH configuration information (e.g., scheduling request (SR) information or specific transmission resource) or frequency transmission resource or time transmission resource) that can report the result when the beam failure occurs.

Further, the configuration information for the BFD may include the bandwidth part configuration information (e.g., may be indicated as a bandwidth part identifier) indicating in which bandwidth part the beam failure detection procedure is to be performed. As another method, when the cell group is in the deactivated state, the UE may minimize a cell group activation delay by performing the beam failure detection procedure in the first activated bandwidth part (or first activated downlink bandwidth part (firstActiveDownlinkBWP-ID)) configured in the RRC message and by early monitoring the first activated bandwidth part to be activated when the cell group is activated. As still another method, in case that the cell group is configured in the deactivated state (or activated state), the UE may continuously maintain the connection state with the cell group (e.g., in case that the bandwidth part configuration information indicating in which bandwidth part the beam failure detection procedure is to be performed is not configured) by performing the beam failure detection procedure in the finally (or previously) activated bandwidth part before the cell group is deactivated, whereas in case that the cell group is activated, the UE may perform the activation procedure in the first activated bandwidth part (or first activated downlink bandwidth part (firstActiveDownlinkBWP-ID)) configured in the RRC message. If the bandwidth part related configuration information indicating in which bandwidth part the beam failure detection procedure is to be performed is not configured when the cell group is activated, the beam failure detection procedure may be performed in the finally (or previously) activated bandwidth part.

Further, the configuration information for the BFD may include the beam-related configuration information (e.g., may be indicated as the bandwidth part identifier or TCI state or QCL configuration information) indicating in which beam the beam failure detection procedure is to be performed. As still another method, when the cell group is in the deactivated state, the UE may minimize the cell group activation delay by performing the beam failure detection procedure in the beam (e.g., TCI state or QCL configuration information) configured in the RRC message and by early monitoring the beam to be activated when the cell group is activated. As still another method, in case that the cell group is configured in the deactivated state (or activated state), the UE may continuously maintain the connection state with the cell group (e.g., in case that the beam-related configuration information indicating in which beam the beam failure detection procedure is to be performed is not configured) by performing the beam failure detection procedure in the finally (or previously) activated beam before the cell group is deactivated, whereas in case that the cell group is activated, the UE may perform the activation procedure in the beam configured in the RRC message. If the beam-related configuration information indicating in which beam the beam failure detection procedure is to be performed is not configured when the cell group is activated, the beam failure detection procedure may be performed in the finally (or previously) activated beam.

When receiving the first RRC message of operation 12-10, the UE may read and identify the first RRC message and configure, add, modify, resume, suspend, or deactivate the dual connectivity or the cell group (for example, secondary cell group). Further, when the first RRC message includes a first indicator triggering the random access procedure, the random access procedure may be triggered for the configured or indicated cell group or cell. If there is the random access information in the RRC message or there is the stored random access information when the random access procedure is performed, the random access procedure (for example, contention free-based random access procedure (for example, 4-step random access or 2-step random access)) may be performed on the basis of the random access information that has been stored or received in the RRC message or on the basis of system information. If there is no random access information in the RRC message, the random access procedure (for example, contention-based random access procedure (for example, 4-step random access or 2-step random access)) may be performed. In another method, the UE may perform PDCCH monitoring in the indicated or configured cell group or cell, and trigger and perform the random access procedure according to the indication by the PDCCH. For example, the higher layer device (for example, RRC layer device) may transmit an indicator for triggering the random access procedure to the lower layer device (for example, MAC layer device).

The UE may receive the first RRC message in operation 12-10 or apply the received configuration information, generate a second RRC message, and transmit the same to the base station in operation 12-15. The second RRC message may include at least one of the following information:
 A first RRC message identifier having a value which is the same as the first RRC message identifier included in the first RRC message, or
 An indicator or an identifier indicating successful reception of the first RRC message.

When receiving the second RRC message, the base station (for example, master base station) may identify whether the second RRC message is a response message of the first RRC message through the first identifier. Further, the base station may identify the first RRC message and transmit an indication message including an indication indicating configuration, addition, release, activation, resumption, suspension, or deactivation of the cell group to the secondary base station through the Xn interface (for example, interface between base stations) or the Sn interface (interface between the base station and the AMF or UMF or between base stations) in operation 12-20. The indication message may include some pieces of the following information:
 An identifier for identifying the indication message, or
 Configuration information or an indicator (for example, configuration information or an indicator for the secondary cell group) for configuring, releasing, adding, deactivating, activating, resuming, modifying, reconfiguring, or suspending the dual connectivity, the cell group (for example, secondary cell group), or the cell.

When receiving the indication message, the base station (for example, secondary base station) may read or identify configuration information included in the indication message or the message, generate an indication acknowledgement message as a response message of the indication message, and transmit the same to the master base station in operation 12-25:
 An identifier having a value which is the same as the identifier included in the indication message;
 An indicator or an identifier indicating successful reception of the indication message; or
 A response indicator indicating successful application of the indication message.

The signaling procedures provided in the disclosure may be merged, modified, and expanded to new signaling procedures. For example, if the message 12-05 is received from the UE, the master base station may ask or request the secondary base station like 12-20 or 11-10 of FIG. 11, may receive a response message like 12-25 or 11-15 of FIG. 11, and then may configure and transmit, to the UE, an RRC message corresponding to 12-10 in accordance with the response message, and the UE may configure a cell group in accordance with the indication of the RRC message, and may transmit the message 12-15 to the master base station in response to the indication.

Figure 13:
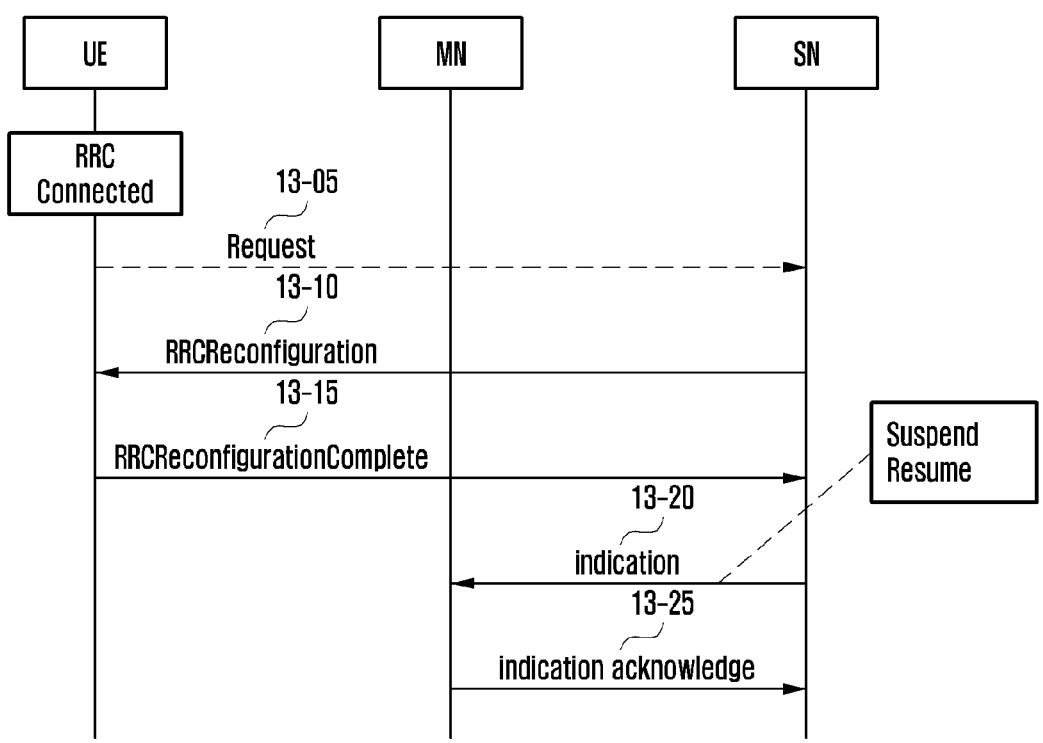
FIG. 13 illustrates an example of a third signaling procedure in which a dual-connection technology is configured or cleared, or a secondary cell group configured by the dual-connection technology is configured or cleared, activated, resumed, suspended, or deactivated according to an embodiment of the present disclosure.

FIG. 13 illustrates an example of a third signaling procedure in which a dual-connection technology is configured or cleared, or a secondary cell group configured by the dual-connection technology is configured or cleared, activated, resumed, suspended, or deactivated according to an embodiment of the present disclosure.

In FIG. 13, the UE may configure an RRC connection with the network or the base station as shown in FIG. 6 of the disclosure, and may perform data transmission or reception with the base station (e.g., master cell group, master node (MN), master cell group (MCG), or cells (PCell or SCell) of the master cell group).

In FIG. 13, the base station may configure, to the UE, an SRB (e.g., SRB3) through which a control message or an RRC message can be directly transmitted or received between the UE and the base station in accordance with the configuration procedure of FIG. 6.

With reference to FIG. 13, the base station (e.g., secondary base station or master base station) may configure dual-connection technology to the UE in accordance with a specific reason (e.g., in case that a high data rate is necessary, by the request from the UE (13-05), or in case that high QoS requirements may be satisfied). For example, the UE may request the base station to configure, release, activate, deactivate, resume, or suspend the dual-connection technology, the cell group (e.g., secondary cell group), or the cell, or may request the secondary base station through the SRB (e.g., SRB3) (13-05). The request message may include a frequency (or channel) measurement result report, a cell group identifier, cell identifiers, or measurement results (13-05). As another method, the secondary base station may determine whether the base station configures, releases, adds, deactivates, activates, resumes, changes, reconfigures, or suspends the dual-connection technology, the cell group (e.g., secondary cell group), or the cell in consideration of a downlink (or uplink) data amount or a buffer amount.

As described above, the secondary base station (master node (MN) or master cell group (MCG)) may receive a frequency or channel measurement report for each frequency or channel received from the UE, and may determine whether to configure, release, add, deactivate, activate, resume, change, reconfigure, or suspend the dual-connection technology, the cell group (e.g., secondary cell group), or the cell based on the measurement report. Further, the secondary base station may determine whether the base station configures, releases, adds, deactivates, activates, resumes, changes, reconfigures, or suspends the dual-connection technology, the cell group (e.g., secondary cell group), or the cell in consideration of the downlink (or uplink) data amount or the buffer amount.

As described above, the secondary base station may transmit the first RRC message to the UE through the SRB (e.g., SRB3) in order to configure, release, add, deactivate, activate, resume, change, reconfigure, or suspend the dual-connection technology, the cell group (e.g., secondary cell group), or the cell (13-10). In the first RRC message, separate new request messages may be defined to instruct the UE to configure, release, add, deactivate, activate, resume, change, reconfigure, or suspend the dual-connection technology, the cell group (e.g., secondary cell group), or the cell. As another method, in an existing message (e.g., RRCReconfiguration message or RRCResume message), a new indicator may be defined to instruct (or request) the UE to configure, release, add, deactivate, activate, resume, change, reconfigure, or suspend the dual-connection technology, the cell group (e.g., secondary cell group), or the cell.

The above-described first RRC message may include at least one of the following pieces of information:

- A first RRC message identifier (e.g., rrc-Transaction identifier) for distinguishing the first RRC message. Since the UE and the base station (e.g., secondary base station) transmit or receive several RRC messages to or from each other, identifiers for distinguishing the respective RRC messages may be included in the RRC message. For example, the same first RRC message identifier may be included in an RRC message (e.g., RRCReconfigurationComplete) corresponding to an RRC message (e.g., RRCReconfiguration) that is transmitted by a transmission end or the RRC message (e.g., RRCReconfiguration) that is transmitted by a reception end, or in an RRC message corresponding to the RRC message that is transmitted by the transmission end;
- Configuration information or an indicator (e.g., configuration information or an indicator for the UE) in order to configure, release, add, deactivate, activate, resume, change, reconfigure, or suspend the dual-connection technology, the cell group (e.g., secondary cell group) or the cell;
- An indicator indicating the cell group state (e.g., being activated, deactivated, suspended, or resumed);
- A cell group identifier for distinguishing cell groups (the cell group identifier may be allocated by the master base station, or one of pre-engaged identifiers may be allocated by the secondary base station);
- A cell group or cell configuration information;
- Bearer configuration information. For example, indicator information (e.g., PDCP suspension indicator, PDCP reestablishment indicator, PDCP data recovery indicator, RLC reestablishment indicator, MAC part initialization indicator, MAC initialization indicator, or indicator that triggers a new operation) that indicates an operation of a protocol layer device (e.g., SDAP layer device, PDCP layer device, RLC layer device, or MAC layer device) of each bearer;
- As described above, in case that the configuration information or the indicator for configuring, adding, activating, resuming, changing, or reconfiguring the dual-connection technology, the cell group (e.g., secondary cell group), or the cell is included, a first indicator (e.g., mobilityControlInfor or ReconfigurationWithSync) may be included together. However, in case that the configuration information or the indicator for releasing, deactivating, reconfiguring, or suspending the dual-connection technology, the cell group (e.g., secondary cell group), or the cell is included, the first indicator (e.g., mobilityControlInfor or ReconfigurationWithSync) may not be included. As described above, the first indicator may be an indicator for triggering the random access procedure to the cell group or the cell, an indicator for signal synchronization with a new cell, an indicator indicating the frequency shift of the UE, or an indicator indicating the change of the cell group (or cell). As still another method, the UE may perform the PDCCH monitoring in the cell group or the cell indicated or configured as above, and may trigger and perform the random access procedure as indicated on the PDCCH. For example, the upper layer device (e.g., RRC layer device) may transmit an indicator for triggering the random access procedure to the lower layer device (e.g., MAC layer device);
- As described above, in case that the configuration information or the indicator for configuring, adding, activating, resuming, changing, or reconfiguring the dual-connection technology, the cell group (e.g., secondary cell group), or the cell is included, random access configuration information may be included together. However, in case that the configuration information or the indicator for releasing, deactivating, reconfiguring, or suspending the dual-connection technology, the cell group (e.g., secondary cell group), or the cell is included, the random access configuration information may not be included. The random access configuration information may include random access transmission resource information (e.g., time or frequency transmission resource) for preamble transmission for the cell group or the cell or designated preamble information;

Time information indicating when to activate, resume, deactivate, or suspend the dual-connection technology, the cell group (e.g., secondary cell group), or the cell (PSCell or SCG SCell) (e.g., timing indication information (e.g., X), time unit, subframe, time slot, or symbol unit). For example, if the message is received in the n-th time unit, the time information indicates whether to activate, resume, deactivate, or suspend the cell in the (n+X)-th time unit;

First channel measurement configuration information for each cell or bandwidth part;

Second channel measurement configuration information for each cell or bandwidth part;

An indicator that adds the cell group configuration or an indicator (ReconfigurationWithSync) that indicates the cell group change or an indicator (ReconfigurationWithSync or newly defined indicator) that indicates a random access procedure;

An indicator (ReconfigurationWithSync or newly defined indicator) that indicates whether to activate the cell group by performing the random access procedure or to activate the cell group without the random access procedure when the cell group is activated;

Radio resource management (RRM) configuration information or frequency measurement configuration information or separate RRM configuration information or the frequency measurement configuration information (e.g., frequency measurement configuration information (reduced or relaxed RRM configuration information) simplified for battery saving) to be applied or performed when the cell group is deactivated; and/or Configuration information for radio link monitoring (RLM) or configuration information for the RLM to be applied or performed when the cell group is deactivated.

For example, the configuration information for the RLM may be beam configuration information in the unit of a cell or beam configuration information for each bandwidth part to be measured by the UE when the cell group is deactivated, and may include beam-related configuration information (transmission configuration indication (TCI) state or quasi co-location (QCL)).

Alternatively, the configuration information for the RLM may include a timing advance (TA) value (or an offset value) for synchronization with a downlink signal or an uplink signal of the base station, and a time alignment timer (TAT) indicating effectiveness of the TA value or a TAT value.

Alternatively, the configuration information for the RLM may include synchronization signal block (SSB) configuration information that becomes the target of measurement, channel state information reference signal (CSI-RS) configuration information, reference signal (RS) configuration information, or transmission resource information (e.g., PUCCH configuration information (e.g., scheduling request (SR) information or specific transmission resource) or frequency transmission resource or time transmission resource) that can report the result when a beam failure occurs.

Further, the configuration information for the RLM may include the bandwidth part configuration information (e.g., may be indicated as a bandwidth part identifier) indicating in which bandwidth part the RLM procedure is to be performed. As another method, when the cell group is in the deactivated state, the UE may minimize a cell group activation delay by performing the RLM procedure in the first activated bandwidth part (or first activated downlink bandwidth part (firstActiveDownlinkBWP-ID)) configured in the RRC message and by early monitoring the first activated bandwidth part to be activated when the cell group is activated. As still another method, in case that the cell group is configured in the deactivated state (or activated state), the UE may continuously maintain the connection state with the cell group (e.g., in case that the bandwidth part configuration information indicating in which bandwidth part the RLM procedure is to be performed is not configured) by performing the RLM procedure in the finally (or previously) activated bandwidth part before the cell group is deactivated, whereas in case that the cell group is activated, the UE may perform the activation procedure in the first activated bandwidth part (or first activated downlink bandwidth part (firstActiveDownlinkBWP-ID)) configured in the RRC message. If the bandwidth part related configuration information indicating in which bandwidth part the RLM procedure is to be performed is not configured when the cell group is activated, the RLM procedure may be performed in the finally (or previously) activated bandwidth part.

Further, the configuration information for the RLM may include the beam-related configuration information (e.g., may be indicated as the bandwidth part identifier or TCI state or QCL configuration information) indicating in which beam the RLM procedure is to be performed. As still another method, when the cell group is in the deactivated state, the UE may minimize the cell group activation delay by performing the RLM procedure in the beam (e.g., TCI state or QCL configuration information) configured in the RRC message and by activating the beam, performing the RLM procedure, and early monitoring the beam to be activated when the cell group is activated.

As still another method, in case that the cell group is configured in the deactivated state (or activated state), the UE may continuously maintain the connection state with the cell group (e.g., in case that the beam-related configuration information indicating in which beam the RLM procedure is to be performed is not configured) by performing the RLM procedure in the finally (or previously) activated beam before the cell group is deactivated, whereas in case that the cell group is activated, the UE may perform the activation procedure in the beam configured in the RRC message. If the beam-related configuration information indicating in which beam the RLM procedure is to be performed is not configured when the cell group is activated, the RLM procedure may be performed in the finally (or previously) activated beam.

Configuration information for a beam failure detection procedure or beam failure detection (BFD) or configuration information for the BFD that may be applied or performed when the cell group is deactivated.

For example, the configuration information for the BFD may be beam configuration information in the unit of a cell or beam configuration information for each bandwidth part that may be measured by the UE when the cell group is deactivated, and may include beam-related configuration information (e.g., transmission configuration indication (TCI) state or quasi co-location (QCL)).

Alternatively, the configuration information for the BFD may include a timing advance (TA) value (or an offset value) for synchronization with a downlink signal or an uplink signal of the base station, a time alignment timer (TAT) indicating effectiveness of the TA value, or a TAT value.

Alternatively, the configuration information for the BFD may include synchronization signal block (SSB) configuration information that becomes the target of measurement, channel state information reference signal (CSI-RS) configuration information, reference signal (RS) configuration information, or transmission resource information (e.g., PUCCH configuration information (e.g., scheduling request (SR) information or specific transmission resource) or frequency transmission resource or time transmission resource) that can report the result when the beam failure occurs.

Further, the configuration information for the BFD may include the bandwidth part configuration information (e.g., may be indicated as a bandwidth part identifier) indicating in which bandwidth part the beam failure detection procedure is to be performed. As another method, when the cell group is in the deactivated state, the UE may minimize a cell group activation delay by performing the beam failure detection procedure in the first activated bandwidth part (or first activated downlink bandwidth part (firstActiveDownlinkBWP-ID)) configured in the RRC message and by early monitoring the first activated bandwidth part to be activated when the cell group is activated. As still another method, in case that the cell group is configured in the deactivated state (or activated state), the UE may continuously maintain the connection state with the cell group (e.g., in case that the bandwidth part configuration information indicating in which bandwidth part the beam failure detection procedure is to be performed is not configured) by performing the beam failure detection procedure in the finally (or previously) activated bandwidth part before the cell group is deactivated, whereas in case that the cell group is activated, the UE may perform the activation procedure in the first activated bandwidth part (or first activated downlink bandwidth part (firstActiveDownlinkBWP-ID)) configured in the RRC message. If the bandwidth part related configuration information indicating in which bandwidth part the beam failure detection procedure is to be performed is not configured when the cell group is activated, the beam failure detection procedure may be performed in the finally (or previously) activated bandwidth part.

Further, the configuration information for the BFD may include the beam-related configuration information (e.g., may be indicated as the bandwidth part identifier or TCI state or QCL configuration information) indicating in which beam the beam failure detection procedure is to be performed. As still another method, when the cell group is in the deactivated state, the UE may minimize the cell group activation delay by performing the beam failure detection procedure in the beam (e.g., TCI state or QCL configuration information) configured in the RRC message and by early monitoring the beam to be activated when the cell group is activated.

As still another method, in case that the cell group is configured in the deactivated state (or activated state), the UE may continuously maintain the connection state with the cell group (e.g., in case that the beam-related configuration information indicating in which beam the beam failure detection procedure is to be performed is not configured) by performing the beam failure detection procedure in the finally (or previously) activated beam before the cell group is deactivated, whereas in case that the cell group is activated, the UE may perform the activation procedure in the beam configured in the RRC message. If the beam-related configuration information indicating in which beam the beam failure detection procedure is to be performed is not configured when the cell group is activated, the beam failure detection procedure may be performed in the finally (or previously) activated beam.

When receiving the first RRC message through SRB3 in operation 13-10, the UE may read and identify the first RRC message and configure, add, modify, resume, suspend, or deactivate the dual connectivity or the cell group (for example, secondary cell group). Further, when the first RRC message includes a first indicator triggering the random access procedure, the random access procedure may be triggered for the configured or indicated cell group or cell. If there is the random access information in the RRC message or there is the stored random access information when the random access procedure is performed, the random access procedure (for example, contention free-based random access procedure (for example, 4-step random access or 2-step random access)) may be performed on the basis of the random access information that has been stored or received in the RRC message or on the basis of system information.

If there is no random access information in the RRC message, the random access procedure (for example, contention-based random access procedure (for example, 4-step random access or 2-step random access)) may be performed. In another method, the UE may perform PDCCH monitoring in the indicated or configured cell group or cell, and trigger and perform the random access procedure according to the indication by the PDCCH. For example, the higher layer device (for example, RRC layer device) may transmit an indicator for triggering the random access procedure to the lower layer device (for example, MAC layer device).

The UE may receive the first RRC message in operation 13-10 or apply the received configuration information, generate a second RRC message, and transmit the same to the secondary base station through SRB3 in operation 13-15. The second RRC message may include at least one of the following information:
  A first RRC message identifier having a value which is the same as the first RRC message identifier included in the first RRC message, or
  An indicator or an identifier indicating successful reception of the first RRC message.

When receiving the second RRC message, the base station (for example, secondary base station) may identify whether the second RRC message is a response message of the first RRC message through a first identifier. Further, the base station may identify the first RRC message and transmit, to the master base station, an indication message including an indication indicating configuration, addition, release, activation, resumption, suspension, or deactivation of the cell group in the master base station or the master cell group through the Xn interface (for example, interface between base stations) or the Sn interface (interface between the base station and the AMF or UMF or between base stations) in operation 13-20. The indication message may include at least one of the following information:
  An identifier for identifying the indication message, or
  Configuration information or an indicator (for example, configuration information or an indicator for the secondary cell group) for configuring, releasing, adding, deactivating, activating, resuming, modifying, reconfiguring, or suspending the dual connectivity, the cell group (for example, secondary cell group), or the cell.

When receiving the indication message, the base station (for example, master base station) may read or identify configuration information included in the indication message or the message, generate an indication acknowledgement message as a response message of the indication message, and transmit the same to the secondary base station in operation 13-25.

The indication acknowledgement message may include at least one of the following information:

An identifier having a value which is the same as the identifier included in the indication message, An indicator or an identifier indicating successful reception of the indication message, or A response indicator indicating successful application of the indication message.

When the message is transmitted to the UE in order to configure or indicate cell group or cell configuration information provided in the disclosure to the UE, for example, when the message includes configuration information or an indicator for configuring, adding, activating, resuming, modifying, or reconfiguring the dual connectivity, the cell group (for example, secondary cell group), or the cell, SDAP configuration information may be included or reconfigured, or mapping configuration information between a bearer of SDAP layer device and QoS flow may be included, configured, or reconfigured. However, when the configuration information or the indicator for releasing, deactivating, reconfiguring, or suspending the dual connectivity, the cell group (for example, secondary cell group), or the cell is included, the SDAP configuration information may not be included, not reconfigured, or the mapping configuration information between the bearer of the SDAP layer device and QoS flow may not be included, not configured, or not reconfigured, or the application thereof may be stopped.

The signaling procedures provided in the disclosure may be combined and modified, and extended to new signaling procedures.

The signaling procedures provided in the disclosure may be extended to a multi-access technology. For example, configuration information of a plurality of cell groups may be configured in the UE through the RRC message, and one or a plurality of cell groups (or cells) among the plurality of configured cell groups may be activated or resumed through an indicator of the PDCCH, MAC control information, or the RRC message or one or a plurality of cell groups may be suspended or deactivated.

Hereinafter, the disclosure proposes a UE operation for each cell (PSCell or SCG SCell) or a UE operation for each protocol layer device (for example, SDAP layer device, PDCP layer device, RLC layer device, MAC layer device, or PHY layer device) when the dual connectivity, the cell group (for example, secondary cell group), or the cell (PSCell or SCG SCell) is activated, resumed, added, deactivated, released, or suspended.

1> If the UE receives configuration information or an indicator (for example, through PDCCH DCI, MAC control information, or the RRC message) for configuring, adding, activating, resuming, modifying, or reconfiguring the dual connectivity, the cell group (for example, secondary cell group), or the cell, the UE may perform some of the following procedures.

2> The higher layer device (for example, RRC layer device) may indicate the configuration information or the indicator to the lower layer device (for example, PDCP layer device, RLC layer device, MAC layer device, or PHY layer device).

2> The UE operation for the PSCell: when the UE receives the configuration information or the indicator, the UE may maintain the PSCell in the activated state, activate a downlink BWP of the PSCell to the normal BWP (for example, a BWP which is not the first active BWP or not the dormant BWP) configured in the RRC message or to the last activated BWP, and perform a UE operation in the activated BWP. In another method, when the UE receives the configuration information or the indicator, the UE may maintain the PSCell in the activated state, reconfigure or switch a PDCCH monitoring period of the PSCell or a DRX configuration period to a short period on the basis of first DRX configuration information, perform PDCCH monitoring, and perform a UE operation of the activated cell. Through the above method, the UE operation for the PSCell may be performed, a scheduling indication may be rapidly received form a cell group or a cell, and data transmission or reception may be started. Further, the UE may measure many or frequent channel signals on the basis of first channel measurement configuration information configured in the RRC message and rapidly transmit a measurement result through a channel measurement report to the base station in order to more rapidly receive the scheduling indication from the cell group or the cell and start data transmission or reception. When a predetermined condition is satisfied, the UE may measure a channel signal on the basis of second channel measurement configuration information and transmit a measurement result to the base station.

2> A UE operation for the SCell of the secondary cell group: when the UE receives the configuration information or the indicator, the UE may activate the S cell of the secondary cell group, activate the downlink BWP or the uplink BWP to a BWP (for example, a first active BWP) configured in the RRC message, and perform a UE operation of the activated S cell or BWP. In another method, when the UE receives the configuration information or the indicator, if a dormant BWP is configured in the Scell of the secondary cell group, the UE may maintain the Scell in the activated state, activate the downlink BWP of the Scell to the BWP (for example, first active BWP) configured in the RRC message, perform the UE operation in the activated BWP. Alternatively, if the dormant BWP is not configured in the Scell of the secondary cell group, the UE may switch the Scell to the activated state, activate the downlink BWP or the uplink BWP to the BWP (for example, first active BWP) configured in the RRC message, and perform the UP operation in the activated Scell or BWP. In another method, when the UE receives the configuration information or the indicator, the UE may determine the state of the SCell or switching, activation, or deactivation of the BWP according to Scell configuration information or an indicator configured in the message including the configuration information or the indicator and perform the UE operation.

2> A UE operation of the MAC layer device for the secondary cell group: when the UE receives the configuration information or the indicator, the UE may perform an initialization procedure (MAC reset) for the MAC layer device (for example, reset or release configuration information configured in the MAC layer device, stop or reset configured timers, or stop or reset the HARQ procedure). For example, it may be considered that a timing advance timer (TAT) indicating validity of signal synchronization between the UE and the base station has stopped or expired. In another method, when the UE receives the configuration information or the indicator, the UE may perform the MAC partial reset procedure (or when an indicator indicating the MAC partial reset procedure is included in the message including the configuration information or the indicator, the MAC partial reset procedure may be performed). For example, the UE may continuously maintain the timing advance timer (TAT) indicating validity of signal synchronization between the UE and the base station and continuously perform HARQ retransmission being performed. In another method, the UE may maintain the current configuration without performing any procedure for the MAC layer device. Further, an indication indicating triggering of the random access procedure is received from the higher layer device (for example, RRC layer device) or the TAT has stopped or expired, the UE may trigger the random access procedure. In another method, when the TAT has not stopped or expired, the UE may not trigger or perform the random access procedure. This is because, when the TAT is running, the signal synchronization with the secondary cell group is achieved or maintained, and thus in this case an unnecessary random access procedure may be performed. In another method, when the base station triggers the random access procedure by an indication of the PDCCH, the UE may trigger the random access procedure and configure or adjust a Timing Advance (TA) value or start the TAT. After completing the random access procedure, the UE may resume or activate the secondary cell group and restart data transmission or reception. The random access procedure may include a Contention-Based Random Access (CBRA) procedure. In another method, when the random access procedure is performed, if dedicated random access configuration information (dedicated RACH config or dedicated preamble) is configured (or included) in a message indicating activation or resumption of the cell group (or a previously received message), a Contention Free Random Access (CFRA) procedure may be performed. If the dedicated random access configuration information (dedicated RACH config or dedicated preamble) is not configured (or included) in the message indicating activation or resumption of the cell group (or a previously received message), a Contention-Based Random Access (CBRA) procedure may be performed or the random access procedure may not be performed.

2> Operation for a data radio bearer (DRB) configured in the secondary cell group: when the UE receives the configuration information or the indicator, the UE may resume DRBs (or SN (SCG) terminated DRBs, DRBs in which the PDCP layer device is configured in the SCG, a bearer using a RLC UM mode, or a bearer using a RLC AM mode) included in the secondary cell group. For example, for a slit bearer (e.g., one RLC layer device is configured in the master cell group and another RLC layer device is configured in the secondary cell group) in which the PDCP layer device is configured in the master cell group, the RRC message including the configuration information or the indicator may also include an indicator (reestablishRLC) triggering a reestablishment procedure of the RLC layer device configured in the secondary cell group or the UE may perform the reestablishment procedure for the RLC layer device configured in the secondary cell group. For example, for a slit bearer (one RLC layer device is configured in the master cell group and another RLC layer device is configured in the secondary cell group) in which the PDCP layer device is configured in the secondary cell group, the RRC message including the configuration information or the indicator may also include an indicator (reestablishRLC) triggering a reestablishment procedure of the RLC layer device configured in the master cell group or also include an indicator triggering a PDCP reestablishment procedure (reestablishPDCP) or a PDCP resumption procedure (PDCP resume) of the PDCP layer device configured in the secondary cell group, or the UE may perform the reestablishment procedure for the RLC layer device configured in the mater cell group or the PDCP reestablishment procedure or the PDCP resumption procedure (PDCP resume) for the PDCP layer device configured in the secondary cell group. For example, for bearers configured in the secondary cell group, the bearers may be resumed, or the RRC layer device may instruct the PDCP layer device to trigger the PDCP reestablishment procedure or the PDCP resumption procedure or the PDCP layer device may perform the PDCP reestablishment procedure o the PDCP resumption procedure (PDCP resume). For the bearers (or a bearer using a RLC UM mode, or a bearer using a RLC AM mode) configured in the secondary cell group, the UE may trigger a first PDCP resumption procedure or the PDCP layer device may perform the first PDCP resumption procedure. In another method, in order to solve a security issue problem which may occur by transmission of different pieces of data through the same security key when the secondary cell group is activated or resumed, the UE may trigger a second PDCP resumption procedure or the PDCP layer device may perform the second PDCP resumption procedure for the bearers (or a bearer using a RLC UM mode, or a bearer using a RLC AM mode) configured in the secondary cell group. In another method, when the higher layer device triggers the PDCP layer device resumption procedure, the first PDCP resumption procedure may be triggered and performed. When the higher layer device triggers the PDCP layer device resumption procedure or indicates an indicator indicating activation or resumption of the cell group (or cell), the second PDCP resumption procedure may be triggered and performed. In another method, when the base station indicates the indicator indicating activation or resumption of the cell group (or cell) in order to solve the surety issue problem which may occur by transmission of different pieces of data through the same security key, the base station may configure a new security key by inserting security key configuration information (for example, sk-counter) into the RRC message including the indicator indicating activation or resumption of the cell group (or cell), change or update the security key, or insert a PDCP reestablishment procedure indicator into the RRC message to change or update the security key of bearers (or a bearer using a RLC UM mode, or a bearer using a RLC AM mode) configured in the secondary cell group, or the UE may perform the PDCP reestablishment procedure for the bearers. In another method, if the message including the indicator indicating resumption or activation of the cell group further includes security configuration information, a change in (or update of) the security configuration information is indicated thereby, or the indicator indicating the first PDCP resumption procedure is included therein, the UE may trigger the first PDCP resumption procedure or the PDCP layer device may perform the first PDCP resumption procedure for the bearers (or a bearer using a RLC UM mode, or a bearer using a RLC AM mode) configured in the secondary cell group. However, when the message including the indicator indicating resumption or activation of the cell group does not include security configuration information, the change in (update of) the security configuration information is not indicated thereby, or the indicator indicating the second PDCP resumption procedure is included therein, the UE may trigger the second PDCP resumption procedure or the PDCP layer device may perform the second PDCP resumption procedure for the bearers (or a bearer using a RLC UM mode, or a bearer using a RLC AM mode) configured in the secondary cell group in order to solve the security issue problem which may occur by transmission of different pieces of data through the same security key when the secondary cell group is activated or resumed. The provided methods may be performed when the message including the indicating suspension or deactivation of the cell group is received. Further, the provided methods may be applied to SCG bearers (bearers or a SCG terminated bearer having the PDCP layer device in the SCG).

2> Operation for a signaling radio bearer (SRB) configured in the secondary cell group: when the UE receives the configuration information or the indicator and activates the PSCell, the activated downlink BWP of the PSCell is the normal BWP which is not the dormant BWP, or the activated PSCell monitors the PDCCH according to a long period on the basis of first DRX configuration information, SRBs (or SN (SCG) terminated SRBs or SRBs or SRB3 in which the PDCP layer device is configured in the SCG) included in the secondary cell group may be continuously maintained (for example, the UE may continuously transmit or receive a control message to or from the secondary base station). Alternatively, in order to discard old data (for example, PDCP SDU or PDCP PDU) stored in the SRBs configured in the secondary cell group, a data discarding procedure (for example, a discarding indication to the PDCP layer device or an RLC reestablishment procedure) may be performed. In another method, when the UE receives the configuration information or the indicator, the UE may resume SRBs (or SN (SCG) terminated SRBs or SRBs or SRB3 in which the PDCP layer device is configured in t)e SCG) included in the secondary cell group. Alternatively, in order to discard old data (for example, PDCP SDU or PDCP PDU) stored in the SRBs configured in the secondary cell group, a data discarding procedure (for example, a discarding indication to the PDCP layer device or an RLC reestablishment procedure) may be performed. For example, for a slit bearer (one RLC layer device is configured in the master cell group and another RLC layer device is configured in the secondary cell group) in which the PDCP layer device is configured in the master cell group, the RRC message including the configuration information or the indicator may also include an indicator (reestablishRLC) triggering a reestablishment procedure of the RLC layer device configured in the secondary cell group or the UE may perform the reestablishment procedure for the RLC layer device configured in the secondary cell group. For example, for a slit bearer (one RLC layer device is configured in the master cell group and another RLC layer device is configured in the secondary cell group) in which the PDCP layer device is configured in the secondary cell group, the RRC message including the configuration information or the indicator may also include an indicator (reestablishRLC) triggering a reestablishment procedure of the RLC layer device configured in the master cell group or also include an indicator triggering a PDCP reestablishment procedure (reestablishPDCP) or a PDCP resumption procedure (PDCP resume) of the PDCP layer device configured in the secondary cell group, or the UE may perform the reestablishment procedure for the RLC layer device configured in the mater cell group or the PDCP reestablishment procedure or the PDCP resumption procedure (PDCP resume) for the PDCP layer device configured in the secondary cell group. For example, for bearers configured in the secondary cell group, the bearers may be resumed, or the RRC layer device may instruct the PDCP layer device to trigger the PDCP reestablishment procedure or the PDCP resumption procedure or the PDCP layer device may perform the PDCP reestablishment procedure or the PDCP resumption procedure (PDCP resume). For the bearers configured in the secondary cell group, the UE may trigger a first PDCP resumption procedure or the PDCP layer device may perform the first PDCP resumption procedure. In another method, in order to solve a security issue problem which may occur by transmission of different pieces of data through the same security key when the secondary cell group is activated or resumed, the UE may trigger a second PDCP resumption procedure or the PDCP layer device may perform the second PDCP resumption procedure for the bearers configured in the secondary cell group. In another method, when the higher layer device triggers the PDCP layer device resumption procedure, the first PDCP resumption procedure may be triggered and performed. When the higher layer device triggers the PDCP layer device resumption procedure or indicates an indicator indicating activation or resumption of the cell group (or cell), the second PDCP resumption procedure may be triggered and performed. In another method, when the base station indicates the indicator indicating activation or resumption of the cell group (or cell) in order to solve the surety issue problem which may occur by transmission of different pieces of data through the same security key, the base station may configure a new security key by inserting security key configuration information (for example, sk-counter) into the RRC message including the indicator indicating activation or resumption of the cell group (or cell), change or update the security key, or insert a PDCP reestablishment procedure indicator into the RRC message to change or update the security key of bearers configured in the secondary cell group, or the UE may perform the PDCP reestablishment procedure for the bearers. In another method, if the message including the indicator indicating resumption or activation of the cell group further includes security configuration information, a change (or update) in the security configuration information is indicated thereby, or the indicator indicating the first PDCP resumption procedure is included therein, the UE may trigger the first PDCP resumption procedure or the PDCP layer device may perform the first PDCP resumption procedure for the bearers configured in the secondary cell group. However, when the message including the indicator indicating resumption or activation of the cell group does not include security configuration information, the change in (update of) the security configuration information is not indicated thereby, or the indicator indicating the second PDCP resumption procedure is included therein, the UE may trigger the second PDCP resumption procedure or the PDCP layer device may perform the second PDCP resumption procedure for the bearers configured in the secondary cell group in order to solve the security issue problem which may occur by transmission of different pieces of data through the same security key when the secondary cell group is activated or resumed. The provided methods may be performed when the message including the indicator indicating suspension or deactivation of the cell group is received. Further, the provided methods may be applied to SCG bearers (bearers or a SCG terminated bearer having the PDCP layer device in the SCG).

2> A UE operation for the PUCCH SCell of the secondary cell group: when the UE receives the configuration information or the indicator, the UE may activate the PUCCH Scell of the secondary cell group, activate the downlink BWP or the uplink BWP to a BWP (for example, a first active BWP) configured in the RRC message, and perform a UE operation of the activated Scell or BWP. In another method, when the UE receives the configuration information or the indicator, if a dormant BWP is configured in the PUCCH Scell of the secondary cell group, the UE may maintain the S cell in the activated state, activate the downlink BWP of the Scell to the BWP (for example, first active BWP) configured in the RRC message, perform the UE operation in the activated BWP. Alternatively, if the dormant BWP is not configured in the Scell of the secondary cell group, the UE may switch the Scell to the activated state, activate the downlink BWP or the uplink BWP to the BWP (for example, first active BWP) configured in the RRC message, and perform the UP operation in the activated Scell or BWP. In another method, when the UE receives the configuration information or the indicator, the UE may determine the state of the Scell or switching, activation, or deactivation of the BWP according to Scell configuration information or an indicator configured in the message including the configuration information or the indicator and perform the UE operation. In another method, when the UE receives the configuration information or the indicator, the UE may apply first DRX configuration information (for example, suspend second DRX configuration information and reconfigure the same as first DRX configuration information) configured in the RRC message for the PUCCH Scell and, if the PDCCH can be monitored, perform a UE operation in the activated Scell.

2> The UE may transmit an indicator indicating that the cell group (for example, secondary cell group) or the cell is configured, added, activated, resumed, modified, or reconfigured to the master cell group or the secondary cell group, and the indicator may be transmitted from the UE to the secondary cell group (or base station) or the master cell group (or base station) through a physical signal (for example, HARQ ACK or NACK or new transmission resources), MAC control information, or the RRC message.

2> When the UE receives an indicator indicating resumption, activation, or addition of the cell group (for example, secondary cell group) or the cell, the UE may trigger the PDCP layer device to transmit a PDCP state report for bearers connected to the SCG RLC layer device, SCG split bearers, MCG bearers, or MCG slit bearers to the base station. This is because to synchronize a transmission window and a reception window by identifying lost data or states of window parameters lost between the UE and the base station through transmission of the PDCP state report.

1> If the UE receives configuration information or an indicator (for example, through PDCCH DCI, MAC control information, or the RRC message) for releasing, deactivating, reconfiguring, or suspending the dual connectivity, the cell group (for example, secondary cell group), or the cell, the UE may perform some of the following procedures.

2> The higher layer device (for example, RRC layer device) may indicate the configuration information or the indicator to the lower layer device (for example, PDCP layer device, RLC layer device, MAC layer device, or PHY layer device).

2> A UE operation for the PSCell: when the UE receives the configuration information or the indicator, the UE may maintain the PSCell in the activated state, activate the downlink BWP of the PSCell to the dormant BWP configured in the RRC message, and perform the UE operation in the dormant BWP. In another method, when the UE receives the configuration information or the indicator, the UE may maintain the PSCell in the activated state, reconfigure or switch a PDCCH monitoring period of the PSCell or a DRX configuration period to a short period on the basis of second DRX configuration information, perform PDCCH monitoring, and perform a UE operation of the activated cell. In another method, when the UE receives the configuration information or the indicator, the UE may deactivate the PSCell and perform a UE operation of the deactivated cell. Through the above method, the UE operation for the PSCell may be performed and thus UE power consumption may be reduced.

2> A UE operation for the SCell of the secondary cell group, when the UE receives the configuration information or the indicator, the UE may deactivate the SCell of the secondary cell group and perform the UE operation of the deactivated SCell. In another method, when the UE receives the configuration information or the indicator, if the dormant BWP is configured in the SCell of the secondary cell group, the UE may maintain the SCell in the activated state, activate the downlink BWP of the SCell to the dormant BWP, perform the UE operation in the dormant BWP or, if the dormant BWP is not configured in the SCell of the secondary cell group, may switch the SCell to the deactivated state and perform the UE operation in the deactivated cell or BWP. In another method, when the UE receives the configuration information or the indicator, the UE may determine the state of the SCell or switching, activation, or deactivation of the BWP according to SCell configuration information or an indicator configured in the message including the configuration information or the indicator and perform the UE operation.

2> A UE operation of the MAC layer device for the secondary cell group: when the UE receives the configuration information or the indicator, the UE may perform an initialization procedure (MAC reset) for the MAC layer device (for example, reset or release configuration information configured in the MAC layer device, stop or reset configured timers, or stop or reset the HARQ procedure). For example, it may be considered that a timing advance timer (TAT) indicating validity of signal synchronization between the UE and the base station has stopped or expired. In another method, when the UE receives the configuration information or the indicator, the UE may perform the MAC partial reset procedure in order to prevent data loss due to the reset procedure of the MAC layer device (or perform the MAC partial reset procedure when the message including the configuration information or the indicator includes the indicator indicating the MAC partial reset procedure). For example, the UE may continuously maintain the timing advance timer (TAT) indicating validity of signal synchronization between the UE and the base station and continuously perform HARQ retransmission being performed. In another method, the UE may maintain the current configuration without performing any procedure for the MAC layer device. In a case where the TAT is continuously maintained, if the TAT expires, the UE may perform the random access procedure to control or configure again the Timing Advance (TA) even though the secondary cell group is suspended or deactivated. When performing the random access procedure, the UE may indicate that the random access procedure is a random access procedure for controlling the TA to the base station (for example, the UE may include a buffer state report (MAC control information), indicate that there is no data to be transmitted, or a new indicator may be introduced) through an indicator, the base station may transmit a message including an indication suspension or deactivation of the cell group again to the UE after completing the random access procedure, or the UE may maintain the cell group in the suspended or deactivated state after completing the random access procedure (in another method, the UE may maintain the cell group in the suspended or deactivated state by itself without any indication from the base station). In another method, in a case where the TAT is continuously maintained, if the TAT expires, the base station may trigger the random access procedure (to control or reconfigure TA) to the UE through the cell (PCell or SCell, or PSCell) of the master cell group or the secondary cell group or transmit a message including an indicator resumption or activation of the cell group to the UE since the base station is running the same TAT.

2> Operation for a data radio bearer (DRB) (or a bearer using RLC UM mode or a bearer using RLC AM mode) configured in the secondary cell group: when the UE receives the configuration information or the indicator, the UE may suspend DRBs (or SN (SCG) terminated DRBs, DRBs through which the PDCP layer device is configured in the SCG, a bearer using RLC UM mode or a bearer using RLC AM mode) included in the secondary cell group. For example, for a slit bearer (bearer in which one RLC layer device is configured in the master cell group and another RLC layer device is configured in the secondary cell group) in which the PDCP layer device is configured in the secondary cell group, the RRC message including the configuration information or the indicator may also include an indicator (reestablishRLC) triggering a reestablishment procedure of the RLC layer device configured in the secondary cell group or also include an indicator triggering a PDCP data recovery procedure ((PDCP data recovery) of the PDCP layer device configured in the master cell group, or the UE may perform the reestablishment procedure for the RLC layer device configured in the secondary cell group or the PDCP data recovery procedure) for the PDCP layer device configured in the master cell group. For example, for a slit bearer (bearer in which one RLC layer device is configured in the master cell group and another RLC layer device is configured in the secondary cell group) in which the PDCP layer device is configured in the secondary cell group, the RRC message including the configuration information or the indicator may also include an indicator (reestablishRLC) triggering a reestablishment procedure of the RLC layer device configured in the master cell group or also include an indicator triggering a PDCP reestablishment procedure (reestablishPDCP) or a PDCP suspension procedure (PDCP suspend) of the PDCP layer device configured in the secondary cell group, or the UE may perform the reestablishment procedure for the RLC layer device configured in the mater cell group or the PDCP reestablishment procedure or the PDCP suspension procedure (PDCP suspend) for the PDCP layer device configured in the secondary cell group. For example, for bearers (or a bearer using RLC UM mode or a bearer using RLC AM mode) configured in the secondary cell group, the bearers may be suspended, or the RRC layer device may instruct the PDCP layer device to trigger the PDCP reestablishment procedure or the PDCP suspension procedure or the PDCP layer device may perform the PDCP reestablishment procedure o the PDCP suspension procedure (PDCP suspend). The UE may trigger a first PDCP suspension procedure or the PDCP layer device may perform the first PDCP suspension procedure for the bearers (or a bearer using RLC UM mode or a bearer using RLC AM mode) configured in the secondary cell group. In another method, in order to solve a security issue problem which may occur by transmission of different pieces of data through the same security key when the secondary cell group is activated or resumed, the UE may trigger a second PDCP resumption procedure or the PDCP layer device may perform the second PDCP resumption procedure for the bearers (or a bearer using RLC UM mode or a bearer using RLC AM mode) configured in the secondary cell group. In another method, when the higher layer device triggers the PDCP layer device suspension procedure, the first PDCP suspension procedure may be triggered and performed. When the higher layer device triggers the PDCP layer device suspension procedure or indicates an indicator indicating deactivation or suspension of the cell group (or cell), the second PDCP suspension procedure may be triggered and performed. In another method, if the message including the indicator indicating suspension or deactivation of the cell group further includes security configuration information, a change in (or update of) the security configuration information is indicated thereby, or the indicator indicating the first PDCP suspension procedure is included therein, the UE may trigger the first PDCP suspension procedure for the bearers (or a bearer using RLC UM mode or a bearer using RLC AM mode) configured in the secondary cell group or the PDCP layer device may perform the first PDCP suspension procedure for the bearers configured in the secondary cell group. However, when the message including the indicator indicating suspension or deactivation of the cell group does not include security configuration information, the change in (update of) the security configuration information is not indicated thereby, or the indicator indicating the second PDCP resumption procedure is included therein, the UE may trigger the second PDCP resumption procedure or the PDCP layer device may perform the second PDCP resumption procedure for the bearers (or a bearer using RLC UM mode or a bearer using RLC AM mode) configured in the secondary cell group in order to solve the security issue problem which may occur by transmission of different pieces of data through the same security key when the secondary cell group is activated or resumed. The provided methods may be performed when the message including the indication resuming or activating the cell group is received. Further, the provided methods may be applied to SCG bearers (bearers or a SCG terminated bearer having the PDCP layer device in the SCG).

2> Operation for a signaling radio bearer (SRB) configured in the secondary cell group: when the UE receives the configuration information or the indicator and activates the PSCell, the activated downlink BWP of the PSCell is the normal BWP which is not the dormant BWP, or the activated PSCell monitors the PDCCH according to a long period on the basis of second DRX configuration information, SRBs (or SN (SCG) terminated SRBs or SRBs or SRB3 in which the PDCP layer device is configured in the SCG) included in the secondary cell group may be continuously maintained (for example, the UE may continuously transmit or receive a control message to or from the secondary base station). Alternatively, in order to discard old data (for example, PDCP SDU or PDCP PDU) stored in the SRBs configured in the secondary cell group, a data discarding procedure (for example, a discarding indication to the PDCP layer device or an RLC reestablishment procedure) may be performed. In another method, when the UE receives the configuration information or the indicator, the UE may suspend SRBs (or SN (SCG) terminated SRBs or SRBs or SRB3 in which the PDCP layer device is configured in the SCG) included in the secondary cell group. Alternatively, in order to discard old data (for example, PDCP SDU or PDCP PDU) stored in the SRBs configured in the secondary cell group, a data discarding procedure (for example, a discarding indication to the PDCP layer device or an RLC reestablishment procedure) may be performed. For example, for a split bearer in which the PDCP layer device is configured in the master cell group (bearer in which one RLC layer device is configured in the master cell group and another RLC layer device is configured in the secondary cell group), the RRC message including the configuration information or the indicator may also include an indicator (reestablishRLC) triggering a reestablishment procedure of the RLC layer device configured in the secondary cell group or an indicator triggering a PDCP data recovery procedure (PDCP data recovery) of the PDCP layer device configured in the master cell group, or the UE may perform the reestablishment procedure for the RLC layer device configured in the secondary cell group or perform the PDCP data recovery procedure (PDCP data recovery) for the PDCP layer device configured in the master cell group. For example, for a slit bearer (bearer in which one RLC layer device is configured in the master cell group and another RLC layer device is configured in the secondary cell group) in which the PDCP layer device is configured in the secondary cell group, the RRC message including the configuration information or the indicator may also include an indicator (reestablishRLC) triggering a reestablishment procedure of the RLC layer device configured in the master cell group or also include an indicator triggering a PDCP reestablishment procedure (reestablishPDCP) or a PDCP suspension procedure (PDCP suspend) of the PDCP layer device configured in the secondary cell group, or the UE may perform the reestablishment procedure for the RLC layer device configured in the mater cell group or the PDCP reestablishment procedure or the PDCP suspension procedure (PDCP suspend) for the PDCP layer device configured in the secondary cell group. For example, for bearers configured in the secondary cell group, the bearers may be suspended, or the RRC layer device may instruct the PDCP layer device to trigger the PDCP reestablishment procedure or the PDCP suspension procedure or the PDCP layer device may perform the PDCP reestablishment procedure o the PDCP suspension procedure (PDCP suspend). The UE may trigger a first PDCP suspension procedure or the PDCP layer device may perform the first PDCP suspension procedure for the bearers configured in the secondary cell group. In another method, in order to solve a security issue problem which may occur by transmission of different pieces of data through the same security key when the secondary cell group is activated or resumed, the UE may trigger a second PDCP resumption procedure or the PDCP layer device may perform the second PDCP resumption procedure for the bearers configured in the secondary cell group. In another method, when the higher layer device triggers the PDCP layer device suspension procedure, the first PDCP suspension procedure may be triggered and performed. When the higher layer device triggers the PDCP layer device suspension procedure or indicates an indicator indicating deactivation or suspension of the cell group (or cell), the second PDCP suspension procedure may be triggered and performed. In another method, if the message including the indicator indicating suspension or deactivation of the cell group includes security configuration information, a change in (or update of) the security configuration information is indicated thereby, or the indicator indicating the first PDCP suspension procedure is included therein, the UE may trigger the first PDCP suspension procedure or the PDCP layer device may perform the first PDCP suspension procedure for the bearers configured in the secondary cell group. However, when the message including the indicator indicating suspension or deactivation of the cell group does not include security configuration information, the change in (update of) the security configuration information is not indicated thereby, or the indicator indicating the second PDCP resumption procedure is included therein, the UE may trigger the second PDCP resumption procedure or the PDCP layer device may perform the second PDCP resumption procedure for the bearers configured in the secondary cell group in order to solve the security issue problem which may occur by transmission of different pieces of data through the same security key when the secondary cell group is activated or resumed. The provided methods may be performed when the message including the indication resuming or activating the cell group is received. Further, the provided methods may be applied to SCG bearers (bearers or a SCG terminated bearer having the PDCP layer device in the SCG).

2> A UE operation for the PUCCH SCell of the secondary cell group: when the UE receives the configuration information or the indicator, the UE may deactivate the PUCCH SCell of the secondary cell group and perform the UE operation of the deactivated SCell. In another method, when the UE receives the configuration information or the indicator, if the dormant BWP is configured in the PUCCH SCell of the secondary cell group, the UE may maintain the SCell in the activated state, activate the downlink BWP of the SCell to the dormant BWP, perform the UE operation in the dormant BWP or, if the dormant BWP is not configured in the PUCCH SCell of the secondary cell group, may switch the SCell to the deactivated state and perform the UE operation in the deactivated cell or BWP. In another method, when the UE receives the configuration information or the indicator, the UE may determine the state of the SCell or switching, activation, or deactivation of the BWP according to SCell configuration information or an indicator configured in the message including the configuration information or the indicator and perform the UE operation. In another method, when the UE receives the configuration information or the indicator, the UE may apply second DRX configuration information configured in the RRC message for the PUCCH SCell and, if the PDCCH can be monitored, perform the UE operation in the activated SCell.

2> The UE may transmit an indicator indicating that the cell group (for example, secondary cell group) or the cell has been suspended, deactivated, released, or modified to the master cell group or the secondary cell group, and the indicator may be transmitted from the UE to the secondary cell group (or base station) or the master cell group (or base station) through a physical signal (for example, HARQ ACK or NACK or new transmission resources), MAC control information, or the RRC message.

2> When the UE receives an indicator indicating suspension, deactivation, or release of the cell group (for example, secondary cell group) or the cell, the UE may trigger the PDCP layer device to transmit a PDCP state report for configured SCG bearers, bearers connected to the SCG RLC layer device, SCG split bearers, MCG bearers, or MCG slit bearers to the base station. This is because to synchronize a transmission window and a reception window by identifying lost data or states of window parameters lost between the UE and the base station through transmission of the PDCP state report.

The partial reset of the MAC layer device provided in the disclosure may include one or a plurality of UE operations among the following procedures.

The UE may perform an operation of flushing the remaining HARQ processes (that is, normal HARQ process, HARQ process for system information, or the like) except for an HARQ process for MBS among HARQ processes configured in the serving cell, and the HARQ process for MBS may perform an operation of flushing, releasing, resetting, or omitting flushing after completing a handover or after RRC state mode transition (to the RRC-inactive mode or the RRC-idle mode).

In the flushing operation, data of the HARQ process related to MAB may be flushed at a time point at which a target base station can receive an MBS service or starts G-RNTI monitoring after the handover or after RRC state mode transition (to the RRC-inactive mode or the RRC-idle mode). Alternatively, data reception can be continuously performed through the G-RNTI until the handover is completed or RRC state mode transition (to the RRC-inactive mode or the RRC-idle mode) is completed, and in the case of handover, the target base station may perform an operation of monitoring the C-RNTI at a target allocated through the RRC message. In another method, data reception through the G-RNTI can be continuously performed before random access from the target base station is completed.

If there is a random access procedure being performed, the random access procedure may be suspended.

Specifically, if there is a configured or indicated preamble identifier, preamble configuration information, or PRACH (random access configuration-related information) configuration information, the same may be discarded.

If there is a temporary identifier (temporary C-RNTI), the identifier may be released.

A buffer for message 3 transmission may be flushed.

New data indicators for uplink HARQ processes may be all configured as 0.

If an uplink DRX retransmission timer running for the uplink is running, the timer may be suspended.

If all uplink HARQ-related timers are running, the timers may be suspended.

When the reset procedure of the MAC layer device is performed or the partial reset procedure indicator of the MAC layer device is not included, indicated, or not performed, the UE may perform the reset procedure of the MAC layer device and accordingly may flush all of the configured normal HARQ process, the HARQ process for MBS, or the HARQ process for system information.

The first PDCP suspension (or resumption) procedure provided in the disclosure may include one or a plurality of UE operations among the following procedures. The procedure provided as above may be applied or configured to the bearer that uses the RLC UM mode or the bearer that uses the RLC AM mode, or the UE may perform the procedure provided with respect to the bearer that uses the RLC UM mode or the bearer that uses the RLC AM mode.

A transmitting PDCP layer device of the UE may reset a transmission window parameter or configure the same as an initial value, or discard stored data (or PDCP PDU or PDCP SDU). In another method, only the PDCP PDU may be discarded to prevent data loss. This is a procedure for preventing old data to be transmitted ore retransmitted when the secondary cell group is activated or resumed in the future.

A receiving PDCP layer device of the UE may stop or reset a reordering timer when the reordering timer (t-reordering)(timer for arranging data in an ascending order from a PDCP sequence number or a COUNT value) is running. Alternatively, the receiving PDCP layer device may perform a header decompression procedure for stored data (for example, PDCP SDU) and transfer the data to the higher layer device in an ascending order of COUNT values. The receiving PDCP layer device of the UE may reset a reception window parameter or configure the same as an initial value.

The second PDCP suspension (or resumption) procedure provided in the disclosure may include one or a plurality of UE operations among the following procedures. The procedure provided as above may be applied or configured to a bearer that uses an RLC UM mode or a bearer that uses an RLC AM mode, or the UE may perform the procedure provided with respect to the bearer that uses the RLC UM mode or the bearer that uses the RLC AM mode.

The transmitting PDCP layer device of the UE may maintain the parameter value without resetting the transmission window parameter or without configuring the same as an initial value. The reason why the parameter value (for example, COUNT value) is maintained is to solve the security issue problem which may occur by transmission of different pieces of data through the same security key when the secondary cell group is activated or resumed. The transmitting PDCP layer device of the UE may discard the stored data (for example, PDCP PDU or PDCP SDU). In another method, only the PDCP PDU may be discarded to prevent data loss. This is a procedure for preventing old data to be transmitted ore retransmitted when the secondary cell group is activated or resumed in the future. In another method, the transmitting PDCP layer device may store values of the transmission window parameters and reset the window parameters (for example, configure the window parameters as 0). If the security configuration information is changed when the cell group is resumed or activated, if the security configuration information is included in the message indicating resumption or activation of the cell group, or if a security key change is indicated, the window parameters being reset may be used. If the security configuration information is not changed when the cell group is resumed or activated, if the security configuration information is not included in the message indicating resumption or activation of the cell group, or if a security key change is not indicated, the values of the stored transmission window parameters may be recovered or the values of the transmission window parameters may be configured, reconfigured, or reset to the values of the stored transmission window parameters and then used.

A receiving PDCP layer device of the UE may stop or reset a reordering timer when the reordering timer (t-reordering)(timer for arranging data in an ascending order from a PDCP sequence number or a COUNT value) is running. Alternatively, the receiving PDCP layer device may perform a header decompression procedure for stored data (for example, PDCP SDU) and transfer the data to the higher layer device in an ascending order of COUNT values. The receiving PDCP layer device of the UE may maintain the parameter value without resetting the reception window parameter or without configuring the same as an initial value. The reason why the parameter value (for example, COUNT value) is maintained is to solve the security issue problem which may occur by transmission of different pieces of data through the same security key when the secondary cell group is activated or resumed. In another method, the UE may configure or update an RX_NEXT window parameter (a parameter indicating a COUNT value of data expected to be received next) to a value of an RX_DELIV window parameter (a parameter indicating a COUNT value corresponding the next data of the data transmitted to the higher layer device) or a COUNT value of data which the UE first receives in order to prevent the reordering timer to be directly triggered in the case in which there is no COUNT value or PDCP sequence number gap when the secondary cell group is activated or resumed or data is received. In another method, when the reordering timer value is configured in the message or an indicator is received from the higher layer device, an RX_REORD window parameter (parameter indicating a COUNT value of next data of the data triggering the reordering timer) may be configured or updated to an RX_NEXT window parameter, or the reordering timer may be suspended or restarted. In another method, the receiving PDCP layer device may store values of the reception window parameters and reset the window parameters (for example, configure the window parameters as 0). If the security configuration information is changed when the cell group is resumed or activated, if the security configuration information is included in the message indicating resumption or activation of the cell group, or if a security key change is indicated, the window parameters being reset may be used. If the security configuration information is not changed when the cell group is resumed or activated, if the security configuration information is not included in the message indicating resumption or activation of the cell group, if a security key change is not indicated, or the values of the stored reception window parameters may be recovered or the values of the reception window parameters may be configured, reconfigured, or reset to the values of the stored reception window parameters and then used.

If data to be transmitted by the UE through the uplink is made or generated when the UE receives the configuration information or the indicator for releasing, deactivating, reconfiguring, or suspending the dual connectivity, the cell group (for example, secondary cell group), or the cell (for example, through PDCCH DCI, MAC control information, or the RRC message) and the UE performs the UE operation provided in the above, the UE may make a request for uplink transmission resources by transmitting a scheduling request (SR) or MAC control information (or an indicator, an amount of buffers, or a buffer state report) to the master base station or the secondary base station in PUCCH transmission resources configured in the RRC message or make a request for configuring, adding, activating, resuming, modifying, or reconfiguring the dual connectivity, the cell group (for example, secondary cell group), or the cell.

If data to be transmitted by the UE through the uplink is made or generated when the UE receives the configuration information or the indicator for releasing, deactivating, reconfiguring, or suspending the dual connectivity, the cell group (for example, secondary cell group), or the cell (for example, through PDCCH DCI, MAC control information, or the RRC message) and the UE performs the UE operation provided in the above, the UE may generate an RRC message and transmit the RRC message to the master base station or the secondary base station to make a request for uplink transmission resources or make a request for configuring, adding, activating, resuming, modifying, or reconfiguring the dual connectivity, the cell group (for example, secondary cell group), or the cell.

The procedures provided in the disclosure may be expanded to the multi-access technology. For example, configuration information of a plurality of cell groups may be configured in the UE through the RRC message, one or a plurality of cell groups (or cells) among the plurality of configured cell groups may be activated or resumed through the PDCCH indicator, MAC control information, or the RRC message, and one or a plurality of cell groups may be suspended or deactivated.

Hereinafter, the disclosure proposes a UE operation in which the cell group or the cell is activated or resumed again when uplink data to be transmitted by the UE to the secondary cell group (or in bearers belonging to the secondary cell group) is made or generated in the case in which the secondary cell group or the PSCell of the secondary cell group is in the deactivated state or the suspended state by the deactivated or suspended procedure of the cell group or the cell provided in the disclosure.

As provided in the disclosure, when the cell group or the cell is deactivated or suspended, the UE cannot transmit or receive data and thus, if uplink data is generated in the secondary cell group of the UE (or in bearers belonging to the secondary cell group), the cell group or the cell may need to be activated or resumed again. The procedure in which the UE makes a request for activating or resuming again the cell group or the cell to the base station (master base station or secondary base station) may be performed by the one of the following methods, a combination of the following methods, or a method expanded through the application thereof.

In one embodiment of first method, the UE configures a message (for example, RRC message) making a request for re-activating or resuming again the secondary cell group or the cell and transmits the message to the master base station. When receiving the message, the master base station may make a request for a resumption procedure to the secondary base station, receive a response, configure a message (for example, RRC message) indicating re-activation or resumption of the secondary cell group, and transmit the message to the UE like in the first signaling procedure of FIG. 11. In another method, after the master base station configures the message (for example, RRC message) indicating activation or resumption of the secondary cell group and transmits the message to the UE, the UE may indicate re-activation or resumption to the secondary base station like in the second signaling procedure of FIG. 12. In another method, the UE may configure a message (for example, RRC message) making a request for re-activating or resuming the secondary cell group and transmit the message to the secondary base station through SRB3, and the secondary base station may configure a message (for example, RRC message) indicating re-activation or resumption of the secondary cell group, transmit the message to the UE, and then indicate activation or resumption to the master base station like in the third signaling procedure of FIG. 13.

In one embodiment of second method, the UE may configure a message (for example, MAC control information) making a request for re-activating or resuming the secondary cell group or the cell and transmit the message to the master base station. When receiving the message, the master base station may make a request for a resumption procedure to the secondary base station, receives a response, configure a message (for example, RRC message or MAC control information) indicating re-activation or resumption of the secondary cell group, and transmit the message to the UE like in the first signaling procedure of FIG. 11 provided in the disclosure. In another method, after the master base station configures the message (for example, RRC message) indicating re-activation or resumption of the secondary cell group and transmits the message to the UE, the UE may indicate activation or resumption to the secondary base station like in the second signaling procedure of FIG. 12. In another method, the UE may configure a message (for example, MAC control information) making a request for re-activating or resuming the secondary cell group and transmit the message to the secondary base station through SRB3, and the secondary base station may configure a message (for example, RRC message or MAC control information)) indicating re-activation or resumption of the secondary cell group, transmit the message to the UE, and then indicate activation or resumption to the master base station like in the third signaling procedure of FIG. 13. When the cell group activation or resumption is requested or indicated through the MAC control information, the MAC control information may be newly defined and designed. In another method, a new field (or indicator) may be defined or a new value (field value or identifier value) may be defined to indicate the cell group activation or resumption in the existing MAC control information (for example, buffer state report).

In one embodiment of third method, the UE may configure a message (for example, a physical signal of the PHY layer device) making a request for re-activating or resuming the secondary cell group or the cell and transmit the message to the master base station. When receiving the message, the master base station may make a request for a resumption procedure to the secondary base station, receive a response, configure a message (for example, the RRC message or the physical signal of the PHY layer device) indicating re-activation or resumption of the secondary cell group, and transmit the message to the UE like in the first signaling procedure of FIG. 11. In another method, after the master base station configures the message (for example, the RRC message or the physical signal of the PHY layer device) indicating re-activation or resumption of the secondary cell group and transmits the message to the UE, the UE may indicate activation or resumption to the secondary base station like in the second signaling procedure of FIG. 12. In another method, the UE may configure a message (for example, the physical signal of the PHY layer device) making a request for re-activating or resuming the secondary cell group and transmit the message to the secondary base station through SRB (e.g., SRB3), and the secondary base station may configure a message (for example, RRC message or the physical signal of the PHY layer device) indicating re-activation or resumption of the secondary cell group, transmit the message to the UE, and then indicate activation or resumption to the master base station like in the third signaling procedure of FIG. 13.

When the cell group activation or resumption is requested or indicated by the physical signal of the PHY layer device, the physical signal of the PHY layer device may be defined and designed as new transmission resources (for example, new scheduling request (SR) transmission resources (for example, PUCCH transmission resources of the PCell or PSCell) for the secondary cell group or a new field of PDCCH DCI (PDCCH transmission resources transmitted from the PSCell or from the PCell)). In another method, a new field (or indicator) may be defined or a new value (field value or identifier value) may be defined to indicate the cell group activation or resumption in the existing physical signal of the PHY layer device (for example, scheduling request (SR) transmission resources (for example, PUCCH transmission resources of the PCell or PSCell) or a field of PDCCH DCI (PDCCH transmission resources transmitted from the PSCell or from the PCell)).

In another method, if the PSCell triggers the random access procedure is triggered in the UE through PDCCH DCI when the UE applies second DRX configuration information to perform PDCCH monitoring for the PSCell of the secondary cell group according to a long period or the secondary cell group of the UE is in the deactivated state or the suspended state, the UE may interpret the indication as activation or resumption of the secondary cell group. The physical transmission resources may be transmission resources for random access, and the UE may perform the random access procedure when uplink data for the secondary cell group is generated in the suspended or deactivated state of the secondary cell group as described above.

In another method, in the suspended or deactivated state of the secondary cell group as described above, when uplink data for the secondary cell group is generated in the suspended or deactivated state of the secondary cell group, SR transmission resources may be transmitted to the master cell group or the secondary cell group if the SR transmission resources are configured (or the TAT is running) and the random access procedure may be performed if the SRS transmission is not configured (or the TAT has expired). The random access procedure may include a Contention-Based Random Access (CBRA) procedure.

In another method, the contention free random access (CFRA) procedure may be performed when dedicated random access configuration information (dedicated RACH config or dedicated preamble) is configured (or included) in a message indicating suspension or deactivation of the cell group (or a previously received message), or a contention-based random access (CBRA) procedure may be performed when dedicated random access configuration information (dedicated RACH config or dedicated preamble) is not configured (or included) in a message indicating suspension or deactivation of the cell group (or a previously received message).

The UE may indicate to the base station that uplink data is generated through an indicator (for example, a buffer state report (MAC control information (MAC control element))) during the random access procedure or after the random access procedure is completed, and when the indicator is received or the random access procedure is completed, the base station (for example, secondary base station or the master base station) may transmit a message indicating resumption or activation of the secondary cell group to the UE, resume or activate the secondary cell group, and perform data transmission or reception again.

As provided in the disclosure, by the PDCCH, MAC control information, or the indicator of the RRC message, activation or resumption of the cell group or the cell may be completed at a first time point when the UE activates or resumes the cell group (for example, secondary cell group) or the cell (for example, PSCell).

The first time point may be configured by the RRC message as provided in the disclosure. For example, the RRC message may include time information (for example, information indicating timing (for example, X), a time unit, a subframe, a time slot, or a symbol unit) indicating when the dual connectivity, the cell group (or secondary cell group), or the cell (PSCell or SCG SCell) is activated, resumed, deactivated, or suspended. For example, when the PDCCH, MAC control information, or RRC message indicating activation, resumption, deactivation, or suspension of the cell group (for example, secondary cell group) or the cell (for example, PSCell) is received in an nth time unit, time information indicating completion of activation, resumption, deactivation, or suspension of the cell group or the cell may be configured in an (n+X)th time unit.

In another method, the time information (for example, X) may be pre-appointed and defined, and a fixed value may be used therefor rather than being configured by the base station. In another example, when random access is started (preamble is transmitted) in the nth time unit or random access is successfully completed after the PDCCH, MAC control information, or RRC message indicating activation, resumption, deactivation, or suspension of the cell group (for example, secondary cell group) or the cell (for example, PSCell) is received, time information indicating completion of activation, resumption, deactivation, or suspension of the cell group or the cell may be configured in an (n+X)th time unit.

In another method, the time information (for example, X) may be pre-appointed and defined, and a fixed value may be used therefor rather than being configured by the base station. When activation, suspension, deactivation, or resumption of the cell group or the cell is completed, the UE may perform the provided UE operation according to a state of each cell or BWP (for example, activation, hibernation, or deactivation). Further, the UE DRX operation may be started or restarted when activation or resumption of the cell group or the cell is completed, and the UE DRX operation may be suspended or deactivation when deactivation or suspension of the cell group or the cell is completed.

As provided in the disclosure, activation of the cell may be completed at a second time point when the UE activates the cell (for example, PSCell or SCell) of the cell group (for example, master cell group or secondary cell group) by the indication of the MAC control information.

The second time point may be configured by the RRC message as provided in the disclosure. For example, the RRC message may include time information (for example, information indicating timing (for example, X), a time unit, a subframe, a time slot, or a symbol unit) indicating when the carrier aggregation, the dual connectivity, the cell group (for example, master cell group or secondary cell group), or the cell (MCG SCell or SCG SCell) is activated or deactivated. For example, when MAC control information indicating activation or deactivation of the cell (for example, SCell) is received in the nth time unit, time information indicating completion of activation or deactivation of the cell may be configured in the (n+X)th time unit.

In another method, the time information (for example, X) may be pre-appointed and defined, and a fixed value may be used therefor rather than being configured by the base station. In another example, when random access is started (preamble is transmitted) or random access is successfully completed in the nth time unit after MAC control information indicating activation or deactivation of the cell (for example, SCell or PSCell) is received, time information indicating completion of activation or deactivation of the cell may be configured in the (n+X)th time unit. In another method, the time information (for example, X) may be pre-appointed and defined, and a fixed value may be used therefor rather than being configured by the base station. When activation, suspension, deactivation, or resumption of the cell group or the cell is completed, the UE may perform the provided UE operation according to a state of each cell or BWP (for example, activation, hibernation, or deactivation). Further, the UE DRX operation may be started or restarted when cell group or cell activation or resumption is completed, and the UE DRX operation may be suspended or deactivated when cell group or cell deactivation or suspension is completed.

As provided in the disclosure, activation of the cell may be completed at a third time point when the UE activates the cell (for example, PSCell or SCell) of the cell group (for example, master cell group or secondary cell group) by the indication of the RRC message.

The third time point may be configured by the RRC message as provided in the disclosure. For example, the RRC message may include time information (for example, information indicating timing (for example, X), a time unit, a subframe, a time slot, or a symbol unit) indicating when the carrier aggregation, the dual connectivity, the cell group (for example, master cell group or secondary cell group), or the cell (MCG SCell, SCG SCell, or PSCell) is activated or deactivated. For example, when the RRC message indicating activation or deactivation of the cell (for example, SCell) is received in the nth time unit, time information indicating completion of activation or deactivation of the cell may be configured in the (n+X)th time unit.

In another method, the time information (for example, X) may be pre-appointed and defined, and a fixed value may be used therefor rather than being configured by the base station. In another example, when random access is started (preamble is transmitted) or random access is successfully completed in the nth time unit after the RRC message indicating activation or deactivation of the cell (for example, SCell or PSCell) is received, time information indicating completion of activation or deactivation of the cell may be configured in the (n+X)th time unit. In another method, the time information (for example, X) may be pre-appointed and defined, and a fixed value may be used therefor rather than being configured by the base station. X may be configured or appointed on the basis of a slot number or configured or appointed on the basis of the shortest slot length among the configured PCell, PSCell, or SCell. When activation, suspension, deactivation, or resumption of the cell group or the cell is completed, the UE may perform the provided UE operation according to a state of each cell or BWP (for example, activation, hibernation, or deactivation). Further, the UE DRX operation may be started or restarted when activation or resumption of the cell group or the cell is completed, and the UE DRX operation may be suspended or deactivation when deactivation or suspension of the cell group or the cell is completed.

The concept of the cell group provided in the disclosure may expand to a sub cell group. For example, in the disclosure, a first cell group and a second cell group may be configured to configure the dual connectivity in the UE and may be applied to a master cell group and a secondary cell group to configure the dual connectivity, and thus the UE performs data transmission or reception with two base stations. However, if the concept of the cell group expands to the sub cell group, a plurality of sub cell groups of the cell group may be configured in the UE connected to one base station and sub cell group identifiers may be configured in the respective sub cell groups. The UE performs data transmission or reception with one base station but may expand and apply the activation, suspension, resumption, or deactivation procedure by the PDCCH, MAC control information, or RRC message provided in the disclosure to different frequencies or cells for each sub cell group.

For example, when the UE communicates with one base station and a plurality of frequencies or cells, the base station may configure a plurality of sub cell groups for a plurality of frequencies or cells of the base station corresponding to the cell group (master cell group) in the UE, allow the UE to apply the carrier aggregation, define fields indicating the sub cell groups in the PDCCH, MAC control information, or the RRC message, and allow the fields to indicate activation, deactivation, suspension, or resumption of the sub cell groups. The UE may apply the activation, suspension, resumption, or deactivation procedure by the PDCCH, MAC control information, or the RRC message provided in the disclosure for different frequencies or cells for each sub cell group.

In another method, the provided sub cell group may be implemented through introduction of downlink or uplink logical channel restriction for each cell. For example, the RRC message including configuration information for restricting logical channels belonging to one cell group to perform data transmission or reception only for a specific frequency or cell. By mapping and configuring logical channels (for example, logical channel identifiers) to and in each cell or frequency to group the logical channels and considering the logical channels as the provided sub cell group, and fields indicating the cells may be defined in the PDCCH, MAC control information, or the RRC message to indicate activation, deactivation, suspension, or resumption of the cells.

Further, if the master cell groups detects radio link failure when the UE in which the dual connectivity is configured transmits or receives data to or from the master cell group or the secondary cell group or when the secondary cell group is suspended or deactivated, the UE may report the radio link failure to the secondary cell group or to the master cell group via the secondary cell group. For example, the RRC message for reporting the radio link failure may be configured, and transmitted and reported through split SRB1 or SRB3. When split SRB1 is configured, the radio link failure may be always reported through split SRB1. In another method, if the master cell group detects the wireless connection failure when the UE in which the dual connectivity is configured transmits or receives data to or from the master cell group or the secondary cell group or when the secondary cell group is suspended or deactivated, the UE may declare the radio link failure and perform an RRC connection reestablishment procedure.

Further, if the secondary cell group detects the wireless connection failure when the UE in which the dual connectivity is configured transmits or receives data to or from the master cell group or the secondary cell group or when the secondary cell group is suspended or deactivated, the UE may report the radio link failure to the master cell group or to the secondary cell group via the master cell group. For example, the RRC message for reporting the radio link failure may be configured, and transmitted and reported through SRB1, split SRB1, or SRB3. When SRB1 or split SRB1 is configured, the radio link failure may be always reported through split SRB1.

In the disclosure, releasing the secondary cell group when the dual connectivity is configured in the UE may mean releasing the connection (data transmission or reception) with the secondary cell group or discarding or releasing configuration information of the secondary cell group (or bearer configuration information or protocol layer device (PHY, MAC, RLC, PDCP, or SDAP layer device) configuration information), and suspending or deactivating the secondary cell group may mean releasing or suspending the connection (data transmission or reception) with the secondary cell group but maintaining, suspending, or storing configuration information of the secondary cell group (or bearer configuration information or protocol layer device (PHY, MAC, RLC, PDCP, or SDAP layer device) configuration information) or rapidly resuming or activating the connection with the secondary cell group on the basis of the stored configuration information of the secondary cell group in the future.

Next, the disclosure proposes that the UE reports the frequency measurement result to SRB3 by prioritizing the SRB3 in case that the frequency measurement procedure or frequency measurement report procedure is configured to the UE through the RRC message (e.g., RRCReconfiguration) of the disclosure, or in case that the dual-connection technology is configured to the UE, or in case that the frequency measurement procedure or frequency measurement report procedure is configured to the cell group (or SCG), and also proposes that the frequency measurement result is reported through SRB1 (or SRB of MCG) only in case that the SRB3 is not configured. However, it is provided that the UE does not perform the measurement report through the SRB3 in case that the cell group (SCG) is deactivated. For example, a procedure is provided, in which the UE reports the frequency measurement result through the configured SRB3 only in case that the cell group is not deactivated, or a procedure is provided, in which the UE reports the frequency measurement result through the SRB1 (or SRB of MCG) in case that the cell group is deactivated. This is because the cell group may be unnecessarily activated if the frequency measurement result is transmitted to the SRB3 in a state where the cell group (SCG) is deactivated. The detailed procedure of the UE may be as follows.

1> If the frequency measurement procedure or the frequency measurement report procedure is configured to the UE,
        2> If the UE is configured to (NG)EN-DC (or if the frequency measurement procedure or the frequency measurement report procedure is configured with respect to the cell group (or SCG),
            3> If SRB3 is configured to the UE and if the cell group (SCG) is not configured to be in a deactivated state,
                4> The UE may transfer a frequency measurement result report message to a lower layer device in order to transmit the frequency measurement result report message through SRB3.
            3> Else
                4> The UE may transfer the frequency measurement result report message to the lower layer device in order to transmit the frequency measurement result report message through SRB1 (or SRB of MCG (E-UTRA)).
        2> If the UE is configured to NR-DC, or if the frequency measurement procedure or the frequency measurement report procedure is configured with respect to the cell group (or SCG),
            3> If SRB3 is configured to the UE and if the cell group (SCG) is not configured to be in a deactivated state,
                4> The UE may transfer a frequency measurement result report message to a lower layer device in order to transmit the frequency measurement result report message through SRB3.
            3> Else
                4> The UE may transfer the frequency measurement result report message to the lower layer device in order to transmit the frequency measurement result report message through SRB1 (or SRB of MCG (E-UTRA)).

Figure 14:
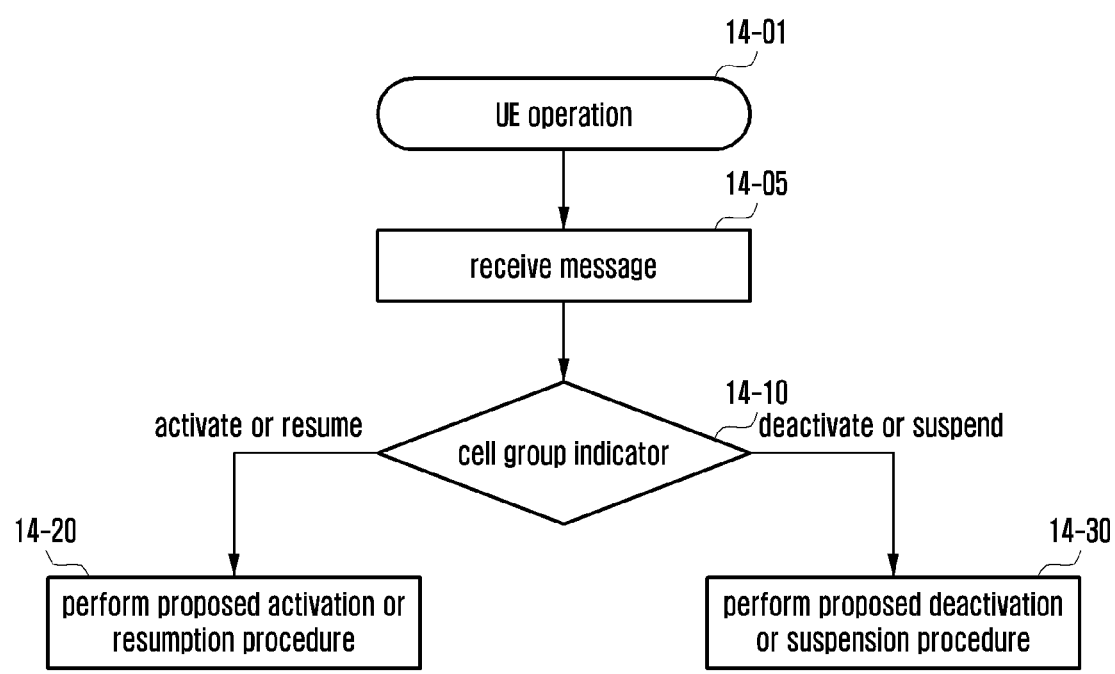
FIG. 14 illustrates an operation of a UE according to an embodiment of the present disclosure.

FIG. 14 illustrates an operation of a terminal according to an embodiment of the present disclosure.

Referring to FIG. 14, the terminal 14-01 may receive a message (e.g., DCI of PDCCH, MAC control information or RRC message) from the base station (14-05). The message may include cell group configuration information, cell group status, or cell group indicator. The UE may identify whether configuration, addition, activation, or resumption of a cell group is instructed, or whether release or deactivation or stop of the cell group is instructed (14-10). If configuration, addition, activation, or resumption of a cell group is instructed, the UE may perform a procedure for configuration, addition, activation, or resumption of the cell group provided in the disclosure (14-20). If release or deactivation or stop of the cell group is instructed, the UE may perform a procedure for release or deactivation or stop of the cell group provided in the disclosure (14-30).

Figure 15:
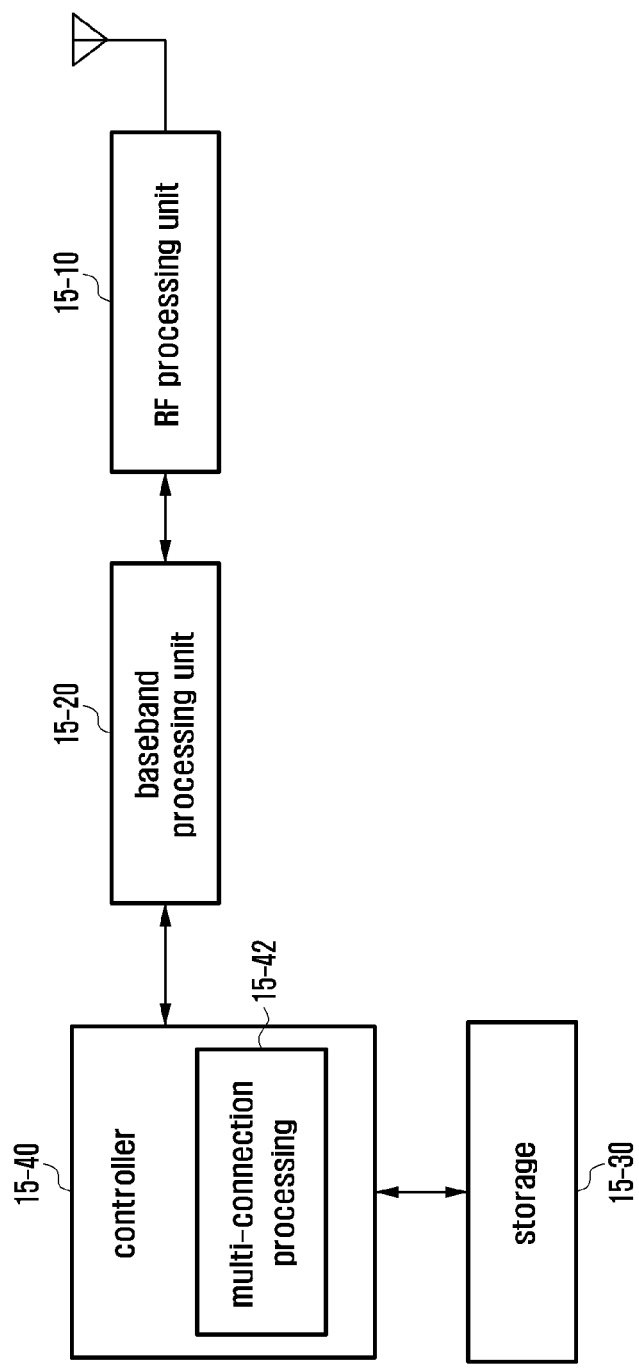
FIG. 15 illustrates a structure of a UE according to an embodiment of the present disclosure.

FIG. 15 illustrates a structure of a UE according to an embodiment of the present disclosure.

Referring to FIG. 15, the UE includes a Radio Frequency (RF) processing unit 15-10, a baseband processing unit 15-20, a storage 15-30, and a controller 15-40.

The RF processing unit 15-10 performs a function of transmitting and receiving a signal through a radio channel such as converting or amplifying a band of the signal. That is, the RF processing unit 15-10 up-converts a baseband signal provided from the baseband processing unit 15-20 into an RF band signal, transmits the RF band signal through an antenna, and then down-converts the RF band signal received through the antenna into a baseband signal. For example, the RF processing unit 15-10 may include a transmission filter, a reception filter, an amplifier, a mixer, an oscillator, a Digital-to-Analog Converter (DAC), an Analog-to-Digital Converter (ADC), and the like. Although FIG. 15 illustrates only one antenna, the UE may include a plurality of antennas. The RF processing unit 15-10 may include a plurality of RF chains. Moreover, the RF processing unit 15-10 may perform beamforming. For the beamforming, the RF processing unit 15-10 may control a phase and a size of each of the signals transmitted/received through a plurality of antennas or antenna elements. The RF processing unit may perform MIMO and receive a plurality of layers when performing the MIMO operation. The RF processing unit 15-10 may appropriately configure a plurality of antennas or antenna elements to perform reception beam sweeping or control a reception beam direction and width to make the reception beam coordinate with the transmission beam according to the control of the controller.

The baseband processing unit 15-20 performs a function for a conversion between a baseband signal and a bitstream according to a physical layer standard of the system. For example, in data transmission, the baseband processing unit 15-20 generates complex symbols by encoding and modulating a transmission bitstream. Further, in data reception, the baseband processing unit 15-20 reconstructs a reception bitstream by demodulating and decoding a baseband signal provided from the RF processing unit 15-10. For example, in an Orthogonal Frequency Division Multiplexing (OFDM) scheme, when data is transmitted, the baseband processing unit 15-20 generates complex symbols by encoding and modulating a transmission bitstream, mapping the complex symbols to subcarriers, and then configures OFDM symbols through an Inverse Fast Fourier Transform (IFFT) operation and a Cyclic Prefix (CP) insertion. Further, in data reception, the baseband processing unit 15-20 divides the baseband signal provided from the RF processing unit 15-10 in units of OFDM symbols, reconstructs the signals mapped to the subcarriers through a Fast Fourier Transform (FFT) operation, and then reconstructs a reception bitstream through demodulation and decoding.

The baseband processing unit 15-20 and the RF processing unit 15-10 may transmit and receive the signal as described above. Accordingly, each of the baseband processing unit 15-20 and the RF processing unit 15-10 may be called a transmitter, a receiver, a transceiver, or a communication unit. Further, at least one of the baseband processing unit 15-20 and the RF processing unit 15-10 may a plurality of communication modules to support a plurality of different radio access technologies. At least one of the baseband processing unit 15-20 and the RF processing unit 15-10 may include different communication modules to process signals in different frequency bands. For example, the different radio-access technologies may include an LTE network and an NR network. Further, the different frequency bands may include a Super High Frequency (SHF) (for example, 2.5 GHz and 5 Ghz) band and a millimeter (mm) wave (for example, 60 GHz) band.

The storage 15-30 stores data such as a basic program, an application, configuration information, and the like for the operation of the UE. The storage 15-30 provides stored data according to a request from the controller 15-40.

The controller 15-40 controls the overall operation of the UE. For example, the controller 15-40 transmits and receives signals through the baseband processing unit 15-20 and the RF processing unit 15-10. Further, the controller 15-40 reads data in the storage 15-30 and reads the data. To this end, the controller 15-40 may include at least one processor. For example, the controller 15-40 may include a Communication Processor (CP) that performs a control for communication, and an Application Processor (AP) that controls a higher layer such as an application. The controller 15-40 may include a multi-connection processing unit.

Figure 16:
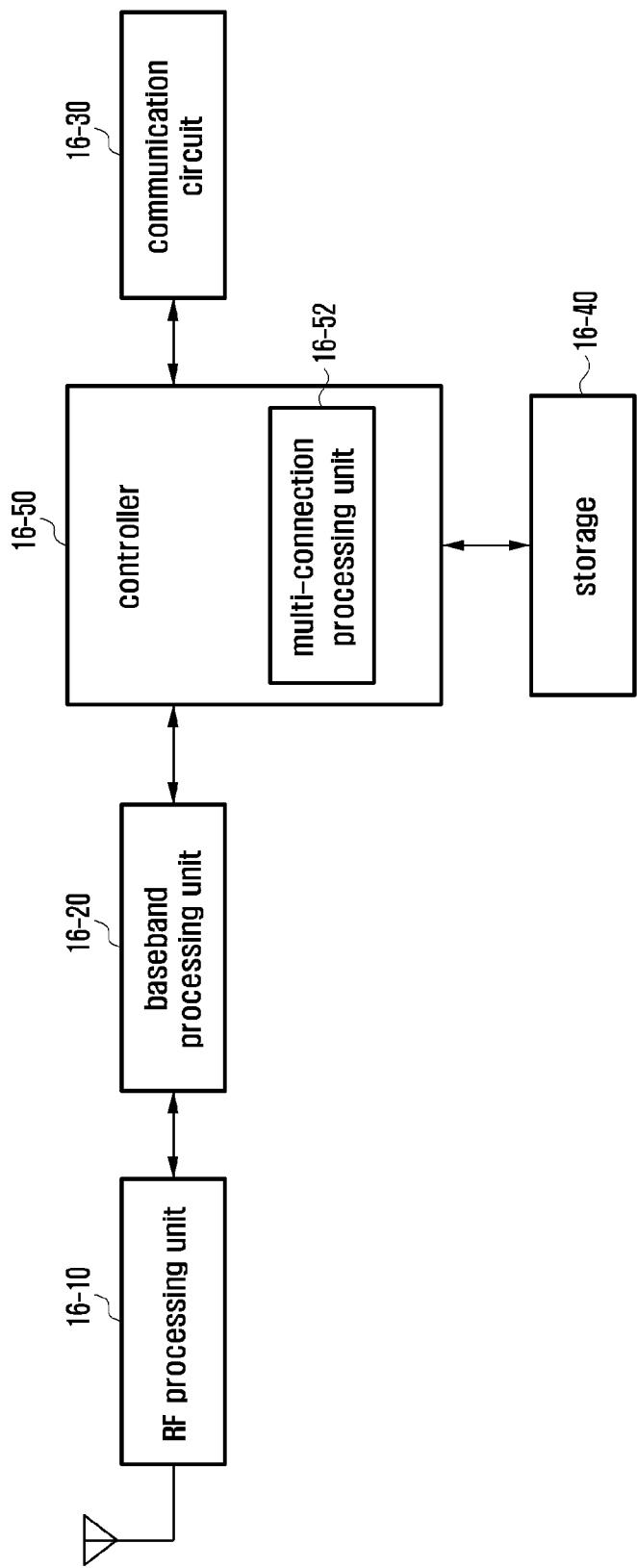
FIG. 16 illustrates a base station (or a TRP) in a wireless communication system according to an embodiment of the present disclosure.

FIG. 16 illustrates a base station (or a TRP) in a wireless communication system according to an embodiment of the present disclosure.

Referring to FIG. 16, the base station includes an RF processing unit 16-10, a baseband processing unit 16-20, a communication circuit 16-30, a storage 16-40, and a controller 16-50.

The RF processing unit 16-10 performs a function of transmitting and receiving a signal through a radio channel such as converting or amplifying a band of the signal. That is, the RF processing unit 16-10 up-converts a baseband signal provided from the baseband processing unit 16-20 into an RF band signal and then transmits the converted signal through an antenna, and down-converts an RF band signal received through the antenna into a baseband signal. For example, the RF processing unit 16-10 may include a transmission filter, a reception filter, an amplifier, a mixer, an oscillator, a DAC, an ADC, and the like. Although FIG. 16 illustrates only one antenna, the first access node may include a plurality of antennas. The RF processing unit 16-10 may include a plurality of RF chains. The RF processing unit 16-10 may perform beamforming. For the beamforming, the RF processing unit 16-10 may control the phase and the size of each of the signals transmitted and received through a plurality of antennas or antenna elements. The RF processing unit may perform a downlink MIMO operation by transmitting one or more layers.

The baseband processing unit 16-20 performs a function of performing conversion between a baseband signal and a bitstream according to a physical-layer standard of the first radio-access technology. For example, in data transmission, the baseband processing unit 16-20 generates complex symbols by encoding and modulating a transmission bitstream. Further, in data reception, the baseband processing unit 16-20 reconstructs a reception bitstream by demodulating and decoding a baseband signal provided from the RF processing unit 16-10. For example, according to an OFDM scheme, in data transmission, the baseband processing unit 16-20 may generate complex symbols by encoding and modulating the transmission bitstream, map the complex symbols to subcarriers, and then configure OFDM symbols through an IFFT operation and CP insertion. In addition, in data reception, the baseband processing unit 16-20 divides a baseband signal provided from the RF processing unit 16-10 in units of OFDM symbols, recovers signals mapped with sub-carriers through an FFT operation, and then reconstructs a reception bit string through demodulation and decoding. The baseband processing unit 16-20 and the RF processing unit 16-10 may transmit and receive the signal as described above. Accordingly, each of the baseband processing unit 16-20 and the RF processing unit 16-10 may be referred to as a transmitter, a receiver, a transceiver, a communication unit, or a wireless communication unit.

The communication circuit 16-30 provides an interface for communicating with other nodes within the network.

The storage 16-40 may store a basic program, an application, configuration information, and the like for the operation of the MeNB. Particularly, the storage 16-40 may store information on bearers allocated to the accessed UE, a measurement result reported from the accessed UE, and the like. Further, the storage 16-40 may store information which is a reference for determining whether to provide or stop multiple connections to the UE. The storage 16-40 provides stored data according to a request from the controller 16-50.

The controller 16-50 controls the overall operation of the MeNB. For example, the controller 16-50 may transmit and receive a signal through the baseband processing unit 16-20 and the RF processing unit 16-10 or through the communication circuit 16-30. Further, the controller 16-50 reads data in the storage 16-40 and reads the data. To this end, the controller 16-50 may include at least one processor.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a RAM and a flash memory, a ROM, an electrically erasable programmable read only memory (EEPROM), a magnetic disc storage device, a CD-ROM, DVDs, other type optical storage devices, or a magnetic cassette. Alternatively, any combination of some or all of the memory devices may form a memory in which the program is stored. Further, a plurality of such memories may be included in the electronic device.

In addition, the programs may be stored in an attachable storage device which may access the electronic device through communication networks such as the Internet, Intranet, a local area network (LAN), a wide LAN (WLAN), and a storage area network (SAN) or a combination thereof. Such a storage device may access the electronic device via an external port. Further, a separate storage device on the communication network may access a portable electronic device.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, one embodiment of the disclosure may be partially combined with other embodiments to operate a BS and a terminal. As an example, a first and second embodiment of the disclosure may be combined with each other to operate a BS and a terminal. Further, although the above embodiments have been described on the basis of the FDD LTE system, other variants based on the technical idea of the embodiments may also be implemented in other communication systems such as TDD LTE, 5G, or NR systems.

In the drawings in which methods of the disclosure are described, the order of the description does not always correspond to the order in which steps of each method are performed, and the order or relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
    receiving, from a base station, a first radio resource control (RRC) reconfiguration message associated with a secondary cell group (SCG) activation;
    identifying whether a beam failure is detected or whether a time alignment timer is running, based on the first RRC reconfiguration message;
    based on the beam failure not being detected and the time alignment timer being running, activating a SCG without a random access procedure;
    receiving, from the base station, a second RRC reconfiguration message including information indicating that the SCG is deactivated; and
    performing beam failure detection while the SCG is deactivated,
    wherein, in case that the second RRC reconfiguration message includes information on an identifier (ID) of a first downlink bandwidth part (BWP) to be used for the beam failure detection, the beam failure detection is performed in the first downlink BWP, and
    wherein, in case that the second RRC reconfiguration message does not include the information on the ID of the first downlink BWP, the beam failure detection is performed in a previous activated downlink BWP.

2. The method of claim 1, wherein in case that the beam failure is detected or the time alignment timer is not running, the random access procedure is initiated for activating the SCG.

3. The method of claim 1, further comprising:
    monitoring a physical downlink control channel (PDCCH) on a primary secondary cell (PSCell) of an activated SCG.

4. The method of claim 1, wherein the first RRC reconfiguration message is received via a signaling radio bearer (SRB) 1 within multi-RAT dual connectivity (MR-DC) SCG configuration information.

5. A method performed by a base station in a wireless communication system, the method comprising:
    determining to activate a secondary cell group (SCG); and
    transmitting, to a terminal, a first radio resource control (RRC) reconfiguration message for activating the SCG,
    wherein, based on a beam failure not being detected and a time alignment timer being running, the SCG is activated without a random access procedure,
    transmitting, to the terminal, a second RRC reconfiguration message including information indicating that the SCG is deactivated,
    wherein, in case that the second RRC reconfiguration message includes information on an identifier (ID) of a first downlink bandwidth part (BWP) to be used for a beam failure detection while the SCG is deactivated, the beam failure detection is performed in the first downlink BWP, and wherein, in case that the second RRC reconfiguration message does not include the information on the ID of the first downlink BWP, the beam failure detection is performed in a previous activated downlink BWP.

6. The method of claim 5, wherein in case that the beam failure is detected or the time alignment timer is not running, the random access procedure is initiated for activating the SCG.

7. The method of claim 5, wherein the first RRC reconfiguration message is transmitted via a signaling radio bearer (SRB) 1 within multi-RAT dual connectivity (MR-DC) SCG configuration information.

8. A terminal in a wireless communication system, the terminal comprising:
a transceiver configured to receive or transmit signals; and
a processor configured to:
control the transceiver to receive, from a base station, a first radio resource control (RRC) reconfiguration message associated with a secondary cell group (SCG) activation,
identify whether a beam failure is detected or whether a time alignment timer is running, based on the first RRC reconfiguration message,
based on the beam failure not being detected and the time alignment timer being running, activate a SCG without a random access procedure,
control the transceiver to receive, from the base station, a second RRC reconfiguration message including information indicating that the SCG is deactivated, and
perform beam failure detection while the SCG is deactivated,
wherein, in case that the second RRC reconfiguration message includes information on an identifier (ID) of a first downlink bandwidth part (BWP) to be used for the beam failure detection, the beam failure detection is performed in the first downlink BWP, and
wherein, in case that the second RRC reconfiguration message does not include the information on the ID of the first downlink BWP, the beam failure detection is performed in a previous activated downlink BWP.

9. The terminal of claim 8, wherein in case that the beam failure is detected or the time alignment timer is not running, the random access procedure is initiated for activating the SCG.

10. The terminal of claim 8, wherein the processor is further configured to: monitor a physical downlink control channel (PDCCH) on a primary secondary cell (PSCell) of an activated SCG.

11. The terminal of claim 8, wherein the first RRC reconfiguration message is received via a signaling radio bearer (SRB) 1 within multi-RAT dual connectivity (MR-DC) SCG configuration information.

12. A base station in a wireless communication system, the base station comprising:
a transceiver configured to receive or transmit signals; and
a processor configured to:
determine to activate a secondary cell group (SCG), and
control the transceiver to transmit, to a terminal, a first radio resource control (RRC) reconfiguration message for activating the SCG,
wherein, based on a beam failure not being detected and a time alignment timer being running, the SCG is activated without a random access procedure,
wherein the processor is further configured to control the transceiver to transmit, to the terminal, a second RRC reconfiguration message including information indicating that the SCG is deactivated,
wherein, in case that the second RRC reconfiguration message includes information on an identifier (ID) of a first downlink bandwidth part (BWP) to be used for a beam failure detection while the SCG is deactivated, the beam failure detection is performed in the first downlink BWP, and
wherein, in case that the second RRC reconfiguration message does not include the information on the ID of the first downlink BWP, the beam failure detection is performed in a previous activated downlink BWP.

13. The base station of claim 12, wherein in case that the beam failure is detected or the time alignment timer is not running, the random access procedure is initiated for activating the SCG, and wherein the first RRC reconfiguration message is transmitted via a signaling radio bearer (SRB) 1 within multi-RAT dual connectivity (MR-DC) SCG configuration information.

* * * * *